US005594469A

United States Patent [19]
Freeman et al.

[11] Patent Number: 5,594,469
[45] Date of Patent: Jan. 14, 1997

[54] HAND GESTURE MACHINE CONTROL SYSTEM

[75] Inventors: William T. Freeman, Newton, Mass.; Craig D. Weissman, Coral Springs, Fla.

[73] Assignee: Mitsubishi Electric Information Technology Center America Inc., Cambridge, Mass.

[21] Appl. No.: 391,955

[22] Filed: Feb. 21, 1995

[51] Int. Cl.⁶ ............................................. G09G 5/08
[52] U.S. Cl. ................................. 345/158; 345/157
[58] Field of Search ............................. 345/157, 156, 345/158, 145, 146; 395/159; 382/291, 203

[56] References Cited

U.S. PATENT DOCUMENTS

| 4,988,981 | 1/1991 | Zimmerman | 345/156 |
| 5,168,531 | 12/1992 | Sigel | 345/157 |
| 5,202,961 | 4/1993 | Mills et al. | 345/157 |

*Primary Examiner*—Richard Hjerpe
*Assistant Examiner*—Regina Liang
*Attorney, Agent, or Firm*—Robert K. Tendler, Esq.

[57] ABSTRACT

A system for the control from a distance of machines having displays includes hand gesture detection in which the hand gesture causes movement of an on-screen hand icon over an on-screen machine control icon, with the hand icon moving the machine control icon in accordance with sensed hand movements to effectuate machine control. In one embodiment, TV control led by hand signals includes detecting a single hand gesture and providing a hand icon on the screen along with the provision of icons representing TV controls such as volume, channel, color, density, etc., in which a television camera detects the hand in a noisy background through correlation techniques based on values of local image orientation. In order to trigger the system into operation, a trigger gesture such as the "how" sign is distinguished from the background through the utilization of orientation angle differences. From correlation values based on correlating local orientations between a mask defining a particular hand and the later acquired image of the hand, normalized correlation scores for each pixel are obtained, with the correlation peak being detected and then thresholded to eliminate false alarms.

16 Claims, 9 Drawing Sheets

HAND GESTURE MACHINE CONTROL SYSTEM

FIELD OF INVENTION

This invention relates to the control of machines by hand signals and more particularly to a hand gesture recognition system for control from a distance.

BACKGROUND OF THE INVENTION

For some time it has been possible to control machines through the use of remote signaling devices in which infrared or RF signals are used to control machine function. From VCRs, TVs, to stereo equipment and computers, battery-powered hand-held devices eliminate the requirement for the individual to move to the machine to activate machine-carried buttons or switches as well as wired control modules.

However, as in the case of television, hand-held remote control modules which control the operation of the television in terms of channel, volume and in some cases hue, density and contrast are easily lost or misplaced. Even if not lost, they may be in another location, requiring the viewers to retrieve them. As a result there can be considerable frustration on the part of television viewers when they wish to turn on or control the television. Moreover, with respect to computer workstations, control of the workstation with a hand-held remote control unit also suffers the same problems of loss of the remote control unit.

Additionally, and perhaps more importantly, providing a wide variety of buttons on a remote control module is often confusing to the user because of the multiple buttons. The large number of buttons was necessitated by the large number of functions to be controlled. The more functions, the more buttons which adds to the complexity of activating the various functions.

As a result there is a requirement for remoteless TV control which is instantly learnable in terms of instructing an individual as to how to operate the TV. The remoteless TV control must be easy to remember, easy to master, and reliable. Moreover, the penalty for false entry into a control mode must be made relatively small.

By way of background, the following articles describe machine control and the use of pattern and orientation analysis in the detection of objects within an optically scanned scene: D. H. Ballard and C. M. Brown, editors. Computer Vision. Prentice Hall, 1982; A. Blake and M. Isard. 3D position, attitude and shape input using video tracking of hands and lips. In Proceedings of SIGGRAPH 94, pages 185–192, 1994. In Computer Graphics, Annual Conference Series; T. J. Darrell and A. P. Pentland. Space-time gestures. In Proc. IEEE CVPR, pages 335–340, 1993; J. Davis and M. Shah. Gesture recognition. Technical Report CS-TR-93-11, University of Central Florida, Orlando, Fla. 32816, 1993; W. T. Freeman and E. H. Adelson. The design and use of steerable filters. IEEE Pat. Anal. Mach. Intell., 13(9):891–906, September 1991; M. Kass and A. P. Witkin. Analyzing oriented patterns. In Proc. Ninth IJCAI, pages 944–952, Los Angeles, Calif., August 1985; H. Knutsson and G. H. Granlund. Texture analysis using two-dimensional quadrature filters. In IEEE Computer Society Workshop on Computer Architecture for Pattern Analysis and Image Database Management, pages 206–213, 1983; J. M. Rehg and T. Kanade. Digiteyes: vision-based human hand tracking. Technical Report CMU-CS-93-220, Carnegie Mellon School of Computer Science, Pittsburgh, Pa. 15213, 1983; and J. Segen. Gest: a learning computer vision system that recognizes gestures. In Machine Learning IV. Morgan Kauffman, 1992. edited by Michalski et. al.

SUMMARY OF THE INVENTION

In order to eliminate the problems of control of machines through the use of signing, in the present invention a remoteless system for the control of machines having displays includes hand gesture detection in which the detected hand gesture causes movement of an on-screen hand icon over an on-screen machine control icon, with the hand icon moving the machine control icon in accordance with sensed hand movements. In one embodiment only a single hand gesture is recognized, making the user's learning of many hand gestures unnecessary. Note that the single hand gesture is used to control the multiple functions associated with the respective on-screen machine control icons by merely moving the hand icon over the particular machine control icon desired. The result is a simple robust control system which can be easily learned and which can be used to control as many functions as there are on-screen icons.

In the general case, the subject remoteless TV control system which utilizes hand gesture recognition is simplified through the utilization of a small vocabulary of hand gestures which would otherwise be hard for the user to remember and hard for the computer to recognize. In one embodiment, the small vocabulary of hand gestures revolves around a single gesture which is relatively easily established by the user, namely an open hand toward the television, also known as the hello or "how" sign. The position of the hand in this gesture is sensed so that the movement of the hand moves a hand icon on the screen to permit placing of the hand icon over control icons such as channel or volume slider controls, or up-down arrows.

In one embodiment, false recognition of TV commands due to ordinary movements is solved through the utilization of a special gesture to turn on the system, with this gesture functioning as a trigger gesture for entering the TV control mode. The gesture, in one embodiment, is the aforementioned hello or "how" sign which involves minimal gesture memorization by the user, e.g. just putting a flat hand in the air. The flat hand is relatively easy for a machine to identify and track even in a cluttered visual scene, with the hand icon on the TV screen providing visual feedback to permit the user to control the TV merely by changing the position and or orientation of his hand.

The system is designed so that the penalty for false entry into control mode is small. For instance, the penalty in one embodiment is that the icons appear only at the bottom portion of the TV screen, so that very little of the screen is disrupted. As a result, upon false activation only the bottom of the screen is occupied which makes false entry relatively unobtrusive.

In order to enter the control mode a large area of what the camera sees is scanned for the presence of a hand in the "how" position. In one embodiment, scanning is accomplished by a normalized correlation of a set of one or more prototypical hand masks with the image. The correlation is based on the values of local orientation instead of image intensities to give more robust results, with the correlation vectors being unit vectors with given orientation angles based on origins at points on the hand.

In one embodiment, normalized correlation is used. As a result, the series of orientations resembles needles with various orientations about the hand. If the maximum correlation score exceeds a threshold value, then the trigger gesture is detected and the television enters control mode. In one embodiment, the position of the hand is taken to be the position of maximum correlation score.

Once entering into the control mode, the camera scans the scene for a hand which matches or correlates with the mask, with the correlations being based on correlating local orientations between the mask and the image. This type of system is robust against lighting changes and against varied and noisy backgrounds. In one embodiment, once a suitable correlation between the hand and the mask is recognized, the portion of the scene analyzed by the subject system decreases to the area of the hand so that faster hand tracking for the movement of the hand to move the hand icon is facilitated.

It has also been found that the effect of a cluttered background can be reduced through a background subtraction procedure described hereinafter.

Under some circumstances it is desirable to sense this single hand gesture in different angular orientations to provide different machine control functions and to allow the user to hold his hand at different orientations. In this case with the normalized correlation scores, different angular orientations of the hand can be sensed through the utilization of a number of masks having hands at different orientations. Thus different orientations of the open hand can be made to control different functions or result in different icon movement.

The utilization of hand gesture recognition through a single gesture and the utilization of a corresponding hand icon provides a visual feedback to eliminate the necessity for a large variety of hand gestures for different control functions. All that is necessary is that there be coincidence of the hand icon with a control icon on screen, with visual feedback from the screen indicating where to move one's hand in order to effectuate the desired control. Using multiple hand gestures for different functions is unnecessarily confusing, like providing a remote control device with a large number of buttons. The Subject System thus simplifies machine control by sensing only one gesture and providing multiple on-screen machine control icons for the multitude of different functions which it is desired to control.

In summary, by the movement of a hand or other body part a corresponding visible position indicator or cursor in the form of an icon is moved on-screen. This visible on-screen cursor allows the user to adjust his motions or actions to move the cursor in the desired way. Cursor movements then cause machine commands to be issued. Note that cursor movements over a machine control icon such as a slider can be made to cause movement of this icon which then results in the issuance of the requisite machine commands.

In one embodiment, a TV controlled by hand gestures includes detecting hand gestures and providing a hand icon on screen with the provision of icons representing TV controls such as volume, channel, color, density, etc. in which a television camera detects the hand in a noisy background through correlation techniques based on values of local orientation instead of image intensities. In order to trigger the system into operation, a trigger gesture such as the "how" sign is distinguished from the background through the normalized correlation of local image orientation angles with a hand template. Normalized correlation scores for each pixel are obtained, with correlations based on correlating local orientation between a mask defining a particular hand and the later acquired image of the hand. Once having detected a hand gesture, the field of view of the camera is reduced to slightly larger than the area at which the hand gesture was recognized to enable fast, robust tracking of hand movement for the control of the icons on screen. In one embodiment when the hand icon is over the icon representing the desired control, the desired control icon lights up and the desired control is effected, with the TV being returned to the viewing mode by closing the hand or otherwise discontinuing the display of the hand. In one embodiment the hand icon closes to confirm the closing of the user's hand, and the graphical control overlays containing the icons disappear from the TV screen at which time the television returns to the viewing mode.

BRIEF DESCRIPTION OF THE DRAWINGS

These and other features of the Subject Invention will be better understood in connection with the Drawings taken in conjunction with the Detailed Description of which

DETAILED DESCRIPTION

Figure 1:
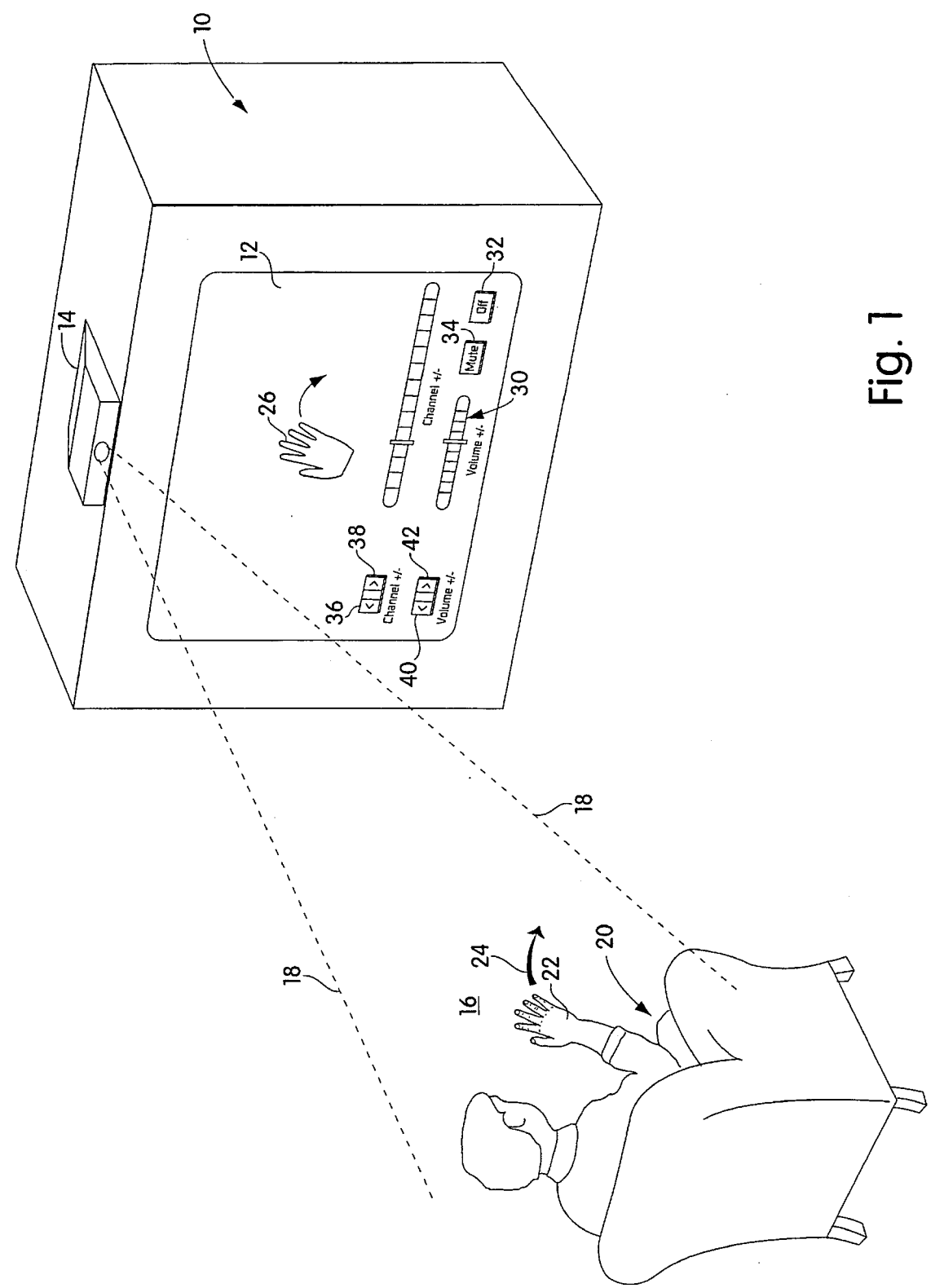
FIG. 1 is a diagrammatic illustration of the control of a television through the utilization of hand signals, with a hand-icon utilized to control TV function icons on screen.

Referring now to FIG. 1 in the hand gesture control of a machine, in one embodiment a television 10 having a screen 12 is provided with a camera 14 which scans a scene 16 through an angular view illustrated by dotted lines 18. In this scene is an individual 20 seeking to control television functions through the movement of his hand 22 in the direction of arrow 24.

The hand is detected as will be described from raw video of the scene. Upon detection of a particular hand gesture, in this case the "how" flat handed gesture, a hand icon 26 is portrayed on screen at an initial position convenient to the various control icons, 28–42. Also portrayed is a number of machine control icons, in this case a channel slider bar representation 28, a volume slider bar representation 30, an off button 32, a mute button 34, additional channel control arrows on buttons 36 and 38 and volume control arrows on buttons 40 and 42.

With the TV control system to be described, the movement of hand 22 in the direction of arrow 24 causes the on-screen hand icon 26 to move in the direction of arrow 44 such that the hand icon, when detected, mimics the hand motion. The visual feedback provided by the hand icon to individual 20 permits the individual to control the hand icon by moving his flattened hand in any direction he deems necessary in order to effectuate machine control.

Figure 2A:
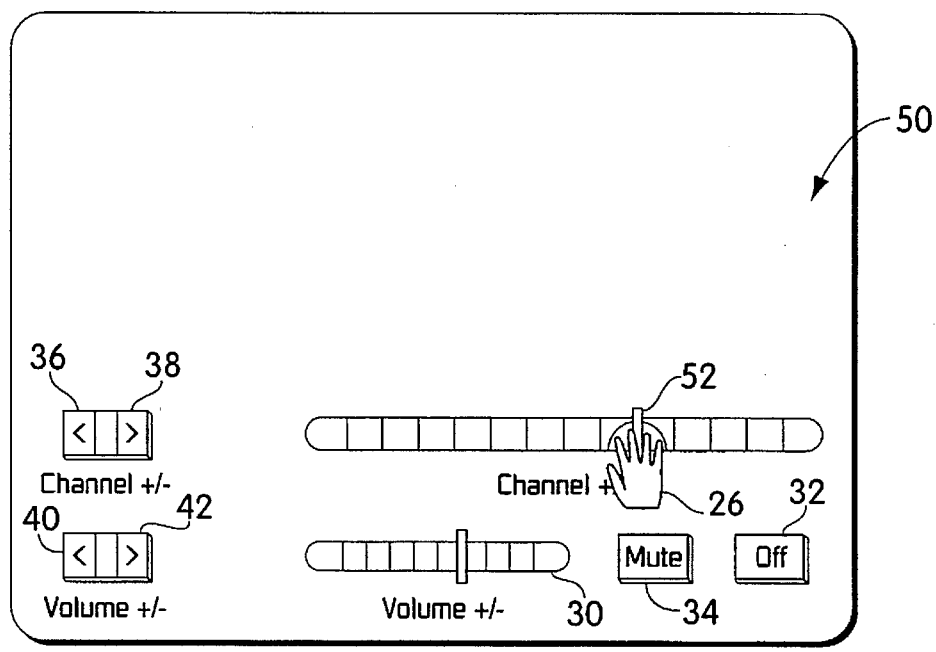
FIGS. 2A and 2B are diagrammatic representations of the television screen of FIG. 1 illustrating the positioning of the hand icon over a channel slider bar icon and the movement of the slider with the movement of the hand to effectuate channel change.

As can be seen in FIG. 2A screen 50 is provided with the aforementioned machine control icons. In this figure the channel control icon 28 is depicted with the hand icon 26 being positioned over a slider 52, with the system to be described hereinafter detecting the coincidence of the hand icon with the slider.

Figure 2B:
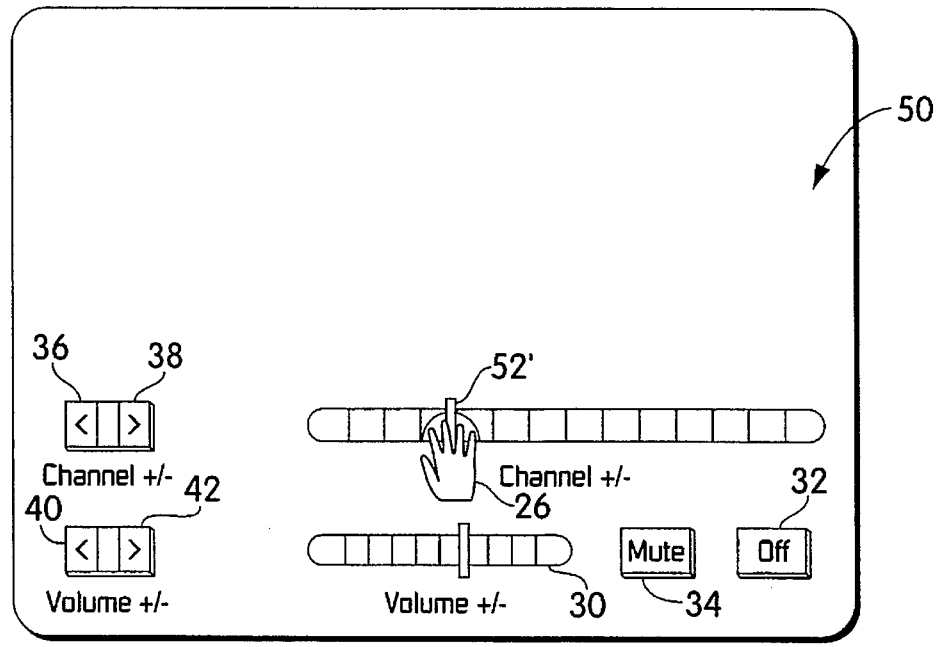

As illustrated in FIG. 2B hand icon 26 having first established coincidence with slider 52 now moves slider 52 into position 52 to effectuate change of channel.

Figure 2C:
FIGS. 2C and 2D are photographs of an individual utilizing his hand in the "how" sign to capture the subject control system and to cause the on-screen hand icon to move in accordance with actual hand gestures.
Figure 2D:

Referring now to FIG. 2C a picture of an individual providing the "how" sign to activate the Subject System and control the hand icon is presented within the camera viewing angle. After hand acquisition the individual moves his hand from the position shown in FIG. 2C to that shown in FIG. 2D. The movement of his hand towards his face then causes the on-screen hand icon to move in the direction of the individual's hand motion to provide the icon movement depicted in FIGS. 2A and 2B.

Figure 2E:
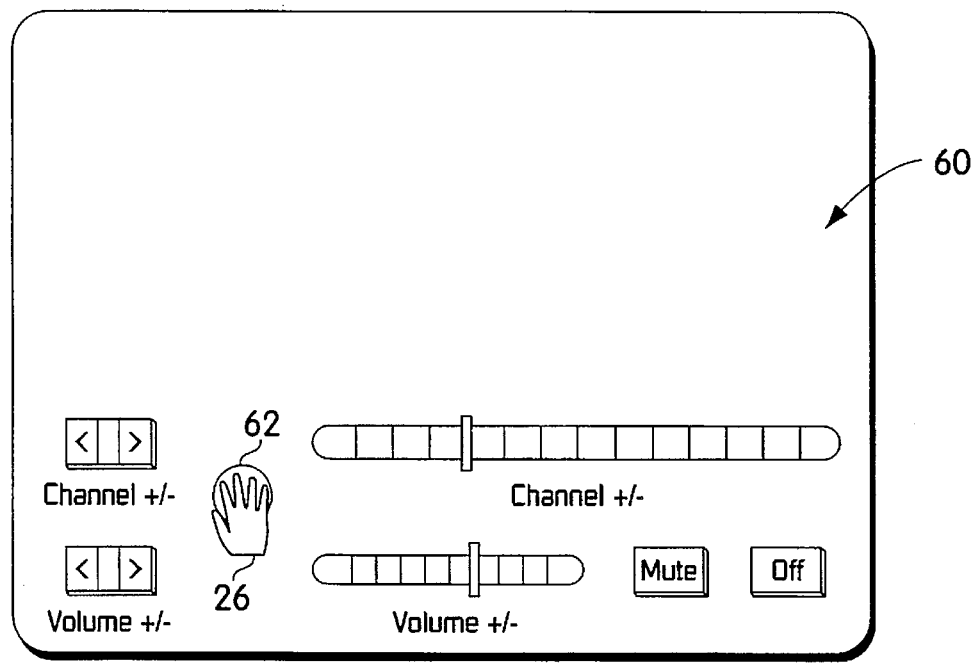
FIG. 2E is a diagrammatic illustration of the television screen of FIG. 1 illustrating entry into the control mode through the detection of the "how" hand signal.

Referring now to FIG. 2E, as will be appreciated in order to capture the control of the television it is necessary to provide a triggering gesture, here the "how" sign. The fact of the machine entering into the control mode is indicated by the appearance of the hand icon 26 and the on-screen graphical control icons, 28–42.

Figure 2F:
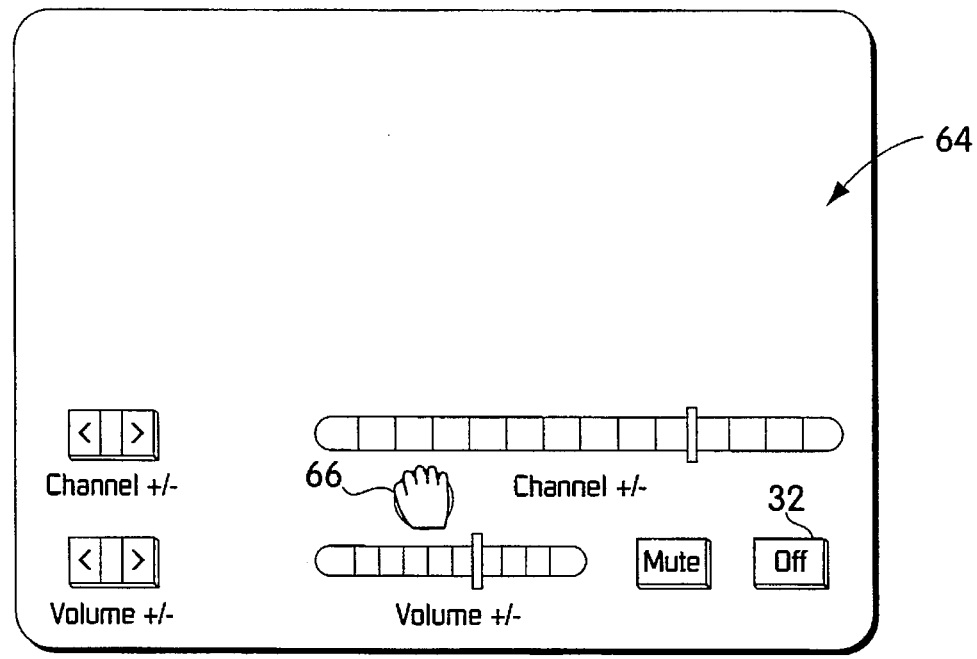
FIG. 2F is a diagrammatic illustration of the television screen of FIG. 1 illustrating the turning off of the control system with a closed fist hand gesture, with a closed fist icon being portrayed on screen.

Referring to FIG. 2F and screen 64, when it is desired to relinquish control of the television, a fist-like gesture, or any other gesture which is not a "how" sign, is recognized, with a fist hand icon 66 displayed on screen when the non-how sign gesture is acquired. Thus, it is possible to exit the control mode simply by making a fist.

Figure 3:
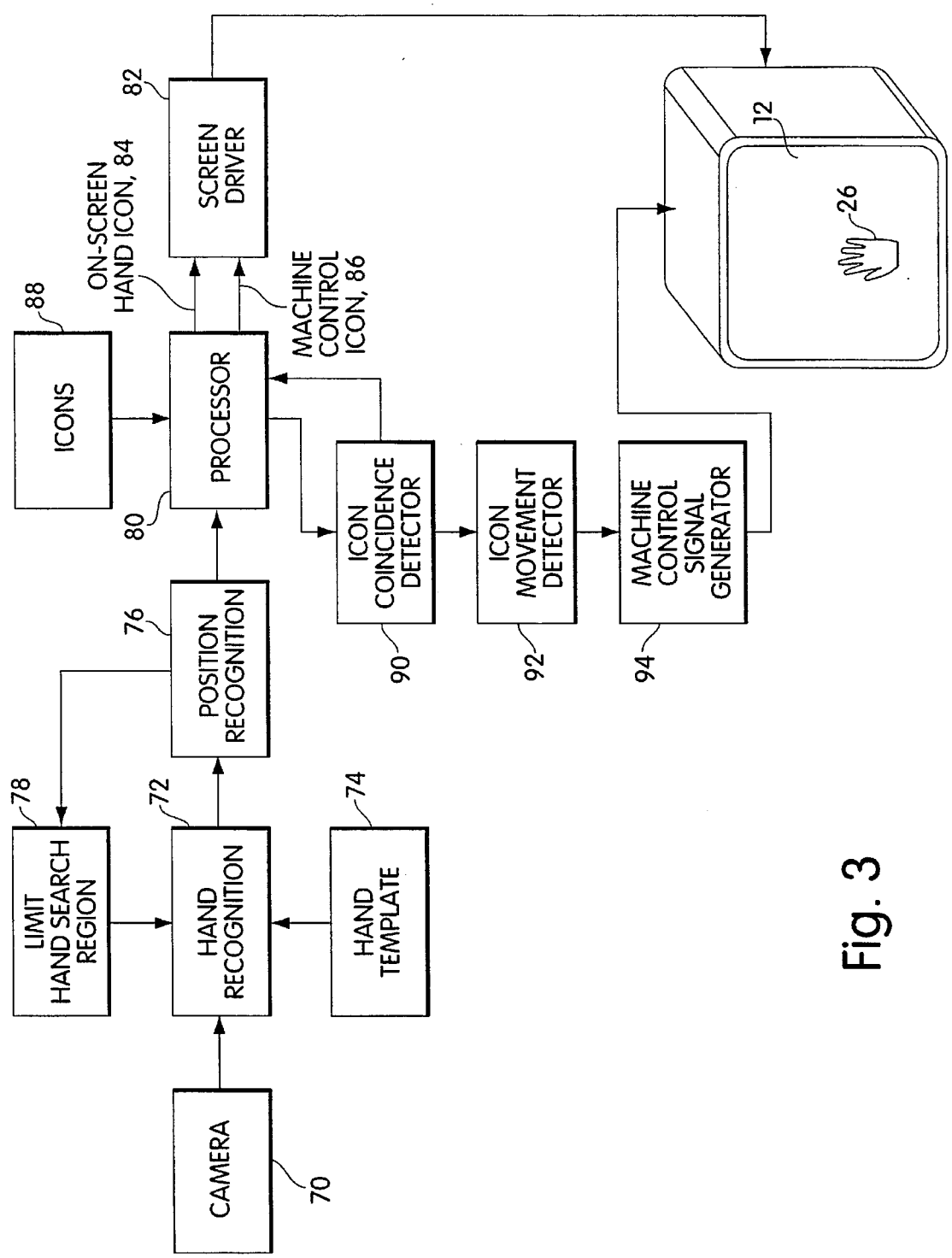
FIG. 3 is a block diagram of the Subject Invention illustrating hand recognition, position recognition, the use of a hand template, and a processor for providing on-screen hand icons and machine control icons, while at the same time providing machine control through the detection of icon locational coincidence and movement.

Referring now to FIG. 3, in general a system to accomplish the aforementioned control includes a camera 70 and a hand recognition unit 72 to which is coupled a hand template or templates 74 corresponding to the user's hand. It is the purpose of the hand recognition unit to take raw camera data and to recognize a particular hand gesture exemplified by the hand template. Upon recognition of a particular hand gesture, its position is detected by a position recognition unit 76 which serves two purposes. First, upon detection of the particular hand gesture, its position in space is noted and a unit 78 is utilized to delimit the hand search region to the area around the detected hand position for robust and rapid hand gesture detection. Secondly, the position of the particular hand gesture is used to drive the particular on-screen hand icon 26 to an on-screen position depending on the position of the hand in space. For this purpose a processor 80 is utilized to process the hand recognition and position information and to drive a screen driver 82 in accordance with signals representing an on-screen hand icon 84 and a machine control icon 86, with the icons being previously stored and generated as illustrated at 88. Thus screen driver 82 under control of processor 80 provides for the on-screen icons and the movement thereof.

In order to control a machine, in this case a television, icon coincidence must be detected. Icon coincidence refers to positional coincidence of on-screen icons such as the hand and machine icons. Here the icon coincidence is detected by a detector 90. Upon detection of coincidence between a hand icon and a machine icon, hand icon movement is detected as illustrated at 92. Having identified a particular machine control by virtue of the aforementioned coincidence, hand icon movement is utilized to generate the appropriate machine control signals 94. Icon coincidence detection is also used by processor 80 to simultaneously effectuate movement of the moveable portion of on-screen machine icons. One of the first and principle requirements of the subject system is that a robust method be provided for gesture recognition such that a particular hand gesture can be picked out of a noisy environment and utilized to reliably control machine functions. As described above, one particularly powerful method of providing reliable gesture recognition is the utilization of correlation techniques based on values of local orientation. This is accomplished in hand recognition unit 72 of FIG. 3, with an intermediate result being the assignment of unit vectors having particular orientations for each portion of the hand which is detected. Here various points on the hand are provided as origins for the unit vector with the angular orientation of the unit vector corresponding to the dominant angular orientation of the image intensities of the hand at that point. The result as shown in FIG. 4B is a representation of the local orientations in the form of needle-like indicia 100.

More specifically, in operation, there are three basic functions which are accomplished by the system in order to effectuate hand gesture control. The first of these functions is to generate a template for the particular hand gesture to be recognized. In order to accomplish this initialization task an individual positions his hand in the field of view of the camera, with the location of the hand being marked out by a mouse or other device such that the field of view under consideration is limited to the hand. The system then proceeds in hand recognition unit 72 to process that region of the scene to capture the desired hand gesture for use as template 74. It is the purpose of the processing to generate a needle map corresponding to the desired hand gesture. In order to accomplish this, the X and Y derivatives of image intensity across the scanned scene are taken in the sense of taking an image intensity at one point and subtracting this intensity from the intensity of an adjacent point either immediately above or immediately to the side of this point. The result is the formation of an X derivative map and a Y derivative map, dI/dX and dI/dY. The next step is to generate a contrast image by adding $(dI/dX)^2$ and $(dI/dY)^2$ and taking the square root of the result. It will be appreciated that the contrast image is the strength of the image intensity gradient. The contrast image is then thresholded to remove noise by ignoring low contrast portions of the scene. Those portions which are above the contrast threshold are stored to generate the needle map as follows.

The needle map is provided by generating the X derivative of image intensity divided by the contrast and the Y derivative of image intensity by the contrast to yield cos (Θ) and sin (Θ) of a edge discontinuity in the scene, thereby to define the orientation of the aforementioned needles.

Figure 4A:
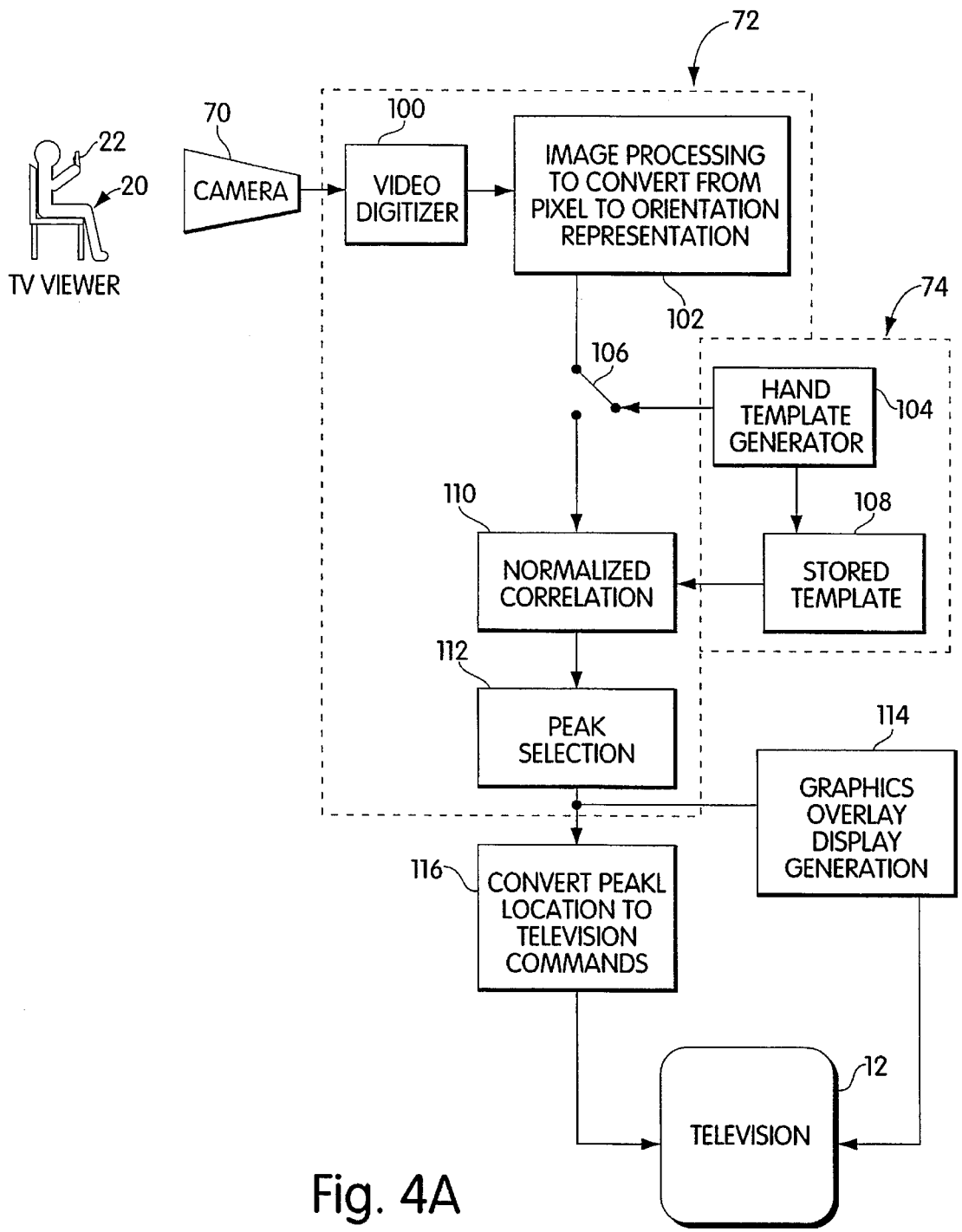
FIG. 4A is a block diagram of a portion of the subject system indicating hand gesture recognition through normalized correlation and peak selection techniques.
Figure 4B:
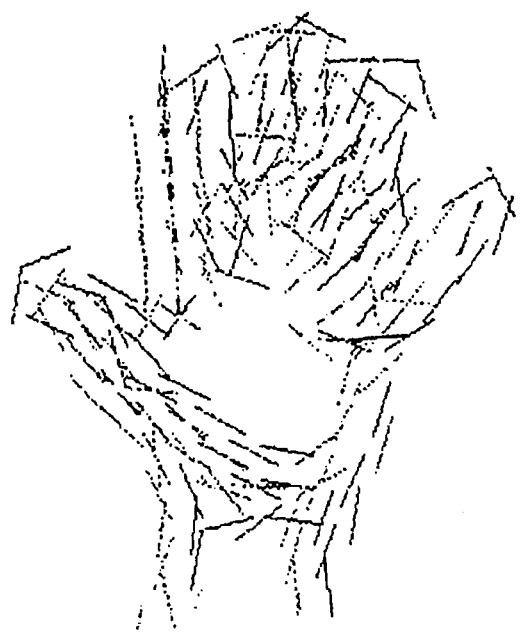
FIG. 4B is a diagrammatic representation of the needle map associated with both the hand template and the image, illustrating the orientation representation.

The resulting set of angles as a function of position can be displayed as a needle map such as that shown in FIG. 4B. The set of cos (Θ) and sin (Θ) values are then utilized as the template against which data corresponding to real time gestures is compared.

The second process which is performed by the Subject System is to detect the existence of a trigger gesture. This gesture is the aforementioned "how" sign in one embodiment or any easily recognized hand gesture.

Since in the previous step a hand template has been generated defining this gesture for the system, the system then searches the camera image for the occurrence of a needle map which is highly correlated to the hand template map. As to correlation, in one embodiment the degree of correlation is achieved via a normalized correlation technique in which the X derivative of image intensity divided by the contrast and the Y derivative of image intensity divided by the contrast are combined in a single, large vector. It is this single vector which is compared with a single vector generated from the hand template map to provide a degree of correlation between these two vectors. The normalized correlation between the two vectors $\vec{A}$ and $\vec{B}$ is generated in accordance with the following formula:

$$\frac{\vec{A} \cdot \vec{B}}{|\vec{A}| |\vec{B}|}.$$

It will be noted that it is important to form the correlation based on the cos (Θ) and sin (Θ) values rather than based on the orientation angle values, Θ, themselves. 0 degrees will yield a low correlation with 359 degrees, even though the angles themselves are nearly colinear. Using a cos (Θ), sin (Θ) representation solves this problem. The vector (cos (0°), sin (0°)) will have a high correlation with the vector (cos (359°), sin (359°)).

It will be noted that the normalized correlation is calculated for regions of the image centered on every position of the image. However, it will be appreciated that the derivatives of image intensity with respect to X and Y are only valid for positions in the hand template where the contrast is above the predetermined threshold. This is also true for the incoming image. Thus, in one embodiment the correlation is only based on cos (Θ) and sin (Θ) measurements at positions where the contrast is above threshold for both the icoming image and the template. The next step provides a calculation for each position as to the percentage of the above contrast template positions which match up to above contrast image positions. Having derived this percentage for each position, if the percentage for a position is above a predetermined threshold, the correlation is valid for the position, whereas if below this threshold, the correlation is discarded. This obviously gives a step function configuration to the threshold curve. In practice however, a step function is not useful. A sigmoidal function is therefore substituted for the step function for smoothing purposes. The formula for sigmoidal function, sig, as a function of the percentage, p, is as follows:

$$sig(p) = B + (T-B) / \left( 1 + \exp\left( s \left( m - \frac{P}{100} \right) \right) \right),$$

where B, T, S, and M are sigmoid shape parameters. Typical values are T=1, B=0, M=0.4, and S=25. The correlation value used is then c*sig (frac), where c is the correlation value based on the positions which are above contrast threshold.

The result is a correlation map for the realtime image versus the template. This correlation map is useful for a number of functions. The first function is to ascertain if the maximum correlation at any point on the image is above a predetermined threshold. In general, it will be appreciated that throughout the image of the gesture the correlation varies assuming that it is not exactly a 100% correlation. There will therefore be points on the image which will exhibit a higher degree of correlation versus other points. It is this maximum correlation that determines whether a triggering gesture has occurred. Thus with this process one determines whether or not a triggering gesture has occurred and more importantly the position in the scene of the triggering gesture, namely that position associated with the maximum correlation.

After having found the trigger gesture, the system then enters the tracking mode. Prior to entering the tracking mode it will be appreciated that the television may be turned off. In one embodiment, the detection of the triggering gesture turns on the television. If the television is already on, the icon overlay is actuated upon detection of the triggering gesture, which is indicated with visual feedback by the provision of the hand icon on the screen.

Once having entered the tracking mode, the portion of the scene analyzed is limited to the area surrounding that region at which the triggering gesture was originally detected. The scene processed may therefore be only 50% of the total scene or as low as 10% of the scene, depending on system parameters. The system then looks for the position of the maximum correlation on a continuous basis so that the hand's movement is tracked in X and Y directions. The system also constantly updates the hand search portion of the system to be constantly centered upon the position of maximum correlation. It will be appreciated that the tracking mode is maintained as long as the maximum correlation value is above a predetermined threshold. If the maximum correlation value descends below this threshold, the system returns to its search for a trigger gesture, with the graphical overlays disappearing once having dropped below this threshold.

It will be appreciated that the detected position of maximum correlation drives the position of the on-screen hand icon, such that there is a predictable relationship between detected hand gesture position and hand icon position. In this way there is visual feedback to the user such that when the user moves his hand in a given direction, the on-screen hand icon moves in a similar manner. It will of course be appreciated that there is a scale factor between hand movement and the movement of the hand icon on the screen.

When the tracking mode is terminated through the falling of the maximum correlation value below the above mentioned threshold, in one embodiment a different hand icon is presented to the viewer, namely a closed fist indicating that hand gesture control has ceased.

In terms of machine control, as described above, when the hand control icon overlies the machine control icon a machine control function is actuated. This is accomplished via icon coincidence detector 90 which establishes coincidence when the coordinates of the hand icon and the machine icon are identical. As a practical matter, the machine control icon occupies a given area or region, with coincidence with the hand icon being detected when the hand icon position is within the limited machine icon area. When the machine icon is a button or switch, then the coincidence of the hand icon over the machine icon switch button activates that particular button after a predetermined period of time for continued coincidence. Alternatively, when the machine control icon has a moveable element such as a slider bar, then upon the occurrence of coincidence of the hand icon with the slider for a given time it is considered that this element has been captured. After capture of this element then movement of the hand icon effectuates a like movement of the slider such that the slider is made to move in the direction that the hand icon moves, namely the direction of the hand gesture.

In one embodiment, if the hand icon moves in the direction that the slider is designed to move, then the slider is allowed to move in accordance with the hand gesture. However, if the hand icon moves in a direction orthogonal to that of the allowed slider movement, then the slider is released and the control of the slider relinquished. Thus control of the slider is relinquished by moving the hand icon in a non-allowed direction.

A detailed implementation of this process is described in the program, written in C and C++, presented hereinafter.

By way of further explanation, referring now to FIG. 4, a robust system for hand gesture recognition is illustrated in which camera 70 has its output digitized by a video digitizer 100 which in turn is coupled to an image processing unit 102 that converts the pixel representation of the image into an orientation representation. The orientation representation is in the form of unit vectors, each having an angular orientation corresponding to an edge in the image, with the edge being a rapid light/dark discontinuity. In terms of detecting a predetermined hand gesture, pixels and the image are converted to needle map unit vector representation, with the unit vector needles running in the general direction of a hand image edge. For instance, if one considers a point about an inch down from the top of the index finger, and the index finger in pointing in the given direction, then the unit vector needle will carry the angular position of this portion of the finger. What is provided can be seen by the needle map shown in FIG. 4B in which a number of points at edges on the hand are provided with the appropriate unit vector needles.

The orientation representation, as can be seen, results in needle-like unit vectors, each emanating from one point on the image of the hand and running in general in the direction of the edge corresponding to that point. It has been found, that rather than utilizing raw image intensity, color, or any other parameter, a more robust hand gesture recognition system is accomplished through the conversion of pixels to orientation representations. It is this orientation representation of the hand gesture which is initially mapped into hand template 74, in which the template is initially formed from an output of processor 102 through the utilization of a hand template generator 104. It is the purpose of this generator, when the output of processor 102 is switched thereto via switch 106, to provide a template specific to the particular individual's hand in a particular hand gesture position. The result is a needle map which is stored at 108 as a template against which incoming needle maps are compared and correlated.

Having generated such a unit vector needle map, incoming video, when converted to the orientation representation, is compared by normalized correlation unit 110 to the needle map template which is stored. Correlation values across the image are generated, with a peak selection unit 112 providing an indication not only of the degree of correlation of the particular incoming hand gesture with the stored hand template, but also that region of the scene which contains this peak correlation is identified. A purpose of the peak selection unit is therefore to identify where in the scene the hand gesture exists as well as recognizing the fact of a predetermined hand gesture. Thus peak selection unit 112 assists in the position recognition associated with unit 76 of FIG. 3.

Graphics overlay display generation is accomplished as shown at 114 to combine the functions of processor 80 and screen driver 82 of FIG. 3. Moreover, the conversion of the peak location to television commands as illustrated at 116 combines the functions of icon coincidence detector 90, icon movement detector 92 and machine control signal generator 94 of FIG. 3.

Figure 5:
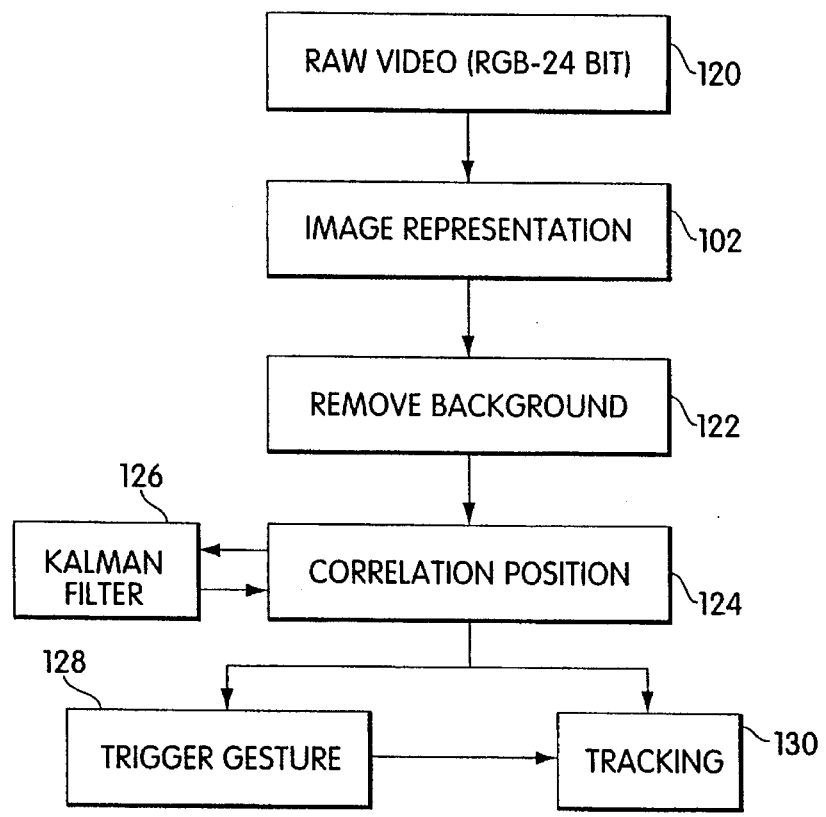
FIG. 5 is a processing flow chart for the processing of raw video signals through image representation, background removal, correlation position detection, trigger gesture and tracking signal generation followed by on-screen controls and the remote control of a television, also illustrating template generation.
Figure 6:
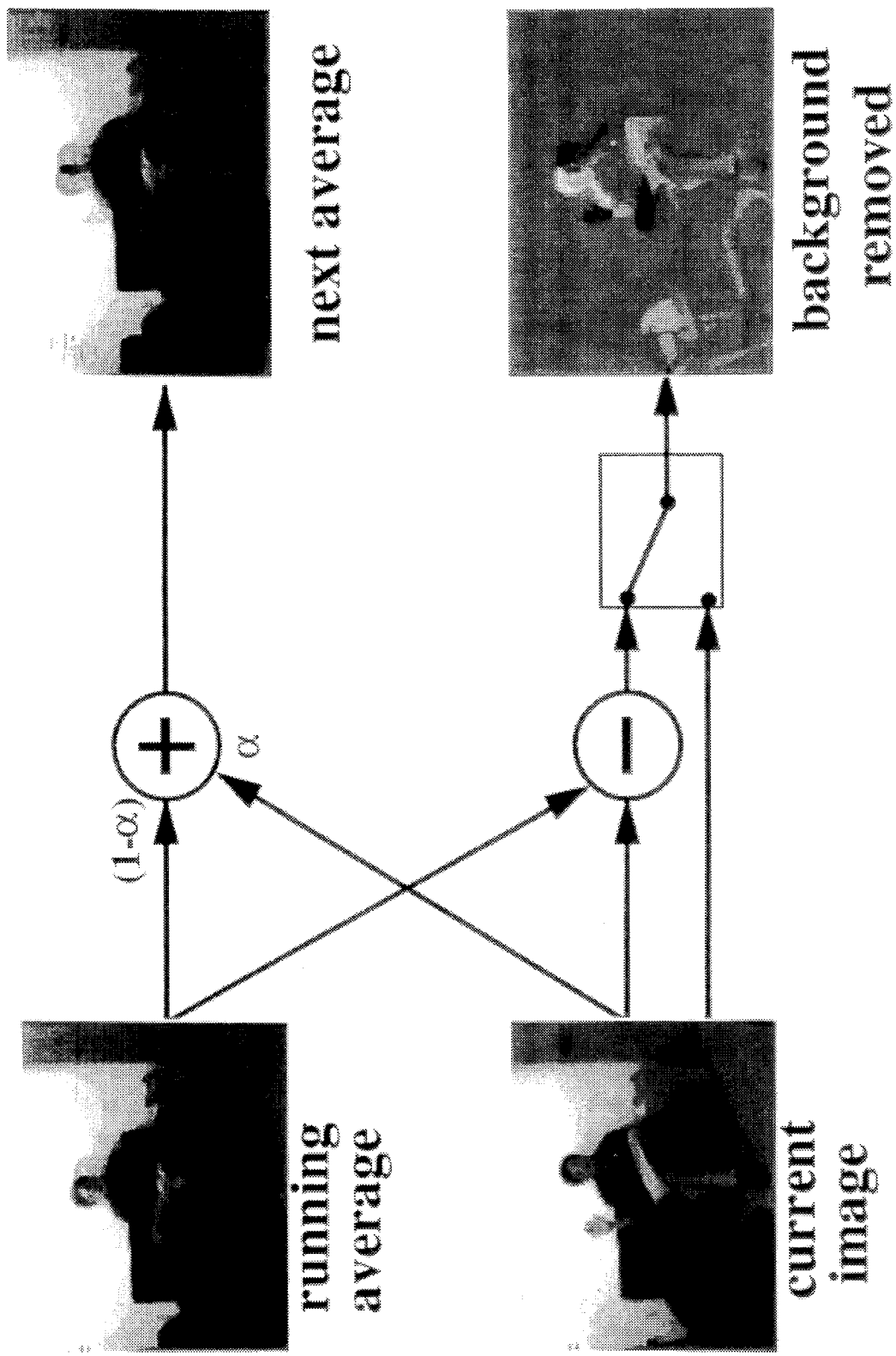
FIG. 6 is a diagrammatic and block illustration for a system of background removal, also illustrating actual photographs of the images for which the background removal is accomplished; and, FIG. 7 is a diagrammatic representation of diagnostic screens or windows utilized in the analysis of the operation of the system of FIG. 3.

Referring now to FIG. 5 as can be seen raw video in terms of red, green, blue 24 bit representation from video digitizer 120 is utilized in the image processor 102 of FIG. 4A. After the conversion to the orientation representation of the image, background is removed by a specialized processor 122 which, as illustrated in FIG. 6, a running average of the scene is summed with the current image to provide a next average, with the running average being compared with the current image to provide for background removal. Where the running average differs from the current image by more than some threshold value, then that region of the image is determined to be a non-background region and is processed normally. Where the running average differs from the current image by less than that threshold, those regions are determined to be background and are ignored for the purposes of correlation.

The normalized correlation of FIG. 4A is utilized in correlation position unit 124 which optionally utilizes a kalman filter 126 to steady over time the position of the recognized hand gesture. The correlation score is converted to the estimated variance needed by the kalman filter by another sigmoidal function $$V=B+(T-B)/(1+exp(S(\text{correlation}-M)))$$

where V is the estimated variance of the hand position measurement, and typical parameter values are: $T=1.0$, $B=0.5$, $S=70$, and $M=0.375$.

The result of background removal and kalman filtering to provide for accurate correlation position is utilized in a trigger gesture recognition unit 128 to first detect the predetermined hand gesture which is utilized to trigger the system into the control mode. This is the aforementioned "how" sign which is generated through the scanning of the entire scene for the predetermined gesture. Once having detected the trigger gesture, the system enters into the tracking mode as illustrated at 130 such that the movement of the predetermined hand gesture can be tracked to determine the movement of the aforementioned hand icon.

Figure 7:
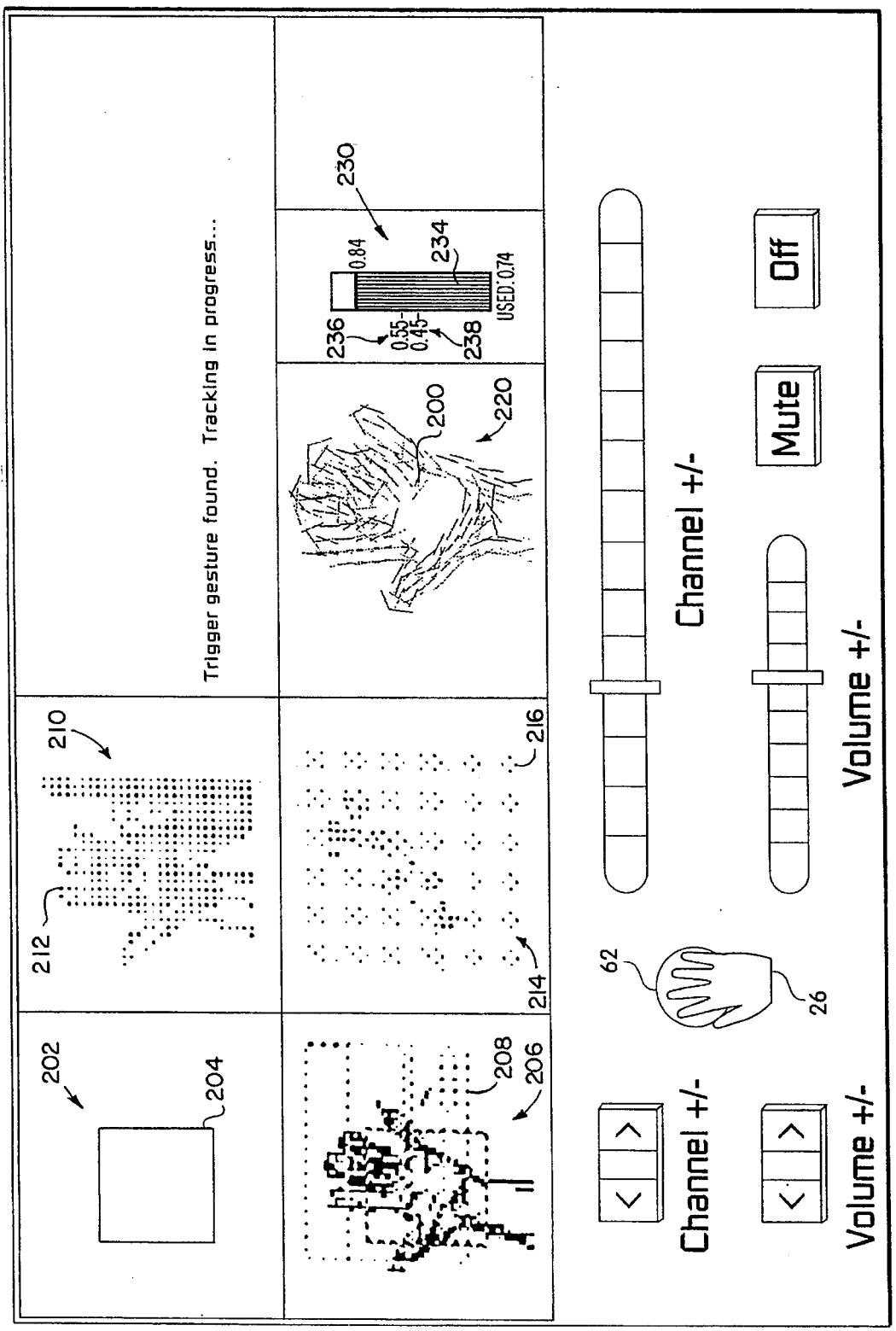

Referring now to FIG. 7 a computer screen window 201 is illustrated which some diagnostic functions that explain the capture of the predetermined hand gesture for an initial trigger and tracking of hand position to move the on-screen hand icon. Here a window 202 includes a rendition of the image viewed by the camera (not shown in the figure), with box 204 indicating that part or region of the image which corresponds to the hand template. It will be appreciated that this window is generated during the tracking mode in which the system has already entered into its control phase, having detected a predetermined hand gesture. Box 204 therefore indicates the location within the scene of the predetermined hand gesture. It will be appreciated that as the hand gesture moves, box 204 moves in a corresponding fashion. Should the score indicating the degree of confidence of hand recognition drop below a predetermined threshold, then the area of search for the hand is increased beyond that indicated by box 204.

Referring now to window 206 it will be appreciated that the image shown in this window, namely image 208, is that of the representation of the hand gesture in terms of orientation vectors. It will also be appreciated that in addition to the orientation representation, this screen is also utilized to analyze contrast. If the contrast is below a certain threshold value, no orientation needles are drawn in that region. Window 206 therefore permits a visual inspection as to which orientation vectors are used and which are not.

Window 210 provides a diagnostic tool to indicate the degree to which background is removed. For instance, that which is depicted in white as opposed to black are the locations which are determined to contain foreground elements. This representation is shown at 212. In general this window depicts as white what the system is looking at, with all background objects such as chairs, pictures, tables, walls, etc., being eliminated from this view.

Window 214 is a diagnostic tool in which image 216 is a representation of the degree of correlation for each point in the image with the template to which it is matched. The whiter the image at a point, the higher the degree of correlation, with an image at window 114 providing the degree of correlation to the template. Additionally, in the hand acquisition mode, this image is quite large indicating that the computer is looking over a broad region of the image to determine the existence of a trigger signal. Thereafter image 216 is considerably smaller because after having acquired the hand gesture and the location in the scene at which the hand gesture is likely to occur, the search for the position of maximum correlation can be restricted to locations near the previously calculated position of maximum correlation. The reason that the image analyzed by the subsystem is made smaller after initial hand gesture detection is to permit the system to more rapidly track the hand motion.

Referring now to window 220, this window enables visual analysis of the closeness of the needle map associated with the template to the needle map associated with the image. Here, the needle map of the detected hand is overlain with a needle map of the template. Thus there are two needle map representations, with the first needle map being that associated with the template and the second being that associated with the region of the image which has the maximum correlation with the template. This window is thus utilized to analyze whether the system is tracking a hand or some other object which has similar unit vector orientations. The system in one embodiment provides a diagnostic image in which those needles that are closely correlated with the template are in one color, whereas those needles not so closely correlated are in a second color.

Referring to window 230, a diagnostic bar graph or thermometer representation 232 is utilized to indicate the maximum correlation value for all of the correlations of the image in window 214 such that not only is the maximum correlation value detected, its value is depicted by the thermometer indicator 234 so that a visual representation of the overall degree of correlation is presented. In the bar graph depicted it will be appreciated that a first value 236 is required for initial detection of the triggering hand gesture, whereas a second value 238 is that below which the maximum correlation value cannot descend if the hand gesture is to remain verified.

While the above invention has been described in connection with hand gestures, it will be appreciated that gestures from any body part can be utilized for machine control. In general, any object which can be manipulated in free space can perform the function of the predetermined hand gesture, and as such systems which recognize predetermined objects in a scene, along with the movement thereof are within the scope of this invention.

A program listing in C and C++ which implements the above-described system is presented in the Appendix hereto.

Having above indicated several embodiments of the subject invention, it will occur to those skilled in the art that modifications and alternatives can be practiced within the spirit of the invention. It is accordingly intended to define the scope of the invention only as indicated in the following claims.

APPENDIX

```
/**************************************************************
    arrows.cc Bill Freeman, Craig Weissman
    MERL, Cambridge
    7/94

Source file for arrows control.
    This object is a derived class of the control class.
    The arrow control is meant to be used together with a slider
    (currently horizontal). This control does not send any
commands
    to the remote, rather it increments or decrements the slider
    which takes care of remote functions.

position: 0 - Both sides dark
              1 - Left side lit
              2 - Right side lit

**************************************************************/ include <stdlib.h> include "arrows.h"
include "panel.h"
include "remote.h"
#include "sound.h"

/**************************************************************/

// Constructor

Arrows::Arrows(Rectangle r1, char *nme, Control *cp)
{
  type = ARROWS;
  x = r1.pos.x; y = r1.pos.y; w = r1.w; h = r1.h;
  name = new char[strlen(name) + 1]; strcpy(name,nme);

// Unlike other controls, Arrows must be connected to a slider.
  connected_control = cp;
  position = 0;

// Draw the unmarked arrow into a pixmap
  CreatePixmap();
  RaisedRectangle(pixmap,HIGHLIGHT,HIGHLIGHT,w-2*HIGHLIGHT,h-2*HIGHLIGHT,
          gc,lgrey_gc,dgrey_gc);

XDrawLine(dpy,pixmap,black_gc,round(w*2.0/5.0),2*HIGHLIGHT+HIGH
IGHT/2,
         round(w*2.0/5.0),h-2*HIGHLIGHT-HIGHLIGHT/2);

XDrawLine(dpy,pixmap,black_gc,round(w*3.0/5.0),2*HIGHLIGHT+HIGH
IGHT/2,
         round(w*3.0/5.0),h-2*HIGHLIGHT-HIGHLIGHT/2);
  XDrawString(dpy,pixmap,red_gc,w/2-
XTextWidth(bigfstr,name,strlen(name))/2,
          h+BIG_FONT_HT+font_depth,name,strlen(name));
}

/**************************************************************/

// Draw the marks on top of the control void
Arrows::DrawMark()
{
```

```
   int flag = 0;
   if (IsCursor()) { flag = 1; DrawCursor(OFF); }

// First create the arrow mark polygons

XPoint p1[] = { {x+w/8,y+h/2}, {x+w/4,y+h/4},
{x+round(5.0*w/16),y+h/4},
            {x+round(3.0*w/16),y+h/2} };
   XPoint p2[] = { {x+w/8,y+h/2}, {x+w/4,y+round(3.0*h/4)},
            {x+round(5.0*w/16),y+round(3.0*h/4)},
            {x+round(3.0*w/16),y+h/2} };
   XPoint p3[] = { {x+round(7.0*w/8),y+h/2},
{x+round(3.0*w/4),y+h/4},
            {x+round(11.0*w/16),y+h/4},
{x+round(13.0*w/16),y+h/2} };
   XPoint p4[] = { {x+round(7.0*w/8),y+h/2},
            {x+round(3.0*w/4),y+round(3.0*h/4)},
            {x+round(11.0*w/16),y+round(3.0*h/4)},
            {x+round(13.0*w/16),y+h/2}};

// Position 0 means both black
   if (position == 0) {

XFillPolygon(dpy,main_win,black_gc,p1,4,Convex,CoordModeOrigin)

XFillPolygon(dpy,main_win,black_gc,p2,4,Convex,CoordModeOrigin)

XFillPolygon(dpy,main_win,black_gc,p3,4,Convex,CoordModeOrigin)

XFillPolygon(dpy,main_win,black_gc,p4,4,Convex,CoordModeOrigin)

// Position 1 means left marks are red
   } else if (position == 1) {

XFillPolygon(dpy,main_win,red_gc,p1,4,Convex,CoordModeOrigin);

XFillPolygon(dpy,main_win,red_gc,p2,4,Convex,CoordModeOrigin);

XFillPolygon(dpy,main_win,black_gc,p3,4,Convex,CoordModeOrigin)

XFillPolygon(dpy,main_win,black_gc,p4,4,Convex,CoordModeOrigin)

// Position 2 means right marks are red
   } else if (position == 2) {

XFillPolygon(dpy,main_win,black_gc,p1,4,Convex,CoordModeOrigin)

XFillPolygon(dpy,main_win,black_gc,p2,4,Convex,CoordModeOrigin)

XFillPolygon(dpy,main_win,red_gc,p3,4,Convex,CoordModeOrigin);

XFillPolygon(dpy,main_win,red_gc,p4,4,Convex,CoordModeOrigin);
   } if (flag) DrawCursor(ON);
   return;
}

/****************************************************************
*/

// Perform the appropriate display changes for the given action void
Arrows::PerformAction(Action action)
{
   switch (action) {
   case Left:
```

```
      // Light up the left marks. Decrement the attached slider
      if (position != 1) {
        ArrowsSound();
        position = 1; Draw();
      }
      if (connected_control) connected_control-
>PerformAction(Left);
      break;

case Right:

// Light up the right marks. Increment the attached slider
      if (position != 2) {
        ArrowsSound();
        position = 2; Draw();
      }
      if (connected_control) connected_control-
>PerformAction(Right);
      break;

case Press:

// Light up the right marks. Increment the attached slider
      if (position) {
        position = 0; Draw();
      }
      break;

default:
      break;
   }
   return;
}

/***************************************************************

// If control is an Arrows then cast it as such. Otherwise
return NULL

Arrows *may_be_arrows(Control *control)
{
   if (arrowsp(control))
      return (Arrows *)control;
   else
      return NULL;
}

/***************************************************************

// Return true iff the control is a arrows int
arrowsp(Control *control)
{
   return (control->type == ARROWS);
}

/***************************************************************

// Perform the appropriate action to this control given the
cursor's
// position void
Arrows::Adjust(Position pos)
{
   struct timeval now;
   struct timezone ignore;
```

```
    // If we are in the middle of the arrows then immediately
reflect
    // that
    if (pos.x >= x + round(w*3.0/8.0) &&
        pos.x < x + round(w*5.0/8.0)) {
      if (position != 0)
        PerformAction(Press);
      gettimeofday(&start_time,&ignore);

} else {

// We can only incrment an arrow if the proper time has
elapsed
      gettimeofday(&now,&ignore);
      if (ElapsedTime(&now,&start_time) > ACTIVITY_THRESH) {
        start_time = now; // For next increment
        if (pos.x < x + round(w*3.0/8.0))
        PerformAction(Left);
        else if (pos.x >= x + round(w*5.0/8.0))
        PerformAction(Right);
      }
    }
    return;
}

/*************************************************************

// Perform the appropriate actions for this control when it goe
// out of focus void
Arrows::DeActivate()
{
  activity = 0;
  if (highlight_flag == True) {
    highlight_flag = False;
    Draw();
  } else
    Error("Attempt to deactivate an already deactive control");
  position = 0;
  DrawMark();
  return;
}

/************************************************************* button.cc

Bill Freeman, Craig Weissman
  MERL, Cambridge
  7/94

Source file for button control

*************************************************************/ include <stdlib.h> include "button.h"
include "panel.h"
include "remote.h"
#include "sound.h"

/*************************************************************/

// Constructor

Button::Button(Rectangle r1, char *nme1, char *nme2,
               char *rem_nme, int pos)
```

```
{
  // Set basic parameters
  type = BUTTON;
  x = r1.pos.x; y = r1.pos.y; w = r1.w; h = r1.h;

// Copy the strings
  name = new char[strlen(nme1) + 1]; strcpy(name,nme1);
  name2 = new char[strlen(nme2) + 1]; strcpy(name2,nme2);
  remote_name = new char[strlen(rem_nme) + 1];
strcpy(remote_name,rem_nme);

// Paint the control into a pixmap
  CreatePixmap();
  RaisedRectangle(pixmap,HIGHLIGHT,HIGHLIGHT,w-2*HIGHLIGHT,h-
2*HIGHLIGHT,
          gc,lgrey_gc,dgrey_gc);
  XDrawRectangle(dpy,pixmap,black_gc,2*HIGHLIGHT,2*HIGHLIGHT,
          w-4*HIGHLIGHT,h-4*HIGHLIGHT);

// Buttons take a certain amount of time before they become
active
  activity_thresh = ACTIVITY_THRESH;
  position = pos;
}

/**************************************************************/

// Draw the mark on top of the control
void
Button::DrawMark()
{
  int flag = 0;
  if (IsCursor()) { flag = 1; DrawCursor(OFF); }

// The mark consists of the word that appears on the button
  if (position)
    XDrawString(dpy,main_win,black_gc,
          x+w/2-XTextWidth(bigfstr,name,strlen(name))/2,
          y+h/2+BIG_FONT_HT/2,name,strlen(name));
  else
    XDrawString(dpy,main_win,black_gc,
          x+w/2-XTextWidth(bigfstr,name2,strlen(name2))/2,
          y+h/2+BIG_FONT_HT/2,name2,strlen(name2));

if (flag) DrawCursor(ON);
  return;
}

/**************************************************************/

// When a button is activated it immediately becomes pressed to
void
Button::Activate()
{
  if (highlight_flag == False) {

// Start the timer so that we know when to turn off the
highlight
    struct timezone ignore;
    gettimeofday(&start_time,&ignore);
    highlight_flag = True;

// Press the button
    PerformAction(Press);
    Draw();

} else
```

```
      Error("Attempt to activate an already active control");
    return;
}

/***************************************************************/

// When the control panel tells a button to deactivate it means
// that the cursor has left the button, so now we clean that
flag and
// allow reentry into the control.

void
Button::DeActivate()
{
  activity = 0;

// If necessary (it might already be off from Adjust)
dehighlight
  if (highlight_flag) {
    highlight_flag = 0;
    Draw();
  }
  return;
}

/***************************************************************
*/

// Perform the appopriate action for the button.
// Also tell the cursor hwo to move afterwards.

void
Button::PerformAction(Action action)
{
  switch (action) {
  case Clear:

// When a button gets the clear signal (i.e. when the volum
control
    // is moved manually while mute has been pressed), we retur
the button
    // to the 0 position
    position = 0;
    Draw();
    break;

case Press:

// Toggle the position and either send the clear or restore
(for muting)
    // message to the attached control
    ButtonSound();
    if (position) {
      position = 0;
      if (connected_control) connected_control-
>PerformAction(Restore);
    } else {
      position = 1;
      if (connected_control) connected_control-
>PerformAction(Clear);
    }
    SendToRemote(remote_name);
    break;

default:
    break;
  }
  return;
}
```

```c
/****************************************************************

// If control is a button then cast it as such, Otherwise NULL

Button *may_be_button(Control *control)
{
  if (buttonp(control))
    return (Button *)control;
  else
    return NULL;
}

/****************************************************************

// Return true iff the control is a button int
buttonp(Control *control)
{
  return (control->type == BUTTON);
}

/****************************************************************

// If the cursor remains on top of the control for long enough
// then it will lose highlight void
Button::Adjust(Position pos)
{
  // We can only incrment an arrow if the proper time has
elapsed
  if (highlight_flag) {
    struct timeval now;
    struct timezone ignore;
    gettimeofday(&now,&ignore);
    if (ElapsedTime(&now,&start_time) > ACTIVITY_THRESH) {
      highlight_flag = 0;
      Draw();
    }
  }
  return;
}

/**************************************************************** clrrep.cc

Bill Freeman, Craig Weissman
   MERL, Cambridge
   6/94

Representation dependent image routines for the hand tracking
   tv program based on color.

****************************************************************/ include <math.h>
include "rep.h"      // Copy clrrep.h to this file before
compiling
include "quadfit.h"
include "search.h"
include "gc.h"
include "filter.h"
include "edit.h"
include "video.h"
```

```c
char rep_name[] = "clr";

#define Red(x)    ((x) > 80)
#define Yellow(x) ((x) > 60 && (x) <= 80)
#define Blue(x)   ((x) > 40 && (x) <= 60)
#define Green(x)  ((x) > 20 && (x) <= 40)
#define White(x)  ((x) >= 0 && (x) <= 20)

#define BWVAL(im) \
(round(0.33*(im)->g+0.33*(im)->b+0.33*(im)->r+128))

/*************************************************************/

// File I/O routines for reading and writing the filter files void
WriteOneFilterPos(FILE *fp, FilterDataRep *fil)
{
   fprintf(fp,"%d,%d,%d,%d,%d\n",fil->xoffset,fil->yoffset,
          int(fil->data.r),int(fil->data.g),int(fil->data.b));
   return;
}

/*************************************************************/ int
ReadOneFilterPos(FILE *fp, FilterDataRep *fil, int i)
{
   int r,g,b;
   if (fscanf(fp,"%d,%d,%d,%d,%d,\n",&fil->xoffset,
             &fil->yoffset,&r,&g,&b) != 5) {
     printf("Could not read position %d. Continuing.\n\n",i);
     return -1;
   } else {
     fil->data.r = (unsigned char)r;
     fil->data.g = (unsigned char)g;
     fil->data.b = (unsigned char)b;
   }
   fil->on_flag = 1;
   return 0;
}

/*************************************************************
*/ void
DrawFilterMark(Window win,int x,int y,DataRep *im)
{
   DrawBW(win,x,y,BWVAL(im));
   return;
}

/*************************************************************
*/ void
DrawImageMark(Pixmap win,int x,int y,DataRep *im)
{
   DrawBW(win,x,y,BWVAL(im));
   return;
}

/*************************************************************
*/ void
DrawToggleFilterMark(Window win,FilterDataRep *fil,float factor
{
```

```
   int x = round((XOffset(fil)-curr_fil-
>minx+PAD*sub_w)*factor)>>sh;
   int y = round((YOffset(fil)-curr_fil-
>miny+PAD*sub_h)*factor)>>sh;
   if (fil->on_flag) {
     DrawBWBox(edit_win, x, y,BWVAL(&fil->data));
     XDrawPoint(dpy,edit_win,red_gc,x,y);
   } else {
     DrawBWBox(edit_win, x, y, 0);
     XDrawPoint(dpy,edit_win,red_gc,x,y);
   }
   return;
}

/***************************************************************
*/ void
DrawEditFilterMark(Window win,FilterDataRep *fil,float
factor,FPosition pos)
{
   int x = round((XOffset(fil)-curr_fil-
>minx+PAD*sub_w)*factor)>>sh;
   int y = round((YOffset(fil)-curr_fil-
>miny+PAD*sub_h)*factor)>>sh;

if (!IsEditFilter()) {

// Find the point in the image that was dotted with this
segment
     int im_x = round((pos.x-srch.pos.x+XOffset(fil))/sub_w);
     int im_y = round((pos.y-srch.pos.y+YOffset(fil))/sub_h);
     DataRep *im = &image[im_row_length*im_y+im_x];

// See how far apart they are
     float val = sqrt((fil->data.r - im->r)*(fil->data.r - im->r
+
                   (fil->data.g - im->g)*(fil->data.g - im->g) +
                   (fil->data.b - im->b)*(fil->data.b - im->b));

// Draw the appropriately colored mark
     if (Red(val))
        XFillRectangle(dpy, edit_win, red_gc, x-2, y-2,4,4);
     else if (Yellow(val))
        XFillRectangle(dpy, edit_win, yellow_gc, x-2, y-2,4,4);
     else if (Blue(val))
        XFillRectangle(dpy, edit_win, blue_gc, x-2, y-2,4,4);
     else if (Green(val))
        XFillRectangle(dpy, edit_win, green_gc, x-2, y-2,4,4);
     else if (White(val))
        XFillRectangle(dpy, edit_win, gc, x-2, y-2,4,4);

} else {
     DrawBWBox(edit_win,x,y,BWVAL(&fil->data));
     XDrawPoint(dpy,edit_win,red_gc,x,y);
   }
   return;
}

/***************************************************************
*/ void
DrawEditImageMark(Window,int,int,DataRep *,float) {}

/***************************************************************
/ void
```

```
DrawLegend(Window win,int leg_x,int leg_w,int leg_h)
{
  if (!IsDebugMode())
    return;

XDrawRectangle(dpy,win,gc,leg_x,0,leg_w,leg_h);
  XFillRectangle(dpy,win,gc,leg_x+1,1,leg_w-2,round(leg_h/5.0)-
1);

XFillRectangle(dpy,win,green_gc,leg_x+1,round(leg_h/5.0),leg_w-
2,
            round(leg_h/5.0));

XFillRectangle(dpy,win,blue_gc,leg_x+1,round(2*leg_h/5.0),leg_w
2,
            round(leg_h/5.0));

XFillRectangle(dpy,win,yellow_gc,leg_x+1,round(3*leg_h/5.0),leg
w-2,
            round(leg_h/5.0));

XFillRectangle(dpy,win,red_gc,leg_x+1,round(4*leg_h/5.0)+1,leg_
-2,
            round(leg_h/5.0)-1);
  return;
}

/*************************************************************
*/

// Find the position of best match with the given filter and
// store it in measurment. Return the maximum score and let
frac_used
// contain the fraction of filter positions that were used in
the
// match.

float
Correlate(FilterRep *filp, MotionVector& measurement, float&
frac)
{
  XFillRectangle(dpy,pixmap,black_gc,0,0,im_w>>sh,im_h>>sh);
  frac = 1.0;
  int valids; // Number of valid image locations for this filte
position.

float conv_sum, im_sum_sqr, fil_sum_sqr, l[3];

// Make sure filter isn't blank
  if (!filp->nm) Error("Correlate() called with blank filter");

// Initialize the return values in case nothing found
  float max_result = 0.0;
  measurement.pos.x = srch.pos.x;
  measurement.pos.y = srch.pos.y;

// Loop through the filter and image with these
  register FilterDataRep *fil;
  register DataRep *im = image;
  FilterDataRep *lastfil = &filp->array[filp->nm];
  int jump_to_next_row = im_row_length - srch.w/sub_w;
  DataRep *lastim = &image[im_row_length*(srch.h/sub_h-1)+
srch.w/sub_w];
  DataRep *tempim, *last_on_this_row, *save_im = image;

fil_sum_sqr = 0;
  for (fil = filp->array; fil < lastfil; fil++)
    fil_sum_sqr += (long(l[0] = fil->data.r) * l[0] +
                long(l[1] = fil->data.g) * l[1] +
```

```
              long(l[2] = fil->data.b) * l[2]);

// Make sure filter sum isn't zero
  if (fabs(fil_sum_sqr) < 0.001 )
    Error("Correlate() called with blank filter");

// int count = 0;
  while (im < lastim) { last_on_this_row = im + srch.w/sub_w;
    while (im < last_on_this_row) {

// Perform the summations over the image
      conv_sum = im_sum_sqr = 0; valids = 0;
      for (fil = filp->array; fil < lastfil ; fil++) {
    tempim =
(im+YOffset(fil)/sub_h*im_row_length+XOffset(fil)/sub_w);
      if (!tempim->invalid) {
        conv_sum += (long(fil->data.r) * (l[0]=int(tempim->r)) +
                long(fil->data.g) * (l[1]=int(tempim->g)) +
                long(fil->data.b) * (l[2]=int(tempim->b)));
        im_sum_sqr += (long(l[0]) * l[0] +
                long(l[1]) * l[1] +
                long(l[2]) * l[2]);
        valids ++;
      }
      } im->score = (im_sum_sqr > 0) ?
      conv_sum / sqrt(float(fil_sum_sqr)*
              (filp->nm*float(im_sum_sqr)/valids)) : 0.0;

int x = ((im-image) % im_row_length)*sub_w + srch.pos.x;
      int y = ((im-image) / im_row_length)*sub_h + srch.pos.y;
      if (SHOW_SCORES && IsDebugMode())
      DrawBW(pixmap,x,y,(unsigned char)round(im->score*255));

// If the value is biggest than save it
      if (im->score > max_result)  {
      measurement.pos.x = x; measurement.pos.y = y;
      max_result = im->score;
      save_im = im;
      }
      im ++;
    }
    im += jump_to_next_row;
  }

XCopyArea(dpy,pixmap,score_win,gc,0,0,im_w>>sh,im_h>>sh,0,0);

// Perform the quadratic maximization over neighboring values
to
  // arrive at subpixel resolution.
  float xoffset, yoffset, max;
  QuadraticFit((save_im-im_row_length-1)->score,
            (save_im-im_row_length)->score,
            (save_im-im_row_length+1)->score,
            (save_im-1)->score,(save_im)->score,(save_im+1)-
>score,
            (save_im+im_row_length-1)->score,
            (save_im+im_row_length)->score,
            (save_im+im_row_length+1)-
>score,xoffset,yoffset,max);
  if (INTERPOLATE) {
    measurement.pos.x += xoffset;
    measurement.pos.y += yoffset;
  }
  FILE *fp = fopen("quad","w");
  fprintf(fp,
```

```
            "%.2f %.2f %.2f\n"
            "%.2f %.2f %.2f\n"
            "%.2f %.2f %.2f\n\n"
            "xoff = %f, yoff = %f, max = %f\n",
            (save_im-im_row_length-1)->score,
            (save_im-im_row_length)->score,
            (save_im-im_row_length+1)->score,
            (save_im-1)->score,(save_im)->score,(save_im+1)->score,
            (save_im+im_row_length-1)->score,
            (save_im+im_row_length)->score,
            (save_im+im_row_length+1)->score,xoffset,yoffset,max);
    fclose(fp);

float new_score;
    //   if (IsTracking())
    //     BestFilter(save_im,new_score);
    //   else
    new_score = max_result;

// Make a data file showing the best match
    if (MAKE_HELP_FILE)
      MakeHelpFile(filp,measurement,max_result);

return new_score;
  }

/****************************************************************
***/

// This routine is meant to dump image and filter data to a fil
// for examining.

// This function is not up to date for this representation void
MakeHelpFile(FilterRep *filp,MotionVector& measurement,float
max_result)
{
  /*
  int x,y,x1,y1;

FilterDataRep *fil = filp->array;
  FilterDataRep *save_fil;
  FILE *fp = fopen("help","w");
  float val;

x1 = round(measurement.pos.x - filp->w/2 - 2 * sub_w);
  x1 -= x1 % sub_w;
  y1 = round(measurement.pos.y - filp->h/2 - 2 * sub_h);
  y1 -= y1 % sub_h;

// Print the header
  fprintf(fp,"%d, %d, %f:\n\n",round(measurement.pos.x),
       round(measurement.pos.y),max_result);
  fprintf(fp,"          ");
  for (x = x1; x < x1 + filp->w + 4 * sub_w; x += sub_w)
     fprintf(fp,"%3d  ",x);
  fprintf(fp,"\n\n");

// Loop down the rows
  for (y = y1; y < y1 + filp->h + 4 * sub_h; y += sub_h) {

// Print the x coords of the image
    fprintf(fp,"%3d: ",y);
    for (x = x1; x < x1 + filp->w + 4 * sub_w; x += sub_w) {
      if ((val = image[im_row_length*(y-srch.pos.y)/sub_h+
                 (x-srch.pos.x)/sub_w].xdouble) + 0.05 >= 0)
        fprintf(fp," %.1f ",val);
      else
```

```
      fprintf(fp,"%.1f ",val);
       //      printf("%f,%.1f\n",val,val);
    }
    fprintf(fp,"\n");

// Print the y coords of the image
    fprintf(fp,"       ");
    for (x = x1; x < x1 + filp->w + 4 * sub_w; x += sub_w) {
      if ((val = image[im_row_length*(y-srch.pos.y)/sub_h +
                 (x-srch.pos.x)/sub_w].ydouble) + 0.05 >= 0)
      fprintf(fp," %.1f ",val);
      else
      fprintf(fp,"%.1f ",val);
    }
    fprintf(fp,"\n");

// Print the x coords of the filter
    fprintf(fp,"       ");
    save_fil = fil;
    for (x = x1; x < x1 + filp->w + 4 * sub_w; x += sub_w) {
      if (y == measurement.pos.y + YOffset(fil) &&
        x == measurement.pos.x + XOffset(fil)) {
      if ((val =   fil->data.xdouble) + 0.05 > 0)
        fprintf(fp," %.1f ",val);
      else
        fprintf(fp,"%.1f ",val);
      fil++;
       } else
      fprintf(fp,"       ");
    }
    fprintf(fp,"\n");

// Print the y coords of the filter
    fprintf(fp,"       ");
    fil = save_fil;
    for (x = x1; x < x1 + filp->w + 4 * sub_w; x += sub_w ) {
      if (y == measurement.pos.y + YOffset(fil) &&
        x == measurement.pos.x + XOffset(fil)) {
      if ((val = fil->data.ydouble) + 0.05 > 0)
        fprintf(fp," %.1f ",val);
      else
        fprintf(fp,"%.1f ",val);
      fil++;
       } else
      fprintf(fp,"       ");
    }
    fprintf(fp,"\n");
  }
  fclose(fp);
  */
  return;
}
/************************************************************* control.cc

Bill Freeman, Craig Weissman
  MERL, Cambridge
  6/94

Source code for routines that implement the virtual
  controls for the hand tracking tv program.

*************************************************************/ include <stdlib.h>
include <math.h>
include <X11/Xlib.h>
```

```c
#include "types.h"
#include "control.h"
include "panel.h"

/*************************************************************
   MEMBER-FUNCTIONS
 *************************************************************/

/*************************************************************/

// States of control activity:
//
//    0 - The start time needs to be initiated
//    1 - The start time is valid so we check if enough time
//        has elapsed to go to state 2
//    2 - Control shoulb be active // Return true iff the control is currently highlighted
int Control::IsActive() { return (activity == 2); }

// Check if the control should become highlighted. This happend
// when a certain amount of time has elapsed after the control
// was initially entered.

void Control::CheckNewActivity()
{
  struct timezone ignore;

// Control has yet to be entered, so record start time
  if (activity == 0) {
    gettimeofday(&start_time,&ignore);
    activity = 1;
    return;

// The control has already been entered and the time recorded
  // however, we must check that enough time has expired } else if (activity == 1) {
    struct timeval now;
    gettimeofday(&now,&ignore);
    if (ElapsedTime(&now,&start_time) > activity_thresh)
      activity = 2;
    return;
  }
}

// Make the control completely inactive so that it must first
// be entered again void Control::ClearActivity() { activity = 0; }

/*************************************************************/

// Completely Draw the control on the screen including highligh
and
// mark if any void
Control::Draw()
{
  int flag = 0;
  if (IsCursor()) { flag = 1; DrawCursor(OFF); }
  DrawPixmap();
  if (highlight_flag) DrawHL();
  DrawMark();
  if (flag) DrawCursor(ON);
  return;
}
```

```
/****************************************************************/

// Draw the Highlight box around the control void
Control::DrawHL()
{
  int flag = 0;
  if (IsCursor()) { flag = 1; DrawCursor(OFF); }
  XFillRectangle(dpy,main_win,hl_gc,x,y,w,HIGHLIGHT);
  XFillRectangle(dpy,main_win,hl_gc,x,y,HIGHLIGHT,h);
  XFillRectangle(dpy,main_win,hl_gc,x+w-
HIGHLIGHT,y,HIGHLIGHT,h);
  XFillRectangle(dpy,main_win,hl_gc,x,y+h-
HIGHLIGHT,w,HIGHLIGHT);
  if (flag) DrawCursor(ON);
  return;
}

/****************************************************************/

// Returns true iff rect is covering some part of the control int Control::IsInside(Rectangle cursor,Rectangle hot_spot)
{
  return IsVisible() &&
    (cursor.pos.x+hot_spot.pos.x+hot_spot.w > x &&
     cursor.pos.y+hot_spot.pos.y+hot_spot.h > y &&
     cursor.pos.x+hot_spot.pos.x < x+w &&
     cursor.pos.y+hot_spot.pos.y < y+h);
}

/****************************************************************/

// Draws the control without the mark or highlight void
Control::DrawPixmap()
{
  int flag = 0;
  if (IsCursor()) { flag = 1; DrawCursor(OFF); }

XCopyArea(dpy,pixmap,main_win,gc,0,0,w,h+BIG_FONT_HT+font_depth
5,x,y);
  if (flag) DrawCursor(ON);
  return;
}

/****************************************************************/

// Clears the area of the screen where the control is located.

void
Control::UnDraw()
{
  int flag = 0;
  if (IsCursor()) { flag = 1; DrawCursor(OFF); }
  XClearArea(dpy,main_win,x,y,w,h+BIG_FONT_HT+NAME_SPC+5,False)
  if (flag) DrawCursor(ON);
  return;
}

/****************************************************************/

// Make a pixmap containing the control in its original form
before
// any mark movement occurs. This allows redrawing the control
later.
```

```
void
Control::CreatePixmap()
{
  pixmap =
XCreatePixmap(dpy,main_win,w,h+BIG_FONT_HT+font_depth+5,
              DefaultDepth(dpy,screen));

XFillRectangle(dpy,pixmap,black_gc,0,0,w,h+BIG_FONT_HT+font_dep
h+5);
   return;
}

/**************************************************************/

// Hook one control up to another. The control pointer to is th
// servant of the control that is an instance of this class.

void
Control::ConnectToControl(Control *cp)
{
   connected_control = cp;
}

/**************************************************************/

// Perform activation routines when the control becomes active void
Control::Activate()
{
   if (highlight_flag == False) {
     highlight_flag = True;
     Draw();
   } else
     Error("Attempt to activate an already active control");
   return;
}

/**************************************************************/

// Perform deactivation routines as if cursor left the control void
Control::DeActivate()
{
   activity = 0;
   if (highlight_flag == True) {
     highlight_flag = False;
     Draw();
   } else
     Error("Attempt to deactivate an already deactive control");
   return;
}

/**************************************************************/

// Make the control appear or disappear from the screen void
Control::TurnVisibility(int flag)
{
   if (flag == ON) {
     Draw();
   } else if (flag == OFF) {
     UnDraw();
   } else
     Error("Invalid flag in Control::TurnVisibility()");
   visibility = flag;
```

```
   return;
}

/****************************************************************
   NON-MEMEBER FUNCTIONS
****************************************************************/

// Return a pointer to the contorl that is being covered by
// rect. If none exists then return NULL Control *
InsideControl(Rectangle cursor,Rectangle hot_spot) {
  for (Control *cp = Control::list; cp ; cp = cp -> next) {
    if (cp->IsInside(cursor,hot_spot))
      return cp;
  }
  return NULL;
}

/****************************************************************/

// Draw a shadowed rounded rectangle with the given dimensions void
RoundedRectangle(Pixmap pixmap,int x,int y,int w,int h,GC top,
            GC middle, GC bottom,int thickness)
{
  XPoint p2[4],p3[4];

p2[1].x = x; p2[1].y = y;
  p2[2].x = x; p2[2].y = y + thickness;
  p2[3].x = x + w; p2[3].y = y + thickness;
  p2[0].x = x + w + thickness; p2[0].y = y;

p3[1].x = x - thickness; p3[1].y = y + h;
  p3[2].x = x; p3[2].y = y + h - thickness;
  p3[3].x = x + w + 1; p3[3].y = y + h - thickness;
  p3[0].x = x + w + 1; p3[0].y = y + h;

XFillArc(dpy,pixmap,top,x-h/2,y,h,h,90*64,180*64);
  XFillArc(dpy,pixmap,bottom,x+w-h/2,y,h,h,270*64,180*64);
  XFillArc(dpy,pixmap,middle,x-h/2+thickness,y+thickness,
        h-2*thickness,h-2*thickness,90*64,180*64);
  XFillArc(dpy,pixmap,middle,x+w-h/2+thickness,y+thickness,
        h-2*thickness,h-2*thickness,270*64,180*64);
  XFillPolygon(dpy,pixmap,top,p2,4,Convex,CoordModeOrigin);
  XFillPolygon(dpy,pixmap,bottom,p3,4,Convex,CoordModeOrigin);
  XFillRectangle(dpy,pixmap,middle,x,y+thickness,
            w+1,h-2*thickness);
  return;
}

/****************************************************************/

// Draw a shadowed rounded vertical rectangle with the given
dimensions void
RoundedVertRectangle(Pixmap pixmap,int x,int y,int w,int h,GC top,
            GC middle, GC bottom,int thickness)
{
  XPoint p2[4],p3[4];

p2[1].x = x; p2[1].y = y;
  p2[2].x = x + thickness; p2[2].y = y;
  p2[3].x = x + thickness; p2[3].y = y + h;
  p2[0].x = x; p2[0].y = y + h;
```

```
    p3[1].x = x + w - thickness; p3[1].y = y;
    p3[2].x = x + w; p3[2].y = y;
    p3[3].x = x + w; p3[3].y = y + h;
    p3[0].x = x + w - thickness; p3[0].y = y + h;

XFillArc(dpy,pixmap,top,x,y-w/2,w,w,0,180*64);
    XFillArc(dpy,pixmap,bottom,x,y+h-w/2,w,w,180*64,180*64);
    XFillArc(dpy,pixmap,middle,x+thickness,y-w/2+thickness,
            w-2*thickness,w-2*thickness,0,180*64);
    XFillArc(dpy,pixmap,middle,x+thickness,y+h-w/2+thickness,
            w-2*thickness,w-2*thickness,180*64,180*64);
    XFillPolygon(dpy,pixmap,top,p2,4,Convex,CoordModeOrigin);
    XFillPolygon(dpy,pixmap,bottom,p3,4,Convex,CoordModeOrigin);
    XFillRectangle(dpy,pixmap,middle,x+thickness,y,w-
2*thickness,h);
    return;
}

/*************************************************************/

// Draw a shadows rectangle with the given dimensions void
RaisedRectangle(Pixmap pixmap,int x,int y,int w,int h,GC top,
            GC middle, GC bottom,int thickness)
{
    XPoint p1[4],p2[4],p3[4],p4[4];

p1[1].x = x; p1[1].y = y;
    p1[2].x = x + thickness; p1[2].y = y + thickness;
    p1[3].x = x + thickness; p1[3].y = y + h - thickness;
    p1[0].x = x; p1[0].y = y + h;

p2[1].x = x; p2[1].y = y;
    p2[2].x = x + thickness; p2[2].y = y + thickness;
    p2[3].x = x + w - thickness; p2[3].y = y + thickness;
    p2[0].x = x + w; p2[0].y = y;

p3[1].x = x; p3[1].y = y + h;
    p3[2].x = x + thickness; p3[2].y = y + h - thickness;
    p3[3].x = x + w - thickness; p3[3].y = y + h - thickness;
    p3[0].x = x + w; p3[0].y = y + h;

p4[1].x = x + w; p4[1].y = y + h;
    p4[2].x = x + w - thickness; p4[2].y = y + h - thickness;
    p4[3].x = x + w - thickness; p4[3].y = y + thickness;
    p4[0].x = x + w; p4[0].y = y;

XFillPolygon(dpy,pixmap,top,p1,4,Convex,CoordModeOrigin);
    XFillPolygon(dpy,pixmap,top,p2,4,Convex,CoordModeOrigin);
    XFillPolygon(dpy,pixmap,bottom,p3,4,Convex,CoordModeOrigin);
    XFillPolygon(dpy,pixmap,bottom,p4,4,Convex,CoordModeOrigin);
    XFillRectangle(dpy,pixmap,middle,x+thickness,y+thickness,
            w-2*thickness,h-2*thickness);
    return;
}

/*************************************************************/

// Draw a shadowed disc with the given dimensions void
RaisedCircle(Pixmap pixmap, int x, int y, int w, int h)
{
    XFillArc(dpy,pixmap,lgrey_gc,x,y,w,h,0,23040);
    XFillArc(dpy,pixmap,gc,x,y,w,h,2880,11520);
    XFillArc(dpy,pixmap,dgrey_gc,x+HIGHLIGHT/2,y+HIGHLIGHT/2,w-
HIGHLIGHT,
        h-HIGHLIGHT,0,23040);
```

```
  return;
}
/**************************************************/

// Return the number of milliseconds between two times long ElapsedTime(struct timeval *t1,struct timeval *t2)
{
  long t = (((t1->tv_sec - 1 - t2->tv_sec) * 1000) +
           (t1->tv_usec + 1000000 - t2->tv_usec)/1000);
  return t;
}

/*************************************************
  dial.cc

Bill Freeman, Craig Weissman
  MERL, Cambridge
  7/94

Source file for dial control

**************************************************/ include <math.h>
include "dial.h"
#include "panel.h"

/**************************************************/ const float ANGLE_MAX = 3*PI/4; // Start default angle for dial
const float ANGLE_MIN = PI/4;   // Stop default angle for dials
const float TICK_THICK = 0.03; // Angle offsets for the tick
marks on dials

/**************************************************/

// Constructor

Dial::Dial(Circle c1, int ticks, const char *nme,
          const char *left_nme, const char *right_nme,
          int pos, float max, float min, int dot_dist, int
tick_len,
          int dot_rad)
{
  // Set basic parameters
  type = DIAL;
  r = c1.r;
  x = c1.pos.x - r - HIGHLIGHT; y = c1.pos.y - r - HIGHLIGHT;
  w = h = 2 * (r+HIGHLIGHT);
  num_ticks = ticks;

// Copy the string
  name = new char[strlen(nme)+1]; strcpy(name,nme);
  remote_name = new char[strlen(left_nme)+1];
strcpy(remote_name,left_nme);
  remote_name2 = new char[strlen(right_nme)+1];
strcpy(remote_name2,right_nme);

// Set other parameters
  position = (pos == DEF) ? ticks / 2 : pos;
  max_angle = (max == DEF) ? ANGLE_MAX : max;
  min_angle = (min == DEF) ? ANGLE_MIN : min;
  dot_distance = (dot_dist == DEF) ? round(r * 0.2) : dot_dist;
```

```
    dot_radius = (dot_rad == DEF) ? round(r * 0.1) : dot_rad;
    tick_length = (tick_len == DEF) ? round(r * 0.1) : tick_len;

// Draw the control into the pixmap
    CreatePixmap();
    DrawInto(pixmap,0,0);
}

/**************************************************************/

// This allows us to draw into different pixmaps/windows void
Dial::DrawInto(Window win,int u,int v)
{
    RaisedCircle(win,u+w/2-r,v+h/2-r,2*r,2*r);

// Make the tick marks
    XPoint poly[4];
    for (float theta = max_angle; theta > (min_angle - 0.1);
         theta -= (max_angle - min_angle) / (num_ticks - 1)) {
       poly[0].x = u + round(w/2 + r * cos(theta-TICK_THICK));
       poly[0].y = v + round(h/2 - r * sin(theta-TICK_THICK));
       poly[1].x = u + round(w/2 + r * cos(theta+TICK_THICK));
       poly[1].y = v + round(h/2 - r * sin(theta+TICK_THICK));
       poly[2].x = u + round(w/2 + (r + tick_length) *
cos(theta+TICK_THICK));
       poly[2].y = v + round(h/2 - (r + tick_length) *
sin(theta+TICK_THICK));
       poly[3].x = u + round(w/2 + (r + tick_length) * cos(theta-
TICK_THICK));
       poly[3].y = v + round(h/2 - (r + tick_length) * sin(theta-
TICK_THICK));
       XFillPolygon(dpy,win,gc,poly,4,Convex,CoordModeOrigin);
    }
    XDrawString(dpy,win,red_gc,u+w/2-
XTextWidth(bigfstr,name,strlen(name))/2,
            v+h+BIG_FONT_HT+font_depth,name,strlen(name));
    return;
}

/**************************************************************/

// True iff cursor is inside control int
Dial::IsInside(Rectangle cursor,Rectangle hot_spot)
{
    if (!IsVisible()) return 0;
    if (IsActive())
      return (cursor.pos.x+hot_spot.pos.x+hot_spot.w > x &&
          cursor.pos.y+hot_spot.pos.y+hot_spot.h > y &&
          cursor.pos.x+hot_spot.pos.x < x+w &&
          cursor.pos.y+hot_spot.pos.y < y+h);
    else {

Rectangle dot;
      float angle = float(position) / (num_ticks-1) * (min_angle -
max_angle) +
          max_angle;
      int xpos = round(x + w/2 + (r-dot_distance)*cos(angle));
      int ypos = round(y + h/2 - (r-dot_distance)*sin(angle));
      dot.pos.x = xpos-dot_radius;
      dot.pos.y = ypos-dot_radius;
      dot.w = dot.h = 2*dot_radius;
      return (cursor.pos.x+hot_spot.pos.x+hot_spot.w > dot.pos.x
&&
          cursor.pos.y+hot_spot.pos.y+hot_spot.h > dot.pos.y &&
          cursor.pos.x+hot_spot.pos.x < dot.pos.x + dot.w &&
```

```
                cursor.pos.y+hot_spot.pos.y < dot.pos.y + dot.h);
    }
}
/**************************************************************/
// Draw the mark on top of the dial
void
Dial::DrawMark()
{
    float angle = float(position) / (num_ticks-1) * (min_angle -
max_angle) +
        max_angle;
    int xpos = round(x + w/2 + (r-dot_distance)*cos(angle));
    int ypos = round(y + h/2 - (r-dot_distance)*sin(angle));
    XFillArc(dpy,main_win,mark_gc,xpos-dot_radius,ypos-dot_radius
            2*dot_radius,2*dot_radius,0,23040);
    return;
}
/**************************************************************
*/
// Perform the appropriate actions for a dial given an action
message
// Also tells the cursor where to go afterwards
void
Dial::PerformAction(Action action)
{
    switch (action) {
    case LeftSpin:
        if (position) {
            position--;
            Draw();
            if (connected_control) connected_control-
>PerformAction(Left);
        } break;
    case RightSpin:
        if (position < num_ticks - 1) {
            position++;
            Draw();
            if (connected_control) connected_control-
>PerformAction(Right);
        } break;
    default:
        break;
    }
    return;
}
/**************************************************************
*/
// Return the dial mark to its original vertical position
void
Dial::ReturnToMiddle()
{
    while (position < num_ticks/2) {
        position++; Draw();
    }
    while (position > num_ticks/2) {
        position--; Draw();
    }
    return;
}
```

```c
/***************************************************************
// If the control is a dial then cast it as such, Otherwise NUL Dial *may_be_dial(Control *control)
{
  if (dialp(control))
    return (Dial *)control;
  else
    return NULL;
}

/***************************************************************
// Return 1 iff the control is a dial int
dialp(Control *control)
{
  return (control->type == DIAL);
}

/*************************************************************** void
Dial::DrawHL()
{
  int flag = 0;
  if (IsCursor()) { flag = 1; DrawCursor(OFF); }
  XFillArc(dpy,main_win,hl_gc,x,y,w,h,0,23040);
  DrawInto(main_win,x,y);
  if (flag) DrawCursor(ON);
  return;
}

/*************************************************************** void
Dial::Adjust(Position pos)
{
  int dx = (pos.x - (x + r + HIGHLIGHT));
  int dy = -(pos.y - (y + r + HIGHLIGHT));
  float theta = atan2(dy,dx);
  int hand_pos =
    round((max_angle - theta) / ((max_angle-
min_angle)/(num_ticks-1)));
  if (hand_pos < 0 || hand_pos >= num_ticks)
    return;
  if (hand_pos < position)
    while (position > hand_pos) PerformAction(LeftSpin);
  if (hand_pos > position)
    while (position < hand_pos) PerformAction(RightSpin);

return;
}

/***************************************************************
* digital.cc

Bill Freeman, Craig Weissman
   MERL, Cambridge
   8/94

Routines for digital numbers for hand tracking tv program
```

```c
/****************************************************************
/
#include <X11/Xlib.h>
#include <stdio.h>
include "globals.h"
#include "digital.h"
/****************************************************************
***/

// Draw a digital number n at position p with height h void
DrawDigital(Position p, int n, int h)
{
  char s[4];
  if (n < 10)
    sprintf(s,"0%d",n);
  else
    sprintf(s,"%d",n);
  XClearArea(dpy,main_win,p.x,p.y,round(h*0.6)*2,h+1,False);
  for (int i = 0; i < strlen(s); i++)
    DrawDigit(round(s[i]-'0'),p.x+round(h*0.6*i),p.y,h/2);

return;
}

/***************************************************************/

// Draw a digital digit d at position x and y with LED length l void
DrawDigit(int d, int x, int y, int l)
{

// Thickness of the segments
  int L = round(l/10.0);

// For the six LED units that are quadrilaterals, determine the
  // the actual screen coordinates if we were to light them up XPoint polys[][4] =
    {
      { {x+1,y}, {x+l-1,y}, {x+l-L-1,y+L}, {x+L+1,y+L} },
      { {0,0}, {0,0}, {0,0}, {0,0} },
      { {x+1,y+2*l}, {x+l-1,y+2*l}, {x+l-L-1,y+2*l-L},
{x+L+1,y+2*l-L} },
      { {x,y+1}, {x,y+l-1}, {x+L,y+l-L-1}, {x+L,y+L+1} },
      { {x+l,y+1}, {x+l,y+l-1}, {x+l-L,y+l-L-1}, {x+l-L,y+L+1}
},
      { {x,y+l+1}, {x,y+2*l-1}, {x+L,y+2*l-L-1}, {x+L,y+l+L+1}
},
      { {x+l,y+l+1}, {x+l,y+2*l-1}, {x+l-L,y+2*l-L-1}, {x+l-
L,y+l+L+1} },

};

// Compute the coordinates of the middle segment (six
vertices)

XPoint polymid[] =
    { {x+2,y+l}, {x+L,y+l-L+2}, {x+l-L,y+l-L+2},
      {x+l-2,y+l}, {x+l-L,y+l+L-2}, {x+L,y+l+L-2} };

// The following information describes which segments are lit
  // up for each different digit
```

```
  int digits[][7] =
    { {1,0,1,1,1,1,1},
      {0,0,0,0,1,0,1},
      {1,1,1,0,1,1,0},
      {1,1,1,0,1,0,1},
      {0,1,0,1,1,0,1},
      {1,1,1,1,0,0,1},
      {1,1,1,1,0,1,1},
      {1,0,0,0,1,0,1},
      {1,1,1,1,1,1,1},
      {1,1,0,1,1,0,1}
    };

// Go ahead and light up the appropriate segments for this
digit for (int i = 0; i < 7; i++)
    if (digits[d][i]) {
      if (i != 1)
    XFillPolygon(dpy,main_win,red_gc,polys[i],4,Convex,CoordMc
eOrigin);
      else
    XFillPolygon(dpy,main_win,red_gc,polymid,6,Convex,CoordMoć
Origin);
    }
  return;
}

/*************************************************************** edit.cc

Bill Freeman, Craig Weissman
  MERL, Cambridge
  7/94

Routines for the edit image of the filter, and for editting
  the filter.

***************************************************************/ include "globals.h"
include "rep.h"
#include "edit.h"
#include "filter.h"
#include "search.h"
#include "video.h"
include "message.h"
include "instructions.h"
include "panel.h"
#include "track.h"
#include "gc.h"

// Size of the legend
const int leg_h = (im_h/5)>>sh;
const int leg_w = (im_w/10)>>sh;
const int leg_x = (im_w>>sh)-leg_w;

static int EditFilter_on = 0;

/***************************************************************
/
void
ChangeFilterPoint(int x1, int y1, int flag)
{
  int x2,y2,dist;

float factor = ComputeFactor();
```

```
  float min_dist = 100000.0;
  FilterDataRep *min_fil = curr_fil->array, *fil;

if (!curr_fil->nm) {
    Message("Cannot remove from blank filter.\n");
    return;
  }
  for (fil = curr_fil->array; fil < &curr_fil->array[curr_fil-
>nm]; fil++) {
    x2 = round((XOffset(fil)-curr_fil-
>minx+PAD*sub_w)*factor)>>sh;
    y2 = round((YOffset(fil)-curr_fil-
>miny+PAD*sub_h)*factor)>>sh;
    dist = (x2-x1)*(x2-x1) + (y2-y1)*(y2-y1);
    if (dist < min_dist) {
      min_fil = fil;
      min_dist = dist;
    }
  }
  switch (flag) {
  case TOGGLE:
    min_fil->on_flag = (min_fil->on_flag) ? 0 : 1;
    break;
  case OFF:
    min_fil->on_flag = 0;
    break;
  case ON:
    min_fil->on_flag = 1;
  }
  DrawToggleFilterMark(edit_win,min_fil,factor);
  return;
}

/***************************************************************
/

// Remove all filter points between given coordinates void
RemoveEditBlock(int x1, int y1, int x2, int y2)
{
  float f = ComputeFactor();
  for (float x = x1; x <= x2; x += f*sub_w)
    for (float y = y1; y <= y2; y += f*sub_h)
      ChangeFilterPoint(round(x),round(y),OFF);
  return;
}

/***************************************************************
/ void
FinalizeEditFilter()
{
  FilterDataRep *fil, *end = curr_fil->array;
  for (fil = curr_fil->array; fil < &curr_fil->array[curr_fil-
>nm]; fil++)
    if (fil->on_flag) *end++ = *fil;
  curr_fil->nm = end - curr_fil->array;
  DrawFilters();
  FPosition p;
  SaveFilter();    // This changes minx and miny
  DrawEditFilter(p);
  return;
}

/***************************************************************
*/
```

```
void
DrawEditFilter(FPosition pos)
{
  if (!IsDebugMode())
    return;

XClearWindow(dpy,edit_win);

// Draw the legend box
  if (IsSearch())
    DrawLegend(edit_win,leg_x,leg_w,leg_h);

float factor = ComputeFactor();

// Loop through the filter, drawing all dashes in the
appropriate color
  register FilterDataRep *fil;

for (fil = curr_fil->array; fil < &curr_fil->array[curr_fil-
>nm]; fil++)
    DrawEditFilterMark(edit_win,fil,factor,pos);
  return;
}

/****************************************************************
/

// Return the factor by which image distances will be scaled in
the
// blown up images float
ComputeFactor()
{
  float f;
  int fil_w = curr_fil->w + 2*PAD*sub_w;
  int fil_h = curr_fil->h + 2*PAD*sub_h;
  if (float(fil_w)/fil_h > float((im_w>>sh)-leg_w)/(im_h>>sh))
    f = float(((im_w>>sh)-leg_w)<<sh) / fil_w;
  else
    f = float(im_h) / fil_h;
  return f;
}

/****************************************************************
/ void
DrawEditImage(FPosition pos)
{
  if (!IsDebugMode())
    return;

float factor = ComputeFactor();

// Coordinates in the image that we want to blow up
  int x1 = round((pos.x-srch.pos.x-curr_fil->w/2)/sub_w-PAD);
  int y1 = round((pos.y-srch.pos.y-curr_fil->h/2)/sub_h-PAD);
  int x2 = round((pos.x-srch.pos.x+curr_fil->w/2)/sub_w+PAD);
  int y2 = round((pos.y-srch.pos.y+curr_fil->h/2)/sub_h+PAD);

// The following control the looping through the image
  int edit_width = x2-x1;
  int jump_to_next_row = im_row_length - edit_width;
  DataRep *firstim = &image[im_row_length*y1+x1];
  DataRep *lastim = &image[im_row_length*y2+x2];
  register DataRep *im = firstim;
  DataRep *last_in_this_row;
```

```
  register int x = 0; register int y = 0;

// Loop through the image, drawing all valid data points
  while (im < lastim) { last_in_this_row = im + edit_width;
    while (im < last_in_this_row) {
      DrawEditImageMark(edit_win,x,y,im,factor);
      x ++; im++;
    }
    y ++; x = 0;
    im += jump_to_next_row;
  }
  return;
}
/***************************************************************
/ void
TurnEditFilter(int flag)
{
  if (flag == ON) {
    TurnSearch(OFF);
    EditFilter_on = 1;
    XClearWindow(dpy,track_win);
    XClearWindow(dpy,change_win);
  } else if (flag == OFF) {
    EditFilter_on = 0;
    XClearWindow(dpy,edit_win);
  } else
    Error("Invalid flag in TurnEdirFilter()");
  Instructions();
  return;
}

/***************************************************************
/ int IsEditFilter()
{
  return EditFilter_on;
}

/***************************************************************
* filter.cc

Bill Freeman, Craig Weissman
  MERL, Cambridge
  6/94

Filter routines for the hand tracking tv program.

Note: filt_index and pos are supposed to be used for
implementing
  multiple templates. That idea has not yet come to fruition so
  even though the hooks have been layed for that (BestFilter
will
  choose the best template for a given position), we are only
  using one template currently. In the future the filter
filename
  might also include those parameters.

Sept. 28, 94.  I do use filt_index now.  pos stays around as
an unused
``` variable, because to take it out would involve too many
changes...
****************************************************************/ include <X11/Xlib.h> include "globals.h"
include "filter.h"
include "message.h"
include "panel.h"
include "search.h"
include "edit.h"
include "gc.h"
include "video.h"

static void SaveFilForBill();

/**************************************************************/

// A pointer to the filter that is currently being used for
// tracking. When multiple filters are used (by making NUM_FILT
or
// NUM_POS bigger) this variable will keep track of the current
filter FilterRep *curr_fil;

// global variables for allowing smooth transition between
chosen best filters.
// See bestfilter. wtf sept. 28, 94
int curr_filt_index, prev_filt_index, curr_pos_index,
prev_pos_index;

// The array of filters. One of these will be pointer to by
curr_fil static FilterRep filter[NUM_FILTS][NUM_POS];

static char msg[1000];

/**************************************************************/

// Create a file with the filter image
void
MakeFilter(int x1, int y1, int x2, int y2)
{
  //// Round off values so that they fall on EVEN grid lines
  x1 -= x1 % sub_w; x2 -= x2 % sub_w;
  y1 -= y1 % sub_h; y2 -= y2 % sub_h;
  if ((x2-x1)/2 % sub_w) x2 += sub_w;
  if ((y2-y1)/2 % sub_h) y2 += sub_h;

//// Check that the coordinates are valid
  if (x2 <= x1 || y2 <= y1) {
    sprintf(msg,"Release point must be beyond mark point.\n"
          "Returning without new filter.\n\n");
    Message(msg); return;
  } else if (x2 - x1 >= 2 * pad_w || y2 - y1 >= pad_h) {
    sprintf(msg,"Filter too wide for padding: %d, %d.\n"
          "Change pad_w, pad_h in video.cc.\n",pad_w,pad_h);
    Message(msg); return;
  }

// Create the filter and calculate nm
  curr_fil->nm = 0;curr_fil->w = x2-x1; curr_fil->h = y2-y1;
```

```cpp
  // Write the data and change the filter array
  // Note: Y var must change slowest in order for help file in
*rep.cc int flag = 0;
  for (register int y = (y1-srch.pos.y)/sub_h;
       y < (y2-srch.pos.y)/sub_h; y++ ) {
    for (register int x = (x1-srch.pos.x)/sub_w;
      x < (x2-srch.pos.x)/sub_w; x++) {

// If there is valid data at this point then copy the
      // image data into the filter if (ShouldBeInFilter(&image[im_row_length*y+x])) {
    SetOffsets(curr_fil->array[curr_fil->nm],
           x*sub_w+srch.pos.x-x1-curr_fil->w/2,
           y*sub_h+srch.pos.y-y1-curr_fil->h/2);
    curr_fil->array[curr_fil->nm].data =
image[im_row_length*y+x];
    curr_fil->array[curr_fil->nm].on_flag = 1;
    curr_fil->nm++;

// Make sure we don't run out of room
    if (curr_fil->nm == MAX_FSIZE) {
      Message("Filter too large for available memory.");
      flag = 1; break;
    }
      }
    }
    if (flag) break;
  }

SaveFilter();
  return;
}

/***************************************************************
*/

// Save the current filter to a file void
SaveFilter()
{
  register FilterDataRep *fil_data;

// Create the file name
  char filename[100];
  int filt_index = (curr_fil - &filter[0][0]) / NUM_POS;
  int pos = (curr_fil - &filter[0][0]) % NUM_POS;

sprintf(filename,"%s.fil.%dx%d.%d%d",rep_name,sub_w,sub_h,filt_
ndex,pos);

//// Open the filter file
  FILE *fp;
  if (!(fp = fopen(filename,"w"))) {
    sprintf(msg,"Could not open %s for writing.\n"
        "Returning without new filter.\n",filename);
    Message(msg); return;
  }

// Determine the actual width and height now since the filter
  // may have been edited
  int minx, maxx, miny, maxy;
  minx = miny = 10000; maxx = maxy = -10000;
  for (fil_data = curr_fil->array;
       fil_data < &curr_fil->array[curr_fil->nm]; fil_data++) {
    minx = MIN(minx,fil_data->xoffset);
```

```
    miny = MIN(miny,fil_data->yoffset);
    maxx = MAX(maxx,fil_data->xoffset);
    maxy = MAX(maxy,fil_data->yoffset);
  }
  curr_fil->minx = minx; curr_fil->miny = miny;
  curr_fil->w = maxx - minx; curr_fil->h = maxy - miny;

//// Write the filter and image dimensions and subsmpling
  fprintf(fp,"%d,%d,%d,%d,%d,%d,%d,%d,%d\n",
       curr_fil->nm,curr_fil->minx,curr_fil->miny,
       curr_fil->w,curr_fil->h,
       im_w,im_h,sub_w,sub_h);

for (fil_data = curr_fil->array;
       fil_data < &curr_fil->array[curr_fil->nm]; fil_data++)
    WriteOneFilterPos(fp,fil_data);

//// Finish up
  fprintf(fp,"\n");
  fclose(fp);
  sprintf(msg,"Filter %d.%d made with dimensions: %d x %d\n"
       "              valid locations: %d.\n\n",
       filt_index,pos,curr_fil->w,curr_fil->h,curr_fil->nm);
  Message(msg);
  SaveFilForBill();
  return;
}
/***************************************************************
*/

// Read all the filters void
GetFilters()
{
  for (int filt_index = 0; filt_index < NUM_FILTS; filt_index++
    for (int pos = 0; pos < NUM_POS; pos++)
      GetFilter(filt_index,pos);
  return;
}

/***************************************************************
*/

// Read the given filter file void
GetFilter(int filt_index,int pos)
{
  FILE *fp;
  int t_im_w, t_im_h, t_sub_w, t_sub_h;

XClearWindow(dpy,filter_win);
  FilterRep *fil = &(filter[filt_index][pos]);

// Create the file name
  char filename[100];
  //  for backward compatibility
  if ((NUM_FILTS == 1 ) && (NUM_POS == 1))
    sprintf(filename,"%s.fil.%dx%d",rep_name,sub_w,sub_h);
  else
 sprintf(filename,"%s.fil.%dx%d.%d%d",rep_name,sub_w,sub_h,filt_
ndex,pos);

// Open the filter file
  if (!(fp = fopen(filename,"r"))) {
    sprintf(msg,"Could not find filter file: %s.",filename);
```

```
      Message(msg,DONT_CLEAR); ClearFilter(fil); return;
   }

// Read and validate dimensions and subsampling
   if (fscanf(fp,"%d,%d,%d,%d,%d,%d,%d,%d,%d\n",
            &fil->nm,&fil->minx,
            &fil->miny,&fil->w,&fil->h,
            &t_im_w,&t_im_h,&t_sub_w,
            &t_sub_h) != 9) {
      sprintf(msg,"Could not read dimensions from %s.",filename);
      Message(msg,DONT_CLEAR); ClearFilter(fil); fclose(fp);
return;
   } else if (fil->nm > MAX_FSIZE) {
      printf("Filter too large for allocated memory.\n"
          "Continuing.\n\n",filename);
      ClearFilter(fil); fclose(fp); return;
   } else if (im_w != t_im_w || im_h != t_im_h ||
            sub_w != t_sub_w || sub_h != t_sub_h) {
      sprintf(msg,"Stored filter: %s and image\n"
           "have different dimensions or sampling.",filename);
      Message(msg,DONT_CLEAR); ClearFilter(fil); fclose(fp);
return;
   }

// Read the data
   register FilterDataRep *fil_data;
   for (fil_data = fil->array; fil_data < &fil->array[fil->nm];
         fil_data++) {
      if (ReadOneFilterPos(fp,fil_data,fil_data-fil->array) == -1
{
         ClearFilter(fil); return;
      }
   }

// Finish up
   fclose(fp);
   sprintf(msg,"Read filter %d.%d: %d x %d, %d x %d, %d.",
         filt_index,pos,fil->w,fil->h,sub_w,sub_h,fil->nm);
   Message(msg,DONT_CLEAR);
   return;
}

/**************************************************************
*/

// Clear all filter entries void
ClearFilter(FilterRep *fil)
{
   fil -> nm = fil -> minx = fil -> miny = fil -> w = fil -> h =
0;
   return;
}

/**************************************************************
*/

// Display the filter orientation maps on the screen void
DrawFilters()
{
   char nm[5];
   register int filt_index,pos;
   int xoffset,yoffset;
   FilterDataRep *fil_data;
   FilterRep *fil;
```

```
      if (!IsDebugMode())
        return;

// Loop through the filters, displaying each
      XClearWindow(dpy,filter_win);
      for (filt_index = 0; filt_index < NUM_FILTS; filt_index++)
        for (pos = 0; pos < NUM_POS; pos++) {

// Calculate where to put the filter in the window
          xoffset =
          round((EXTRA_WIDTH-TRIM)*
                (THERMOMETER_FRACTION+
                 (1-THERMOMETER_FRACTION)*(pos+1.0)/(NUM_POS+1)));
          yoffset =
          round((im_h>>sh)*(filt_index+1.0)/(NUM_FILTS+1));

// Loop through the data and display the marks
          fil = &filter[filt_index][pos];
          for (fil_data = fil->array;
               fil_data < &fil->array[fil->nm]; fil_data++) {

DrawFilterMark(filter_win,xoffset+(XOffset(fil_data)>>sh),
                yoffset+(YOffset(fil_data)>>sh),&fil_data->data);

}

// Print the number of data entries
          sprintf(nm,"%d",fil->nm);
          XDrawString(dpy,filter_win,gc,
                 xoffset-XTextWidth(smallfstr,nm,strlen(nm))/2,
                 yoffset+(fil->h>>sh)/2+15,nm,strlen(nm));
        } if (IsEditFilter()) {
        FPosition p;
        DrawEditFilter(p);
      }
      return;
    }

/**************************************************************

// Choose the first filter in the center void
InitialFilter()
{
    curr_fil = &filter[(NUM_FILTS-1)/2][(NUM_POS-1)/2];
    curr_filt_index = (NUM_FILTS-1)/2;
    curr_pos_index = (NUM_POS-1)/2;
    prev_filt_index = (NUM_FILTS-1)/2;
    prev_pos_index = (NUM_POS-1)/2;
    DrawFilters();
    return;
}

/**************************************************************/

// Find the filter being clicked by the given coordinates void
FindFilter(int x,int y)
{
    x -= round((EXTRA_WIDTH-TRIM)*THERMOMETER_FRACTION);

float x_inc = (EXTRA_WIDTH-TRIM)*(1-
THERMOMETER_FRACTION)/(NUM_POS+1.0);
    float y_inc = (im_h>>sh)/(NUM_FILTS+1.0);
```

```
    int x_index = round(x/x_inc);
    int y_index = round(y/y_inc);
    if (!x_index) x_index = 1;
    if (x_index == NUM_POS+1) x_index = NUM_POS;
    if (!y_index) y_index = 1;
    if (y_index == NUM_FILTS+1) y_index = NUM_FILTS;

curr_fil = &filter[y_index-1][x_index-1];
    DrawFilters();
    return;
}

/***************************************************************/

// Pick the best filter given the image position to match with
/* For final position: take weighted average of all filter
positions,
    weighted by square of their correlation scores.
    sept. 27, 1994  wtf modified and enabled.
 */ void
BestFilter(DataRep *im, MotionVector& measurement, float&
best_score)
{
  FilterRep *fil;
  FilterDataRep *fil_data;
  float score, conv_sum, frac_used, dot, best_x, best_y;
  float meas_x[NUM_FILTS][NUM_POS], meas_y[NUM_FILTS][NUM_POS];
  int locations_used, max_filt_index, max_pos, search_w =
2*sub_w, search_h = 2*sub_h;
  DataRep *tempim;

best_score = -1.0;
  best_x = 0.0;
  best_y = 0.0;
  for (int filt_index = 0; filt_index < NUM_FILTS; filt_index++
    for (int pos = 0; pos < NUM_POS; pos++) { fil = &filter[filt_index][pos];

Correlate_One_Filter(fil, im, search_w, search_h,
measurement, frac_used, score);

meas_x[filt_index][pos] = measurement.pos.x;
      meas_y[filt_index][pos] = measurement.pos.y;

// If the value is biggest then save it
      if (score > best_score) {
    max_filt_index = filt_index;
    max_pos = pos;
    best_score = score;
    best_x = measurement.pos.x;
    best_y = measurement.pos.y;
      }
    }
  if (best_score <= 0.0)
    InitialFilter();
  else {
    // take average of the positions of the 3 previous best
filters.
    measurement.pos.x = (3*best_x +
2*meas_x[curr_filt_index][curr_pos_index] +
      meas_x[prev_filt_index][prev_pos_index])/6.0 ;
    measurement.pos.y = (3*best_y +
2*meas_y[curr_filt_index][curr_pos_index] +
      meas_y[prev_filt_index][prev_pos_index])/6.0 ;

prev_filt_index = curr_pos_index;
```

```
    prev_pos_index = curr_pos_index;
    curr_filt_index = max_filt_index;
    curr_pos_index = max_pos;
    curr_fil = &filter[max_filt_index][max_pos];

DrawFilters();
  }
  return;
}
/***************************************************************
*/

// Dump the image data to disk (doesn't work for sparse filters void
SaveFilForBill()
{
  /*
  FILE *fp = fopen("fil","w");
  for (int i = 0; i < curr_fil->nm; i++)
    fprintf(fp,"%c",curr_fil->array[i].data.g);
  fclose(fp);
  */
  return;
}
/*************************************************************** gc.cc

Bill Freeman, Craig Weissman
  MERL, Cmabridge
  8/94

Graphic context routines for hand tracking tv program

****************************************************************/ include <stdio.h>
include "globals.h"
include "gc.h"
include "panel.h"

/***************************************************************
/

// Create the necessary resources and colors for the graphic
contexts void
CreateGCs()
{
  Colormap cmap = DefaultColormap( dpy, screen );
  XColor red,green,hl,grey,yellow,blue;

// White graphic context
  gc = XCreateGC(dpy, main_win, 0, 0);
  XSetBackground(dpy, gc, BlackPixel(dpy,screen));
  XSetForeground(dpy, gc, WhitePixel(dpy,screen));

// Black graphic context
  black_gc = XCreateGC(dpy, main_win, 0, 0);
  XSetBackground(dpy, black_gc, BlackPixel(dpy,screen));
  XSetForeground(dpy, black_gc, BlackPixel(dpy,screen));

// Red graphic context
  red_gc = XCreateGC(dpy, main_win, 0, 0);
  red.red = 65535; red.green = red.blue = 0;
  if (XAllocColor(dpy,cmap,&red) == 0) {
```

```
    printf("Could not make red color\n");
    red.pixel = WhitePixel(dpy,screen);
  }
  XSetBackground(dpy, red_gc, BlackPixel(dpy,screen));
  XSetForeground(dpy, red_gc, red.pixel);

// Yellow graphic context
  yellow_gc = XCreateGC(dpy, main_win, 0, 0);
  yellow.blue = 0; yellow.green = yellow.red = 65535;
  if (XAllocColor(dpy,cmap,&yellow) == 0) {
    printf("Could not make yellow color\n");
    yellow.pixel = WhitePixel(dpy,screen);
  }
  XSetBackground(dpy, yellow_gc, BlackPixel(dpy,screen));
  XSetForeground(dpy, yellow_gc, yellow.pixel);

// Green graphic context
  green_gc = XCreateGC(dpy, main_win, 0, 0);
  green.green = 65535; green.blue = green.red = 0;
  if (XAllocColor(dpy,cmap,&green) == 0) {
    printf("Could not make green color\n");
    green.pixel = WhitePixel(dpy,screen);
  }
  XSetBackground(dpy, green_gc, BlackPixel(dpy,screen));
  XSetForeground(dpy, green_gc, green.pixel);

// Green graphic context
  blue_gc = XCreateGC(dpy, main_win, 0, 0);
  blue.blue = 65535; blue.green = blue.red = 0;
  if (XAllocColor(dpy,cmap,&blue) == 0) {
    printf("Could not make blue color\n");
    blue.pixel = WhitePixel(dpy,screen);
  }
  XSetBackground(dpy, blue_gc, BlackPixel(dpy,screen));
  XSetForeground(dpy, blue_gc, blue.pixel);

// Hlighlight graphic context
  hl_gc = XCreateGC(dpy, main_win, 0, 0);
  hl.blue = 0; hl.green = 65535/2; hl.red = 65535;
  if (XAllocColor(dpy,cmap,&hl) == 0) {
    printf("Could not make hl color\n");
    hl.pixel = WhitePixel(dpy,screen);
  }
  XSetBackground(dpy, hl_gc, BlackPixel(dpy,screen));
  XSetForeground(dpy, hl_gc, hl.pixel);

// Marking graphic context
  mark_gc = red_gc;

// Create the grey scale colors and graphic contexts
  for (int i = 0; i < NUM_GREYS; i++) {
    greys[i] = XCreateGC(dpy, main_win, 0, 0);

// Color values are evely distibuted, with a slight bias since
    // blacks are hard to distinguish
    grey.red = grey.green = grey.blue = int( 10000 + 55535.0 * / NUM_GREYS);

if (XAllocColor(dpy,cmap,&grey) == 0) {
      printf("Could not make grey %d color\n",i);
      grey.pixel = WhitePixel(dpy,screen);
    }
    XSetBackground(dpy, greys[i], BlackPixel(dpy,screen));
    XSetForeground(dpy, greys[i], grey.pixel);
  }

// Light grey graphic context
  lgrey_gc = greys[LGREY];
```

```
  // Dark grey graphic context
  dgrey_gc = greys[DGREY];

// Change the font
  bigfont = XLoadFont(dpy,"vg-40");
  bigfstr = XQueryFont(dpy,bigfont);
  smallfont = XLoadFont(dpy,"6x10");
  smallfstr = XQueryFont(dpy,smallfont);
  vbigfont = XLoadFont(dpy,"vsg-114");
  vbigfstr = XQueryFont(dpy,vbigfont);

XSetFont(dpy,red_gc,bigfont);
  XSetFont(dpy,black_gc,bigfont);
  XSetFont(dpy,lgrey_gc,bigfont);
  XSetFont(dpy,dgrey_gc,bigfont);
  XSetFont(dpy,gc,smallfont);

// Set the Xor function for certain gc's
  //   XSetFunction(dpy, hl_gc, 6);
  XSetFunction(dpy, green_gc, 6);

return;
}
/****************************************************************
/

// To print the grrey scales void
PrintGreyScales()
{
  for (int i = 0; i < NUM_GREYS; i++)
    XFillRectangle(dpy,main_win,greys[i],50*i,ENTIRE_HEIGHT-
35,50,30);
  return;
}

/****************************************************************
/

// Deallocate graphic contexts void
DestroyGCs()
{
  XFreeGC(dpy,gc);
  XFreeGC(dpy,red_gc);
  XFreeGC(dpy,green_gc);
  XFreeGC(dpy,yellow_gc);
  XFreeGC(dpy,hl_gc);
  XFreeGC(dpy,black_gc);
  //XFreeGC(dpy,mark_gc);
  for (int i = 0; i < NUM_GREYS; i++)
    XFreeGC(dpy,greys[i]);
  return;
}

/****************************************************************
/

// Draw in black and white void
DrawBW(Window win, int x, int y, int val)
{
  if (val < 0) val = 0;
  if (val > 255) val = 255;
```

```
   XDrawPoint(dpy,win,greys[MIN(NUM_GREYS-1,(val / (256 /
NUM_GREYS)+1))],x,y);
   return;
}

/*************************************************************
/

// Draw in black and white void
DrawBWBox(Window win, int x, int y, int val)
{
   if (val < 0) val = 0;
   if (val > 255) val = 255;
   XFillRectangle(dpy,win,greys[MIN(NUM_GREYS-1,(val / (256 /
NUM_GREYS))+1)],
                        x-2,y-2,4,4);
   return;
}

/************************************************************* greenrep.cc

Bill Freeman, Craig Weissman
   MERL, Cambridge
   6/94

Representation dependent image routines for the hand tracking
   tv program based on the green component of color.

*************************************************************/ include <math.h>
include "rep.h"      // Copy greenrep.h to this file before
using
include "quadfit.h"
include "search.h"
include "gc.h"
include "filter.h"
include "edit.h"
include "video.h"

char rep_name[] = "green";

define Red(x)    ((x) > 40)
define Yellow(x) ((x) > 30 && (x) <= 40)
define Blue(x)   ((x) > 20 && (x) <= 30)
define Green(x)  ((x) > 10 && (x) <= 20)
define White(x)  ((x) >= 0 && (x) <= 10)

/*************************************************************/

// File I/O routines for reading and writing the filter files void
WriteOneFilterPos(FILE *fp, FilterDataRep *fil)
{
   fprintf(fp,"%d,%d,%d,%d,%d\n",fil->xoffset,fil-
>yoffset,int(fil->data.r),
        int(fil->data.g),int(fil->data.b));
   return;
}

/*************************************************************/ int
```

```
ReadOneFilterPos(FILE *fp, FilterDataRep *fil, int i)
{
  int r,g,b;
  if (fscanf(fp,"%d,%d,%d,%d,%d,\n",&fil->xoffset,&fil->yoffset
         &r,&g,&b) != 5) {
    printf("Could not read position %d. "
         "Continuing.\n\n",i); return -1;
  } else {
    fil->data.r = (unsigned char)r;
    fil->data.g = (unsigned char)g;
    fil->data.b = (unsigned char)b;
  }
  fil->on_flag = 1;
  return 0;
}

/**************************************************************
*/ void
DrawFilterMark(Window win,int x,int y,DataRep *im)
{
  DrawBW(win,x,y,im->g+128);
  return;
}

/**************************************************************
*/ void
DrawImageMark(Pixmap win,int x,int y,DataRep *im)
{
  DrawBW(win,x,y,im->g+128);
  return;
}

/**************************************************************
*/ void
DrawToggleFilterMark(Window win,FilterDataRep *fil,float factor
{
  int x = round((XOffset(fil)-curr_fil-
>minx+PAD*sub_w)*factor)>>sh;
  int y = round((YOffset(fil)-curr_fil-
>miny+PAD*sub_h)*factor)>>sh;
  if (fil->on_flag)
    DrawBWBox(edit_win, x, y,fil->data.g+128);
  else
    DrawBWBox(edit_win, x, y, 0);
  XDrawPoint(dpy,edit_win,red_gc,x,y);
  return;
}

/**************************************************************
*/ void
DrawEditFilterMark(Window win,FilterDataRep *fil,float
factor,FPosition pos)
{
  int x = round((XOffset(fil)-curr_fil-
>minx+PAD*sub_w)*factor)>>sh;
  int y = round((YOffset(fil)-curr_fil-
>miny+PAD*sub_h)*factor)>>sh;

if (!IsEditFilter()) {
```

```
    // Find the point in the image that was dotted with this
segment
    int im_x = round((pos.x-srch.pos.x+XOffset(fil))/sub_w);
    int im_y = round((pos.y-srch.pos.y+YOffset(fil))/sub_h);
    DataRep *im = &image[im_row_length*im_y+im_x];

float val = abs(fil->data.g - im->g);

// Draw the appropriately colored mark
    if (Red(val))
      XFillRectangle(dpy, edit_win, red_gc, x-2, y-2,4,4);
    else if (Yellow(val))
      XFillRectangle(dpy, edit_win, yellow_gc, x-2, y-2,4,4);
    else if (Blue(val))
      XFillRectangle(dpy, edit_win, blue_gc, x-2, y-2,4,4);
    else if (Green(val))
      XFillRectangle(dpy, edit_win, green_gc, x-2, y-2,4,4);
    else if (White(val))
      XFillRectangle(dpy, edit_win, gc, x-2, y-2,4,4);

} else {
    DrawBWBox(edit_win,x,y,fil->data.g+128);
    XDrawPoint(dpy,edit_win,red_gc,x,y);
  }
  return;
}

/***************************************************************
*/ void
DrawEditImageMark(Window,int,int,DataRep *,float) {}

/***************************************************************
/ void
DrawLegend(Window win,int leg_x,int leg_w,int leg_h)
{
  if (!IsDebugMode())
    return;

XDrawRectangle(dpy,win,gc,leg_x,0,leg_w,leg_h);
  XFillRectangle(dpy,win,gc,leg_x+1,1,leg_w-2,round(leg_h/5.0)-
1);

XFillRectangle(dpy,win,green_gc,leg_x+1,round(leg_h/5.0),leg_w-
2,
            round(leg_h/5.0));

XFillRectangle(dpy,win,blue_gc,leg_x+1,round(2*leg_h/5.0),leg_w
2,
            round(leg_h/5.0));

XFillRectangle(dpy,win,yellow_gc,leg_x+1,round(3*leg_h/5.0),leg
w-2,
            round(leg_h/5.0));

XFillRectangle(dpy,win,red_gc,leg_x+1,round(4*leg_h/5.0)+1,leg_
-2,
            round(leg_h/5.0)-1);
  return;
}

/***************************************************************
*/

// Given an image, a filter, and a mask, store the coordinates
of
```

```c
// the maximum value based on correlation via dot product float
Correlate(FilterRep *filp, MotionVector& measurement, float&
frac)
{
  XFillRectangle(dpy,pixmap,black_gc,0,0,im_w>>sh,im_h>>sh);
  frac = 1.0;
  long conv_sum, im_sum_sqr, fil_sum_sqr, t;
  int valids; // Number of valid image positions for this filte
position // Make sure filter isn't blank
  if (!filp->nm)
    Error("Correlate() called with blank filter");

// Initialize the return values in case nothing found
  float max_result = 0.0;
  measurement.pos.x = srch.pos.x;
  measurement.pos.y = srch.pos.y;

// Loop through the filter and image with these
  register FilterDataRep *fil;
  register DataRep *im = image;
  FilterDataRep *lastfil = &filp->array[filp->nm];
  int jump_to_next_row = im_row_length - srch.w/sub_w;
  DataRep *lastim = &image[im_row_length*(srch.h/sub_h-1)+
srch.w/sub_w];
  DataRep *tempim, *last_on_this_row, *save_im = image;

fil_sum_sqr = 0;
  for (fil = filp->array; fil < lastfil; fil++)
    fil_sum_sqr += long(t = fil->data.g) * t;

// Make sure filter sum isn't zero
  if (fabs(fil_sum_sqr) < 0.001)
    Error("Correlate() called with blank filter");

while (im < lastim) { last_on_this_row = im + srch.w/sub_w;
    while (im < last_on_this_row) {

// Perform the summations based on non-zero locations
      conv_sum = im_sum_sqr = 0; valids = 0;
      for (fil = filp->array; fil < lastfil ; fil++) {
      tempim =
(im+YOffset(fil)/sub_h*im_row_length+XOffset(fil)/sub_w);
      if (!(tempim->invalid)) {
        conv_sum += long(fil->data.g) * (t=int(tempim->g));
        im_sum_sqr += long(t)*t;
        valids++;
      }
    } im->score = (im_sum_sqr > 0) ?
      conv_sum / sqrt(float(fil_sum_sqr)*(filp-
>nm*im_sum_sqr/valids)) : 0;

int x = ((im-image) % im_row_length)*sub_w + srch.pos.x;
      int y = ((im-image) / im_row_length)*sub_h + srch.pos.y;
      if (SHOW_SCORES && IsDebugMode())
      DrawBW(pixmap,x,y,(unsigned char)round(im->score*255));

// If the value is biggest than save it
      if (im->score > max_result) {
      measurement.pos.x = x; measurement.pos.y = y;
      max_result = im->score;
      save_im = im;
```

```
        }
        im ++;
      }
      im += jump_to_next_row;
    }

XCopyArea(dpy,pixmap,score_win,gc,0,0,im_w>>sh,im_h>>sh,0,0);

// Perform the quadratic maximization over neighboring values
to
    // arrive at subpixel resolution.
    float xoffset, yoffset, max;
    QuadraticFit((save_im-DELTA*im_row_length-DELTA)->score,
                 (save_im-DELTA*im_row_length)->score,
                 (save_im-DELTA*im_row_length+DELTA)->score,
              (save_im-DELTA)->score,(save_im)-
>score,(save_im+DELTA)->score,
                 (save_im+DELTA*im_row_length-DELTA)->score,
                 (save_im+DELTA*im_row_length)->score,
                 (save_im+DELTA*im_row_length+DELTA)-
>score,xoffset,yoffset,max);
    if (INTERPOLATE) {
       measurement.pos.x += (xoffset*DELTA);
       measurement.pos.y += (yoffset*DELTA);
    }
    FILE *fp = fopen("quad","w");
    fprintf(fp,
         "%.4f %.4f %.4f\n"
         "%.4f %.4f %.4f\n"
         "%.4f %.4f %.4f\n\n"
         "xoff = %f, yoff = %f, max = %f\n",
         (save_im-im_row_length-1)->score,
         (save_im-im_row_length)->score,
         (save_im-im_row_length+1)->score,
         (save_im-1)->score,(save_im)->score,(save_im+1)->score,
         (save_im+im_row_length-1)->score,
         (save_im+im_row_length)->score,
         (save_im+im_row_length+1)->score,xoffset,yoffset,max);
    fclose(fp);

float new_score;
    //   if (IsTracking())
    //      BestFilter(save_im,new_score);
    //   else
    new_score = max_result;

// Make a data file showing the best match
    if (MAKE_HELP_FILE)
       MakeHelpFile(filp,measurement,max_result);

return new_score;
}
/*
float
Correlate(FilterRep *filp, MotionVector& measurement, float&
frac)
{
    XFillRectangle(dpy,pixmap,black_gc,0,0,im_w>>sh,im_h>>sh);
    frac = 1.0;

long conv_sum[3], im_sum_sqr[3], fil_sum_sqr[3], l[3];
    float f[3];

// Make sure filter isn't blank
    if (!filp->nm) Error("Correlate() called with blank filter");

// Initialize the return values in case nothing found
    float max_result = 0.0;
```

```
   measurement.pos.x = srch.pos.x;
   measurement.pos.y = srch.pos.y;

// Loop through the filter and image with these
   register FilterDataRep *fil;
   register DataRep *im = image;
   FilterDataRep *lastfil = &filp->array[filp->nm];
   int jump_to_next_row = im_row_length - srch.w/sub_w;
   DataRep *lastim = &image[im_row_length*(srch.h/sub_h-1)+
srch.w/sub_w];
   DataRep *tempim, *last_on_this_row, *save_im = image;

fil_sum_sqr[0] = fil_sum_sqr[1] = fil_sum_sqr[2] = 0;
   for (fil = filp->array; fil < lastfil; fil++) {
      fil_sum_sqr[0] += long(l[0] = fil->data.r) * l[0];
      fil_sum_sqr[1] += long(l[1] = fil->data.g) * l[1];
      fil_sum_sqr[2] += long(l[2] = fil->data.b) * l[2];
   }

// Make sure filter sum isn't zero
   if (fabs(fil_sum_sqr[0]) < 0.001 &&
       fabs(fil_sum_sqr[1]) < 0.001 &&
       fabs(fil_sum_sqr[2]) < 0.001)
     Error("Correlate() called with blank filter");

//   int count = 0;
   while (im < lastim) { last_on_this_row = im + srch.w/sub_w;
      while (im < last_on_this_row) {

// Perform the summations over the image
         conv_sum[0] = im_sum_sqr[0] = conv_sum[1] = im_sum_sqr[1]
= 0;
         conv_sum[2] = im_sum_sqr[2] = 0;
         for (fil = filp->array; fil < lastfil ; fil++) {
         conv_sum[0] += long(fil->data.r) *
            (l[0]=int((im+YOffset(fil)/sub_h*im_row_length+
                XOffset(fil)/sub_w)->r));
         im_sum_sqr[0] += long(l[0]) * l[0];
         conv_sum[1] += long(fil->data.g) *
            (l[1]=int((im+YOffset(fil)/sub_h*im_row_length+
                XOffset(fil)/sub_w)->g));
         im_sum_sqr[1] += long(l[1]) * l[1];
         conv_sum[2] += long(fil->data.b) *
            (l[2]=int((im+YOffset(fil)/sub_h*im_row_length+
                XOffset(fil)/sub_w)->b));
         im_sum_sqr[2] += long(l[2]) * l[2];
         } f[0] = (im_sum_sqr[0] > 0) ?
         conv_sum[0] / sqrt(float(fil_sum_sqr[0])*im_sum_sqr[0]) :
0.0;
         f[1] = (im_sum_sqr[1] > 0) ?
         conv_sum[1] / sqrt(float(fil_sum_sqr[1])*im_sum_sqr[1]) :
0.0;
         f[2] = (im_sum_sqr[2] > 0) ?
         conv_sum[2] / sqrt(float(fil_sum_sqr[2])*im_sum_sqr[2]) :
0.0;
         im->score = f[1];
         //      im->score = (f[0]+f[1]+f[2])/3;

int x = ((im-image) % im_row_length)*sub_w + srch.pos.x;
         int y = ((im-image) / im_row_length)*sub_h + srch.pos.y;
         if (SHOW_SCORES && IsDebugMode())
         DrawBW(pixmap,x,y,(unsigned char)round(im->score*255));

// If the value is biggest than save it
         if (im->score > max_result)  {
```

```
      measurement.pos.x = x; measurement.pos.y = y;
      max_result = im->score;
      save_im = im;
        }
        im ++;
      }
      im += jump_to_next_row;
    }

XCopyArea(dpy,pixmap,score_win,gc,0,0,im_w>>sh,im_h>>sh,0,0);

// Perform the quadratic maximization over neighboring values
to
    // arrive at subpixel resolution.
    float xoffset, yoffset, max;
    QuadraticFit((save_im-im_row_length-1)->score,
                 (save_im-im_row_length)->score,
                 (save_im-im_row_length+1)->score,
                 (save_im-1)->score,(save_im)->score,(save_im+1)-
>score,
                 (save_im+im_row_length-1)->score,
                 (save_im+im_row_length)->score,
                 (save_im+im_row_length+1)-
>score,xoffset,yoffset,max);
    if (INTERPOLATE) {
      measurement.pos.x += xoffset;
      measurement.pos.y += yoffset;
    }
    FILE *fp = fopen("quad","w");
    fprintf(fp,
         "%.2f %.2f %.2f\n"
         "%.2f %.2f %.2f\n"
         "%.2f %.2f %.2f\n\n"
         "xoff = %f, yoff = %f, max = %f\n",
         (save_im-im_row_length-1)->score,
         (save_im-im_row_length)->score,
         (save_im-im_row_length+1)->score,
         (save_im-1)->score,(save_im)->score,(save_im+1)->score,
         (save_im+im_row_length-1)->score,
         (save_im+im_row_length)->score,
         (save_im+im_row_length+1)->score,xoffset,yoffset,max);
    fclose(fp);

float new_score;
    //  if (IsTracking())
    //    BestFilter(save_im,new_score);
    //  else
    new_score = max_result;

// Make a data file showing the best match
    if (MAKE_HELP_FILE)
      MakeHelpFile(filp,measurement,max_result);

return new_score;
}
*/

/*****************************************************************
***/

// This routine is meant to dump image and filter data to a fil
// for examining.

// This function is not up to date for this representation
void
MakeHelpFile(FilterRep *filp,MotionVector& measurement,float
max_result)
{
```

```c
/*
int x,y,x1,y1;

FilterDataRep *fil = filp->array;
FilterDataRep *save_fil;
FILE *fp = fopen("help","w");
float val;

x1 = round(measurement.pos.x - filp->w/2 - 2 * sub_w);
x1 -= x1 % sub_w;
y1 = round(measurement.pos.y - filp->h/2 - 2 * sub_h);
y1 -= y1 % sub_h;

// Print the header
fprintf(fp,"%d, %d, %f:\n\n",round(measurement.pos.x),
      round(measurement.pos.y),max_result);
fprintf(fp,"         ");
for (x = x1; x < x1 + filp->w + 4 * sub_w; x += sub_w)
  fprintf(fp,"%3d ",x);
fprintf(fp,"\n\n");

// Loop down the rows
for (y = y1; y < y1 + filp->h + 4 * sub_h; y += sub_h) {

// Print the x coords of the image
  fprintf(fp,"%3d: ",y);
  for (x = x1; x < x1 + filp->w + 4 * sub_w; x += sub_w) {
    if ((val = image[im_row_length*(y-srch.pos.y)/sub_h+
                (x-srch.pos.x)/sub_w].xdouble) + 0.05 >= 0)
     fprintf(fp," %.1f ",val);
     else
     fprintf(fp,"%.1f ",val);
     //       printf("%f,%.1f\n",val,val);
  }
  fprintf(fp,"\n");

// Print the y coords of the image
  fprintf(fp,"       ");
  for (x = x1; x < x1 + filp->w + 4 * sub_w; x += sub_w) {
    if ((val = image[im_row_length*(y-srch.pos.y)/sub_h +
                (x-srch.pos.x)/sub_w].ydouble) + 0.05 >= 0)
     fprintf(fp," %.1f ",val);
     else
     fprintf(fp,"%.1f ",val);
  }
  fprintf(fp,"\n");

// Print the x coords of the filter
  fprintf(fp,"       ");
  save_fil = fil;
  for (x = x1; x < x1 + filp->w + 4 * sub_w; x += sub_w) {
    if (y == measurement.pos.y + YOffset(fil) &&
       x == measurement.pos.x + XOffset(fil)) {
     if ((val =  fil->data.xdouble) + 0.05 > 0)
       fprintf(fp," %.1f ",val);
     else
       fprintf(fp,"%.1f ",val);
     fil++;
    } else
     fprintf(fp,"      ");
  }
  fprintf(fp,"\n");

// Print the y coords of the filter
  fprintf(fp,"       ");
  fil = save_fil;
  for (x = x1; x < x1 + filp->w + 4 * sub_w; x += sub_w ) {
    if (y == measurement.pos.y + YOffset(fil) &&
       x == measurement.pos.x + XOffset(fil)) {
```

```
      if ((val = fil->data.ydouble) + 0.05 > 0)
        fprintf(fp," %.1f ",val);
      else
        fprintf(fp,"%.1f ",val);
      fil++;
      } else
      fprintf(fp,"     ");
    }
    fprintf(fp,"\n");
  }
  fclose(fp);
  */
  return;
}

/************************************************************** instructions.cc

Bill Freeman, Craig Weissman
  MERL, Cambridge
  8/94

Program instructions for hand tracking tv progrm

**************************************************************/ include <stdio.h>
include "globals.h"
include "instructions.h"
include "message.h"

char *Decode(int);

/**************************************************************
/

// Display the instructions in the message window based on the
current
// state of the program void
Instructions()
{
  char msg[1000];

char title[50],v[3][50],e[3][50];

// Searching directions
  if (IsSearch()) {
    sprintf(title,"Searching Directions          ");
    sprintf(v[0],"Make or Edit a Filter       ");
    sprintf(v[1],"(No action)                 ");
    sprintf(v[2],"(No action)                 ");
    sprintf(e[0],"(No action)       ");
    sprintf(e[1],"(No action)       ");
    sprintf(e[2],"(No action)       ");

// Filter creation directions
  } else if (!IsEditFilter()) {
    sprintf(title,"Filter Creation Directions    ");
    sprintf(v[0],"Start Search for Filter     ");
    sprintf(v[1],"Make a New filter           ");
    sprintf(v[2],"Edit the Filter             ");
    sprintf(e[0],"(No action)       ");
    sprintf(e[1],"(No action)       ");
    sprintf(e[2],"(No action)       ");

// Filter editing directions
```

```
  } else {
    sprintf(title,"Filter Editing Directions        ");
    sprintf(v[0],"Start Search for Filter       ");
    sprintf(v[1],"(No action)                   ");
    sprintf(v[2],"Make a New Filter             ");
    sprintf(e[0],"Toggle a Filter Point   ");
    sprintf(e[1],"Remove a Filter Block   ");
    sprintf(e[2],"Commit Filter Changes   ");
  }

// The following appears in the instructions for all states o
the
  // program. We fill in the appropriate toggle conditions here
to let
  // the user know what is on or off sprintf(msg,
       "%s               Ctrl-C to Quit\n\n"
       "Click in      : Video Window                        Edit
Window\n"
       "Left Button   : %s %s\n"
       "Middle Button : %s %s\n"
       "Right Button  : %s %s\n\n"
       "Ctrl-d to Turn Diagnostics %s\n"
       "Ctrl-r to Turn Remote %s\n"
       "Ctrl-s to Turn Score Map %s\n"
       "Ctrl-b to Turn Background Map %s\n\n"
       "Resolution: %d x %d. Subsampling: %d x %d.
Representation: %s\n\n",
       title,v[0],e[0],v[1],e[1],v[2],e[2], Decode(!DEBUGMODE),Decode(!USE_REMOTE),Decode(!SHOW_SCORES),
       Decode(!SHOW_DIFF_MAP),im_w,im_h,sub_w,sub_h,rep_name);
  Message(msg,CLEAR,REFREEZE);
  return;
}

/*************************************************************** char *Decode(int i)
{
  char on[] = "On ";
  char off[] = "Off";

return i ? on : off;
}
/***************************************************************
* kalman.cc

Bill Freeman, Craig Weissman
  MERL, Cambridge
  6/94

Kalman filter routines for the hand tracking tv program.

*************************************************************** include <math.h>
include <stdio.h>
include "globals.h"
include "types.h"
include "kalman.h"

/***************************************************************
*/
```

```
    XFillPolygon(dpy,main_win,lgrey_gc,p1,4,Convex,CoordModeOrigin)
        XFillPolygon(dpy,main_win,gc,p2,3,Convex,CoordModeOrigin);

XFillPolygon(dpy,main_win,lgrey_gc,p3,3,Convex,CoordModeOrigin)

XFillPolygon(dpy,main_win,dgrey_gc,p4,4,Convex,CoordModeOrigin)

XFillPolygon(dpy,main_win,lgrey_gc,p5,4,Convex,CoordModeOrigin)
        XDrawLine(dpy,main_win,dgrey_gc,x+w/2-X,y+h-HIGHLIGHT-Y-
t,x+HIGHLIGHT+t,
                y+h-HIGHLIGHT-t);

// Write the text on top of the shapes

XDrawString(dpy,main_win,black_gc,
                x+round(5.0*w/16)-XTextWidth(bigfstr,"Off",3)/2,
                y+h/2+BIG_FONT_HT/2,"Off",3);
        XDrawString(dpy,main_win,red_gc,x+3*w/4-
XTextWidth(bigfstr,"On",2)/2,
                y+h/2+BIG_FONT_HT/2,"On",2);

} if (flag) DrawCursor(ON);
    return;
}

/****************************************************************
*/

// Perform the appropriate action and tell the cursor where to
go
void
Latch::PerformAction(Action action)
{
  switch (action) {
  case Left:
    if (position) {
      position = 0;
      Draw();
      SendToRemote(remote_name);
    } break;
  case Right:
    if (!position) {
      position = 1;
      Draw();
      SendToRemote(remote_name2);
    } break;
  default:
    break;
  }
  return;
}

/****************************************************************

// If control is a latch then cast it as such. Otherwise return
NULL

Latch *may_be_latch(Control *control)
{
  if (latchp(control))
    return (Latch *)control;
  else
    return NULL;
}
```

```
/***************************************************************
// Return true iff the control is a latch int
latchp(Control *control)
{
  return (control->type == LATCH);
}
/***************************************************************
void
Latch::Adjust(Position pos)
{
  if (position == 1 && pos.x < x + w/2)
    PerformAction(Left);
  else if (position == 0 && pos.x >= x + w/2)
    PerformAction(Right);
  return;
}

/*************************************************************** message.cc

Bill Freeman, Craig Weissman
   MERL, Cambridge
   7/94

Message printing routines for hand tracking tv program.

These routines allow the printing to the message window in
debug
   mode. They allow a header to be frozen so that subsequent
clearings
   of the message window will not affect that header.

***************************************************************/ include <X11/Xlib.h>
include <string.h>
include "globals.h"
include "message.h"
include "panel.h"

// Amount of pixels needed to move down in order that the
message font
// not print above the current height
const int FONT_NEEDS = round(FONT_HT*0.75);

// Where the next cleared message will start from
static int freeze_ht = 0;

// Where the next line of text will print
static int height = 0;

/***************************************************************
***/

// Print text in the message window. CLEAR or DONT_CLEAR
determines
// whether the text will be appended to what is already there.
// FREEZE means that the next message printed will follow this
one,
// even if CLEAR is issued. REFREEZE undoes all previous frees
and
```

```
// therefore starts at the beginning of the window. Use FREEZE
when you
// want to add to an already frozen message void
Message(char *str, int clear_flag, int freeze_flag)
{
  // If we are REFREEZEing then reset the height
  if (freeze_flag == REFREEZE)
    freeze_ht = 0;

// Clear the rest of the window if requested
  if (clear_flag == CLEAR) {
    XFillRectangle(dpy,message_win,black_gc,0,freeze_ht,
                EXTRA_WIDTH+(im_w>>sh),im_h>>sh);
    height = freeze_ht;
  }

// Print the message with line feeds
  char *beginning, line[100];
  char *p = str;
  while (*p) {
    beginning = p;
    while(*p && *p != '\n') p++;
    strncpy(line,beginning,p-beginning);
    line[p-beginning] = '\0';
    XDrawString(dpy,message_win,gc,5,height+FONT_NEEDS,line,p-beginning);
    height += FONT_HT;
    if (*p == '\n') p++;
  }

// Now freeze this height if requested
  if (freeze_flag == FREEZE || freeze_flag == REFREEZE)
    freeze_ht = height;

return;
}

/****************************************************************
* mouse.cc

Bill Freeman, Craig Weissman
  MERL, Cambridge
  8/94

Mouse click processing routines for hand tracking tv program

****************************************************************
/ include "globals.h"
include "mouse.h"
include "message.h"
include "filter.h"
include "instructions.h"
include "panel.h"
include "remote.h"
include "edit.h"

/****************************************************************
*/

// Take care of processing mouse button 1 void
ProcessButton1(XEvent& ev)
```

```
{
  if (ev.xbutton.window == video_win) { if (!MOUSE_DEBUG) {
      if (IsSearch()) {
      if (IsTracking())
        TurnTracking(OFF);
      TurnSearch(OFF);
      Instructions();
      Message("Tracking and searching halted.");
      } else {
      TurnSearch(ON);
      Instructions();
      Message("Searching for trigger gesture...");
      }
    }

} else if (ev.xbutton.window == edit_win) { if (IsEditFilter())
      ChangeFilterPoint(ev.xbutton.x,ev.xbutton.y);
    else if (!IsSearch())
      ToggleRemote();

} else if (ev.xbutton.window == filter_win) { if (!IsSearch())
      FindFilter(ev.xbutton.x,ev.xbutton.y);
    else
      Message("Turn searching off before switching filters.");

} else if (ev.xbutton.window == message_win) {

SendToRemote("POWER");

}
  return;
}
/***************************************************************
*/

// Take care of processing mouse button 2
void
ProcessButton2(XEvent& ev1)
{
  if (ev1.xbutton.window == video_win) { if (!IsSearch() && !IsEditFilter()) { int x1 = ev1.xbutton.x; int y1 = ev1.xbutton.y;
      int x2, y2; GetReleasePoint(x2,y2);

MakeFilter(x1,y1,x2,y2);
      DrawFilters();
    }

} else if (ev1.xbutton.window == edit_win) { if (IsEditFilter()) { int x1 = ev1.xbutton.x; int y1 = ev1.xbutton.y;
      int x2,y2; GetReleasePoint(x2,y2);

RemoveEditBlock(x1,y1,x2,y2);

}
```

```
    }
    return;
}
/*******************************************************************
***/
// Process the pressing of the third mouse button void
ProcessButton3(XEvent& ev)
{
  if (ev.xbutton.window == video_win) { if (!IsSearch()) {

TurnEditFilter(!IsEditFilter());
      if (IsEditFilter()) {
      FPosition pos;
      DrawEditFilter(pos);
      }
      Instructions();

}

} else if (ev.xbutton.window == edit_win) {

FinalizeEditFilter();

}
  return;
}
/*******************************************************************
*/

// Toggle whether or not the difference map appears on the
screen void
ToggleDiffMap()
{
  SHOW_DIFF_MAP = SHOW_DIFF_MAP ? 0 : 1;
  XClearWindow(dpy,change_win);
  Instructions();
  return;
}
/*******************************************************************
*/

// Toggle whether or not the score map shows void
ToggleScores()
{
  SHOW_SCORES = SHOW_SCORES ? 0 : 1;
  XClearWindow(dpy,score_win);
  Instructions();
  return;
}

/*******************************************************************
*/ void
ToggleDebugMode()
{
  TurnDebugMode(!IsDebugMode());
  Instructions();
```

```
    return;
}
/***************************************************************
*/
// Toggle whether or not the commands are actually sent to the
remote void
ToggleRemote()
{
  if (USE_REMOTE) ClearRemote();
//  if (USE_REMOTE) XMapWindow(dpy,still_win);
//  else XUnmapWindow(dpy,still_win);

USE_REMOTE = USE_REMOTE ? 0 : 1;

//  if (USE_REMOTE) remotep->PerformAction(Right);
  //  else remotep->PerformAction(Left);
  Instructions();
  HandleStill();
  return;
}

/***************************************************************/

// Get the window point at which the mouse was released void
GetReleasePoint(int& x, int& y)
{
  //// Get the release point
  XEvent ev2;
  while (1) {
    XNextEvent(dpy,&ev2);
    if (ev2.type == ButtonRelease &&
      ev2.xbutton.button == 2) break;
  }
  x = ev2.xbutton.x; y = ev2.xbutton.y;
  return;
}
/*************************************************************** orientrep.cc

Bill Freeman, Craig Weissman
   MERL, Cambridge
   6/94

Representation dependent image routines for the hand tracking
   tv program based on orientation.

***************************************************************/ include <math.h>
include "rep.h"    // Copy orientrep.h to this file before
compiling
include "quadfit.h"
include "search.h"
include "gc.h"
include "filter.h"
include "edit.h"
include "video.h"

define Red(x) ((x) >= -1.0 && (x) <= -0.001)
define Yellow(x) (fabs(x) <= 0.001)
define Blue(x) ((x) > 0.001 && (x) <= 0.5)
define Green(x) ((x) > 0.5 && (x) <= 0.75)
```

```c
define White(x) ((x) > 0.75 && (x) <= 1.0)

char rep_name[] = "orient";

/**************************************************/

// File I/O routines for reading and writing the filter files void
WriteOneFilterPos(FILE *fp, FilterDataRep *fil)
{
   fprintf(fp,"%d,%d,%f,%f,%f,%f\n",fil->xoffset,fil->yoffset,
        fil->data.xdouble,fil->data.ydouble,fil->data.xsingle,
        fil->data.ysingle);
   return;
}

/**************************************************/ int
ReadOneFilterPos(FILE *fp, FilterDataRep *fil, int i)
{
   if (fscanf(fp,"%d,%d,%f,%f,%f,%f\n",&fil->xoffset,&fil->yoffset,
            &fil->data.xdouble,&fil->data.ydouble,
            &fil->data.xsingle,&fil->data.ysingle) != 6) {
     printf("Could not read position %d. "
          "Continuing.\n\n",i); return -1;
   }
   fil->on_flag = 1;
   return 0;
}

/****************************************************
**/

// Data fill-in routines void
SetOffsets(FilterDataRep& fil, int x, int y)
{
   x -= x % sub_w; y -= y % sub_h;
   fil.xoffset = x; fil.yoffset = y;
   return;
}

/****************************************************

// This routines actually creates the representation given the
// raw gradient data void
StoreValues(unsigned char *vd, DataRep *im)
{
   // Compute the gradients
   int left_video_val = SCALAR(vd-4);
   int right_video_val = SCALAR(vd+4);
// to use adjascent points for gradient, use this.
//    int right_video_val = SCALAR(vd);
   int up_video_val = SCALAR(vd-4*srch.w);
   int down_video_val = SCALAR(vd+4*srch.w);
// to use adjascent points for gradient, use this.
//    int down_video_val = SCALAR(vd);

int xder = right_video_val - left_video_val;
   int yder = down_video_val - up_video_val;

long xder_sqrd, yder_sqrd;
   float f;
```

```
/*
   We want our representation for the image to be
   composed from the x and y gradients. However,
   we will double the angle of this vector in
   order to make opposite directions have similar
   representations. Finally we will normalize
   the vector.

Let a = x / sqrt(x*x + y*y)
   b = y / sqrt(x*x + y*y)

Then <a,b> is our normalized vector and to
   compute its square we want: <(a*a-b*b),(2*a*b)>.
   Fortunately this latter term can be computed
   without square roots as follows:

< (x*x-y*y) / (x*x+y*y), 2*x*y / (x*x+y*y) >

Note: For the purpose of accuracy in the orientation
   display, however, we create the single-angle vector
   also.

*/ im->len_sqrd = (xder_sqrd = xder * xder) + (yder_sqrd = yder *
yder);
  if (AboveImageThresh(im)) {
     im->xdouble = (xder_sqrd - yder_sqrd) / (f = float(im-
>len_sqrd));
     im->ydouble = 2 * xder * yder / f;
     im->xsingle = xder / (f = sqrt(im->len_sqrd));
     im->ysingle = yder / f;
  } else
     im->xdouble = im->ydouble = im->xsingle = im->ysingle = 0.0
  return;
}

/************************************************************
*/
void
DrawImageMark(Pixmap win,int x,int y,DataRep *im)
{
  if (AboveFilterThresh(im)) {
     float xlen = ORIENT_DASH_LENGTH * YSingleAngle(im);
     float ylen = ORIENT_DASH_LENGTH * -XSingleAngle(im);
     int x1 = round(x - xlen);
     int x2 = round(x + xlen);
     int y1 = round(y - ylen);
     int y2 = round(y + ylen);
     XDrawLine(dpy, win, gc, x1, y1,x2,y2);
  }
  return;
}

/************************************************************
*/
void
DrawFilterMark(Window win,int x,int y,DataRep *fil)
{
  float xlen = ORIENT_DASH_LENGTH * YSingleAngle(fil);
  float ylen = ORIENT_DASH_LENGTH * -XSingleAngle(fil);
  int x1 = round(x - xlen);
  int x2 = round(x + xlen);
  int y1 = round(y - ylen);
  int y2 = round(y + ylen);
  XDrawLine(dpy, win, gc, x1>>sh, y1>>sh,x2>>sh,y2>>sh);
```

```
    return;
}
/***************************************************************
*/
void
DrawToggleFilterMark(Window win,FilterDataRep *fil,float factor
{
  float xlen =
    ORIENT_DASH_LENGTH * YSingleAngle(&fil->data) /
BLOWUP_SCALE;
  float ylen =
    ORIENT_DASH_LENGTH * -XSingleAngle(&fil->data) /
BLOWUP_SCALE;

int x = round((XOffset(fil)-curr_fil-
>minx+PAD*sub_w)*factor)>>sh;
  int y = round((YOffset(fil)-curr_fil-
>miny+PAD*sub_h)*factor)>>sh;
  int x1 = round((XOffset(fil)-curr_fil->minx+PAD*sub_w-
xlen)*factor)>>sh;
  int y1 = round((YOffset(fil)-curr_fil->miny+PAD*sub_h-
ylen)*factor)>>sh;
  int x2 = round((XOffset(fil)-curr_fil-
>minx+PAD*sub_w+xlen)*factor)>>sh;
  int y2 = round((YOffset(fil)-curr_fil-
>miny+PAD*sub_h+ylen)*factor)>>sh;

if (fil->on_flag)
    XDrawLine(dpy, edit_win, gc, x1, y1, x2, y2);
  else
    XDrawLine(dpy, edit_win, black_gc, x1, y1, x2, y2);

XFillRectangle(dpy, edit_win, red_gc, x-1, y-1,2,2);
  return;
}

/***************************************************************
*/ void
DrawEditFilterMark(Window win,FilterDataRep *fil,float
factor,FPosition pos)
{
  float xlen = ORIENT_DASH_LENGTH * YSingleAngle(&fil->data) /
BLOWUP_SCALE;
  float ylen = ORIENT_DASH_LENGTH * -XSingleAngle(&fil->data) /
BLOWUP_SCALE;

int x = round((XOffset(fil)-curr_fil-
>minx+PAD*sub_w)*factor)>>sh;
  int y = round((YOffset(fil)-curr_fil-
>miny+PAD*sub_h)*factor)>>sh;
  int x1 = round((XOffset(fil)-curr_fil->minx+PAD*sub_w-
xlen)*factor)>>sh;
  int y1 = round((YOffset(fil)-curr_fil->miny+PAD*sub_h-
ylen)*factor)>>sh;
  int x2 = round((XOffset(fil)-curr_fil-
>minx+PAD*sub_w+xlen)*factor)>>sh;
  int y2 = round((YOffset(fil)-curr_fil-
>miny+PAD*sub_h+ylen)*factor)>>sh;

if (!IsEditFilter()) {

// Find the point in the image that was dotted with this
segment
      int im_x = round((pos.x-srch.pos.x+XOffset(fil))/sub_w);
      int im_y = round((pos.y-srch.pos.y+YOffset(fil))/sub_h);
```

```
      DataRep *im = &image[im_row_length*im_y+im_x];
      float val = (XDoubleAngle(&fil->data) * XDoubleAngle(im)
             YDoubleAngle(&fil->data) * YDoubleAngle(im));

// Draw the appropriately colored mark
      if (Red(val))
    XDrawLine(dpy, edit_win, red_gc, x1, y1, x2, y2);
      else if (Yellow(val))
    XDrawLine(dpy, edit_win, yellow_gc, x1, y1, x2, y2);
      else if (Blue(val))
    XDrawLine(dpy, edit_win, blue_gc, x1, y1, x2, y2);
      else if (Green(val))
    XDrawLine(dpy, edit_win, green_gc, x1, y1, x2, y2);
      else if (White(val))
    XDrawLine(dpy, edit_win, gc, x1, y1, x2, y2);

} else {

XDrawLine(dpy, edit_win, gc, x1, y1, x2, y2);
      XFillRectangle(dpy, edit_win, red_gc, x-1, y-1,2,2);

} return;
}

/**************************************************************
*/
void
DrawEditImageMark(Window win,int x,int y,DataRep *im,float
factor)
{
  // Draw a single dash
  if (AboveFilterThresh(im)) {
    float xlen = ORIENT_DASH_LENGTH * YSingleAngle(im) /
BLOWUP_SCALE;
    float ylen = ORIENT_DASH_LENGTH * -XSingleAngle(im) /
BLOWUP_SCALE;
    int x1 = (round((x*sub_w-xlen)*factor)>>sh);
    int x2 = (round((x*sub_w+xlen)*factor)>>sh);
    int y1 = (round((y*sub_h-ylen)*factor)>>sh);
    int y2 = (round((y*sub_h+ylen)*factor)>>sh);
    XDrawLine(dpy, edit_win, dgrey_gc, x1, y1, x2, y2);
  }

}

/**************************************************************
/
void
DrawLegend(Window win,int leg_x,int leg_w,int leg_h)
{
  if (!IsDebugMode())
    return;

XDrawRectangle(dpy,win,gc,leg_x,0,leg_w,leg_h);
  XFillRectangle(dpy,win,gc,leg_x+1,1,leg_w-2,round(leg_h/8.0)-
1);

XFillRectangle(dpy,win,green_gc,leg_x+1,round(leg_h/8.0),leg_w-
2,
         round(leg_h/8.0));
  XFillRectangle(dpy,win,blue_gc,leg_x+1,round(leg_h/4.0),leg_w
2,
         round(leg_h/4.0));
```

```
  XFillRectangle(dpy,win,yellow_gc,leg_x+1,round(leg_h/2.0),leg_w
2,
             1);

XFillRectangle(dpy,win,red_gc,leg_x+1,round(leg_h/2.0)+1,leg_w-
2,
             round(leg_h/2.0)-2);
  return;
}

/****************************************************************
*/

// Find the position of best match with the given filter and
// store it in measurment. Return a pointer to the best positio
// DataRep.  Let maximum score  be max_result and let frac_used
// contain the fraction of filter positions that were used in
the
// match.
//    wtf sept. 27, 94: modified this from former Correlate
function
//    by adding limits on search window, and initial search
position.

DataRep*
Correlate_One_Filter(FilterRep *filp, DataRep *imp, int
search_w, int search_h,
               MotionVector& measurement, float& frac, float&
max_result)
{
  float conv_sum, dot;
  float frac_used;
  int locations_used;

// Make sure filter isn't blank
  if (!filp->nm) Error("Correlate() called with blank filter");

// Initialize the return values in case nothing found
  max_result = -1.0;
  measurement.pos.x = srch.pos.x;
  measurement.pos.y = srch.pos.y;
  frac_used = 0.0;

// Loop through the filter and image with these
  register FilterDataRep *fil;
  register DataRep *im = imp;
  FilterDataRep *lastfil = &filp->array[filp->nm];
  int jump_to_next_row = im_row_length - search_w/sub_w;
  DataRep *lastim = &imp[im_row_length*(search_h/sub_h-1)+
search_w/sub_w];
  DataRep *tempim, *last_on_this_row, *save_im = imp;

while (im < lastim) { last_on_this_row = im + search_w/sub_w;
    while (im < last_on_this_row) {

//// Perform the summations based on non-zero locations
      conv_sum = 0.0; locations_used = 0;
      for (fil = filp->array; fil < lastfil ; fil++) {
      dot = (fil->data.xdouble *
              (tempim = im + YOffset(fil)/sub_h*im_row_length +
            XOffset(fil)/sub_w)->xdouble +
              fil->data.ydouble * tempim->ydouble);
      if (fabs(dot) > 0.001) {
        conv_sum += dot; locations_used++;
      }
```

```
      }

//// Calculate the value for this position
      if (locations_used) {

// First compute the score without modulating based on the
      // fraction of the filter that was used
      im->score = conv_sum / locations_used;

// Now reduce the score based upon a sigmoidal curve that
      // favors full use of the filter
      frac_used = float(locations_used)/filp->nm;
      im->score *= (TRACKING_SIGMOID_BOTTOM +
            (TRACKING_SIGMOID_TOP - TRACKING_SIGMOID_BOTTOM) /
            (1 + exp(TRACKING_SIGMOID_SPREAD *
                  (TRACKING_SIGMOID_MEAN - frac_used))));
      } else im->score = 0.0;

/* for computation of x, y offset, do it relative to
"image" variable,
      not relative to the inputted offset, imp */
      int x = ((im-image) % im_row_length)*sub_w + srch.pos.x;
      int y = ((im-image) / im_row_length)*sub_h + srch.pos.y;
      if (SHOW_SCORES && IsDebugMode())
      DrawBW(pixmap,x,y,(unsigned char)round(im->score*255));

// If the value is biggest than save it
      if (im->score > max_result)  {
      measurement.pos.x = x;
      measurement.pos.y = y;
      max_result = im->score;
      frac = frac_used;
      save_im = im;
      }
      im ++;
    }
    im += jump_to_next_row;
  }

// Perform the quadratic maximization over neighboring values
to
  // arrive at subpixel resolution.
  float xoffset, yoffset, max;
  QuadraticFit((save_im-im_row_length-1)->score,
            (save_im-im_row_length)->score,
            (save_im-im_row_length+1)->score,
            (save_im-1)->score,(save_im)->score,(save_im+1)-
>score,
            (save_im+im_row_length-1)->score,
            (save_im+im_row_length)->score,
            (save_im+im_row_length+1)-
>score,xoffset,yoffset,max);
  if (INTERPOLATE) {
    measurement.pos.x += xoffset;
    measurement.pos.y += yoffset;
  }
}
/*
  FILE *fp = fopen("quad","w");
  fprintf(fp,
        "%.2f %.2f %.2f\n"
        "%.2f %.2f %.2f\n"
        "%.2f %.2f %.2f\n\n"
        "xoff = %f, yoff = %f, max = %f\n",
        (save_im-im_row_length-1)->score,
        (save_im-im_row_length)->score,
        (save_im-im_row_length+1)->score,
        (save_im-1)->score,(save_im)->score,(save_im+1)->score,
        (save_im+im_row_length-1)->score,
        (save_im+im_row_length)->score,
```

```
        (save_im+im_row_length+1)->score,xoffset,yoffset,max);
  fclose(fp);
*/
  return save_im;
}

/****************************************************************
*/

// Find the position of best match with the given filter and
// store it in measurment. Return the maximum score and let frac_used
// contain the fraction of filter positions that were used in the
// match.
//    wtf sept. 27, 94: put correlation functionality of this in a
//    separate function call, Correlate_One_Filter.

float
Correlate(FilterRep *filp, MotionVector& measurement, float& frac)
{
  float max_result = -1.0;
  DataRep* best_im;

XFillRectangle(dpy,pixmap,black_gc,0,0,im_w>>sh,im_h>>sh);

best_im = Correlate_One_Filter(filp, image, srch.w, srch.h,
measurement, frac, max_result);

XCopyArea(dpy,pixmap,score_win,gc,0,0,im_w>>sh,im_h>>sh,0,0);

float new_score;

// For use with multiple filters
  //   if (IsTracking())
  //     BestFilter(save_im,new_score);
  //   else
  //   new_score = max_result;

BestFilter(best_im, measurement, new_score);

// Make a data file showing the best match
  if (MAKE_HELP_FILE)
    MakeHelpFile(filp,measurement,max_result);

return new_score;
}

/****************************************************************
***/

// This routine is meant to dump image and filter data to a fil
// for examining.

// This function is not up to date for this representation void
MakeHelpFile(FilterRep *filp,MotionVector& measurement,float max_result)
{
  /*
```

```
int x,y,x1,y1;

FilterDataRep *fil = filp->array;
FilterDataRep *save_fil;
FILE *fp = fopen("help","w");
float val;

x1 = round(measurement.pos.x - filp->w/2 - 2 * sub_w);
x1 -= x1 % sub_w;
y1 = round(measurement.pos.y - filp->h/2 - 2 * sub_h);
y1 -= y1 % sub_h;

// Print the header
fprintf(fp,"%d, %d, %f:\n\n",round(measurement.pos.x),
      round(measurement.pos.y),max_result);
fprintf(fp,"      ");
for (x = x1; x < x1 + filp->w + 4 * sub_w; x += sub_w)
  fprintf(fp,"%3d ",x);
fprintf(fp,"\n\n");

// Loop down the rows
for (y = y1; y < y1 + filp->h + 4 * sub_h; y += sub_h) {

// Print the x coords of the image
  fprintf(fp,"%3d: ",y);
  for (x = x1; x < x1 + filp->w + 4 * sub_w; x += sub_w) {
    if ((val = image[im_row_length*(y-srch.pos.y)/sub_h+
              (x-srch.pos.x)/sub_w].xdouble) + 0.05 >= 0)
    fprintf(fp," %.1f ",val);
    else
    fprintf(fp,"%.1f ",val);
    //      printf("%f,%.1f\n",val,val);
  }
  fprintf(fp,"\n");

// Print the y coords of the image
  fprintf(fp,"     ");
  for (x = x1; x < x1 + filp->w + 4 * sub_w; x += sub_w) {
    if ((val = image[im_row_length*(y-srch.pos.y)/sub_h +
              (x-srch.pos.x)/sub_w].ydouble) + 0.05 >= 0)
    fprintf(fp," %.1f ",val);
    else
    fprintf(fp,"%.1f ",val);
  }
  fprintf(fp,"\n");

// Print the x coords of the filter
  fprintf(fp,"     ");
  save_fil = fil;
  for (x = x1; x < x1 + filp->w + 4 * sub_w; x += sub_w) {
    if (y == measurement.pos.y + YOffset(fil) &&
      x == measurement.pos.x + XOffset(fil)) {
    if ((val =  fil->data.xdouble) + 0.05 > 0)
      fprintf(fp," %.1f ",val);
    else
      fprintf(fp,"%.1f ",val);
    fil++;
    } else
    fprintf(fp,"      ");
  }
  fprintf(fp,"\n");

// Print the y coords of the filter
  fprintf(fp,"     ");
  fil = save_fil;
  for (x = x1; x < x1 + filp->w + 4 * sub_w; x += sub_w ) {
    if (y == measurement.pos.y + YOffset(fil) &&
      x == measurement.pos.x + XOffset(fil)) {
    if ((val = fil->data.ydouble) + 0.05 > 0)
```

```
      fprintf(fp," %.1f ",val);
    else
      fprintf(fp,"%.1f ",val);
    fil++;
     } else
      fprintf(fp,"    ");
    }
    fprintf(fp,"\n");
  }
  fclose(fp);
  */
  return;
}
/***************************************************************
 * panel.cc

Bill Freeman, Craig Weissman
  MERL, Cambrdge
  6/94

Control panel routines for the hand tracking tv program.

BUG: I have not been able to unmap the video window once it
       has been mapped for some reason because the X server
seems
       to freeze up. That is why we need MapSubWindows() and
       UnMapSubWindows().

NOTE: the control panel should really be a C++ class with
        constructor and destructor in place of Init..() and
      End..() but that is saved for a rainy day.

***************************************************************/ include <stdlib.h>
include <stdio.h> include <math.h>
include "globals.h"
include "control.h"
include "panel.h"
include "xvutils.h"
include "shadow.h"
include "message.h"
include "instructions.h"
include "filter.h"
include "track.h"

include "arrows.h"
include "slideh.h"
include "button.h"
/*************************************************************/

// Position and dimensions of the cursor and its hot spot
Rectangle cursor;
Rectangle hot_spot;

// The data for the cursor bitmaps
static Pixmap open_hand;
static Pixmap closed_hand;

// Pointer to the current cursor bitmap
static Pixmap *cursor_map = &open_hand;

// Whether new cursor will be open or closed hand
```

```c
static int confused;

// Whether or not cursor is currently visible
static int cursor_flag = 0;

// A pointer to the power button - for turning off the tv
Control *powerp;
Control *channelp;

// Whether power starts on or off on tv
static int visible_flag = 0;

/***************************************************************/

// Create the controls. We declare them as static so that they
// persist, although they only have scope in this function. If
// this presents a problem later then change them to be
dynamically
// allocated global pointers using the new operator. For now,
the
// one powerp pointer was sufficient since I didn't want too
many
// specific code items refering to the semantic meanings of the
// controls.

Control *Control::list = (Control *)NULL;

void
MakeControls()
{

// Initialize the linked list of pointers to controls to NULL
  // This must be done before allocating any controls since the
  // control constructor will add them to this linked list so
  // that all controls can subsequently be searched (i.e.
InsideControl())

// New g++ made this occur in controls.h

/************************************************************

First allocate the control coordinates and dimensions

***********************************************************/ const Rectangle CHANNEL_SLIDE_POS =
    {
{round(ENTIRE_WIDTH*4.0/15.0)+50,round(ENTIRE_HEIGHT*3.0/5.0)},
       round(ENTIRE_WIDTH*41.0/60.0)-50,round(ENTIRE_HEIGHT/20.0
};

// Note: To make the channel digits display, make the first
  //       coordinate 950 instead of 2950.
  const Position CHANNEL_SLIDE_SCORE_POS = {2950,150};

const Rectangle CHANNEL_ARROWS_POS =
     { {round(ENTIRE_WIDTH/20.0),round(ENTIRE_HEIGHT*23.0/40.0)}
       round(ENTIRE_WIDTH/6.0),round(ENTIRE_HEIGHT/10.0)};

const Rectangle VOLUME_SLIDE_POS =
    {
{round(ENTIRE_WIDTH*4.0/15.0)+50,round(ENTIRE_HEIGHT*17.0/20.0)

round(ENTIRE_WIDTH*23.0/60.0)-
50,round(ENTIRE_HEIGHT/20.0)};
  const Position VOLUME_SLIDE_SCORE_POS = {2150,100};

const Rectangle VOLUME_ARROWS_POS =
     { {round(ENTIRE_WIDTH/20.0),round(ENTIRE_HEIGHT*33.0/40.0)}
```

```
     round(ENTIRE_WIDTH/6.0),round(ENTIRE_HEIGHT/10.0)};

const int NUM_VOLUMES = 9;

const Rectangle POWER_POS =
      {
{round(ENTIRE_WIDTH*17.0/20.0),round(ENTIRE_HEIGHT*33.0/40.0)},
      round(ENTIRE_WIDTH/10.0),round(ENTIRE_HEIGHT/10.0) };

const Rectangle MUTE_POS =
      {
{round(ENTIRE_WIDTH*7.0/10.0),round(ENTIRE_HEIGHT*33.0/40.0)},
      round(ENTIRE_WIDTH/10.0),round(ENTIRE_HEIGHT/10.0) };

/****************************************************

Actually allocate the controls using constructors

****************************************************/ static Slideh
channel_slide(CHANNEL_SLIDE_POS,NUM_CHANNELS,"Channel",
                    "CHDN","CHUP",CHANNEL_SLIDE_SCORE_POS,
                    round(ENTIRE_HEIGHT/40.0)+NAME_SPC,ON,
                    OFF,3,round(0.04*VOLUME_SLIDE_POS.w));

// Note: To return the volume thermometer to operation, make
the
  //         last parameter on the next line read ON static Slideh
volume_slide(VOLUME_SLIDE_POS,NUM_VOLUMES,"Volume",
                    "VOLDN","VOLUP",VOLUME_SLIDE_SCORE_POS, round(ENTIRE_HEIGHT/40.0)+NAME_SPC,OFF,OFF);
  static Button
power(POWER_POS,"Off","On","POWER",visible_flag);
  static Arrows ch_arrows(CHANNEL_ARROWS_POS,"Channel +/-
",&channel_slide);
  static Arrows vol_arrows(VOLUME_ARROWS_POS,"Volume +/-
",&volume_slide);
  static Button mute(MUTE_POS,"Sound","Mute","MUTE",0);

// Make a pointer to the power button so that it can be
  // found outside of this function.
  powerp = &power;
  channelp = &channel_slide;

// Connect the mute switch to the volume slider and vice vers
  mute.ConnectToControl(&volume_slide);
  volume_slide.ConnectToControl(&mute);

/***************************************************************
**
  // The following commented lines give examples of the use of
three
  // other controls. If you would like to use these you must
include
  // their header files in this file and also link their object
files
  // in the Makefile const Rectangle T1_POS = { {700,100},200,100};
  const Rectangle T2_POS = { {700,300},50,200};
  const Circle T3_POS = { {900,400},50 };

static Latch t1(T1_POS,"","NONE","NONE",1);
  static Slidev t2(T2_POS,10,"","NONE","NONE",
```

```
                     VOLUME_SLIDE_SCORE_POS,10,1,ON);
    static Dial t3(T3_POS,3,"","NONE","NONE");

/****************************************************************
/
  return;
}
/****************************************************************/
// Perform all operations to start the control panel void
InitControlPanel(int argc, char **argv)
{
  // Create the debugging windows
  CreateSubWindows(argc,argv);

// Allocate the controls and make them visible as appropriate
  MakeControls();
  if (IsVisible()) {
    if (!powerp->Value()) powerp->PerformAction(Press);
    TurnVisibility(ON);
  }

// Read the cursor files
  XReadBitmapFile(dpy,main_win,"openhand",
            (unsigned int*)&cursor.w,(unsigned int *)&cursor.h,
            &open_hand,&hot_spot.pos.x,&hot_spot.pos.y);
  int d1,d2,d3,d4;
  XReadBitmapFile(dpy,main_win,"closedhand",
            (unsigned int *)&d1,(unsigned int *)&d2,
            &closed_hand,&d3,&d4);
  hot_spot.w = HOT_SPOT_WIDTH;
  hot_spot.h = HOT_SPOT_HEIGHT;

return;
}
/****************************************************************
/
// End the control panel void
EndControlPanel()
{
  DestroySubWindows();
  return;
}
/****************************************************************
/
// Put the cursor on the screen void
InitCursor(FPosition image_pos)
{
  // Set the proper location of the shadowed control panel and
  // put the cursor in its starting position
  Position shadow_pos = CursorStartPosition();
  SetShadowLocation(image_pos,shadow_pos);
  cursor.pos = shadow_pos;

confused = 0;
  DrawCursor(ON);
```

```
  return;
}
/*****************************************************************
/

// Remove the cursor from the screen and clear all controls void
EndCursor()
{
  DrawCursor(OFF);

// Take away all activity from all controls
  for (Control *cp = Control::list; cp; cp = cp->next) {
    if (cp->IsActive())
      cp->DeActivate();
    else
      cp->ClearActivity();
  }
  return;
}

/*****************************************************************
/

// Move the cursor based on the new motion parameters received from
// the tracking procedure void
DoMovement(MotionVector& new_motion, int confusion)
{
  int changed_cursor = 0;
  if (confused != confusion) changed_cursor = 1;
  confused = confusion;

// Calculate the distance the cursor has moved
  Displacement delta;
  delta.x = X_ItoP(new_motion.pos.x) - cursor.pos.x;
  delta.y = Y_ItoP(new_motion.pos.y) - cursor.pos.y;

// See where the cursor is now, then move the cursor, then
  // handle the new position
  Control *control_before = InsideControl(cursor,hot_spot);

KeepWithinPanel(cursor,delta);
  // Prevent flicker if it isn't necessary to turn cursor off
  if (abs(delta.x) > 0 || abs(delta.y) > 0 || changed_cursor)
    DrawCursor(OFF);

// Move the cursor
  cursor.pos.x += delta.x;
  cursor.pos.y += delta.y;

if (!confused)
    HandleNewCursor(control_before,new_motion.pos);

// If the power button was clikced then we might not
  // want to redraw the cursor
  if (IsTracking())
    DrawCursor(ON);
  return;
}

/*****************************************************************
***/
```

```
// Force the cursor to stay within the control panel. Do not let
// it
// be hidden by the subwindows void
KeepWithinPanel(Rectangle& cursor, Displacement& delta)
{
  Position new_pos = cursor.pos;
  KeepWithinBounds(new_pos.x,delta.x,-cursor.w/2,
            ENTIRE_WIDTH - cursor.w/2);
  if (IsDebugMode())
    KeepWithinBounds(new_pos.y,delta.y,2*(im_h>>sh)-cursor.h/2,
            ENTIRE_HEIGHT - cursor.h/2);
  else
    KeepWithinBounds(new_pos.y,delta.y,-cursor.h/2,
            ENTIRE_HEIGHT - cursor.h/2);

delta.x = new_pos.x - cursor.pos.x;
  delta.y = new_pos.y - cursor.pos.y;
  return;
}

/***************************************************************
****/

// Force an integer to be between a lower and upper bound inline void
KeepWithinBounds(int& pos,int delta,int lower, int upper)
{
  if (pos + delta < lower) pos = lower;
  else if (pos + delta > upper) pos = upper;
  else pos += delta;
  return;
}

/***************************************************************
****/

// Return true if the cursor has moved off of the shadows
// control panel int
OutOfBounds(FPosition& pos)
{
  int xp = X_ItoP(round(pos.x));
  int yp = Y_ItoP(round(pos.y));
  if (IsDebugMode())
    return (yp < 2*(im_h>>sh) || xp < 0 ||
         yp > ENTIRE_HEIGHT || xp > ENTIRE_WIDTH );
  else
    return (yp < 0 || xp < 0 || yp > ENTIRE_HEIGHT || xp >
ENTIRE_WIDTH );
  return 0;
}

/***************************************************************
****/

// Take care of the cursor after it has been moved. We may have
// to adjust the controls void
HandleNewCursor(Control *control_before,FPosition& pos)
{

// If the hand is moving out of bounds then have the control
panel keep
  // up with it
```

```
// Given a correlation score, use a Sigmoid function to decide how
// big the variance will be for this measurement float
ScoreFunction(float score)
{
  float KALMAN_SIGMOID_MEAN = (TRACKING_THRESH +
TRIGGER_THRESH)/2;
  float ans = KALMAN_SIGMOID_BOTTOM +
    (KALMAN_SIGMOID_TOP - KALMAN_SIGMOID_BOTTOM) /
      (1 + exp(KALMAN_SIGMOID_SPREAD * (score -
KALMAN_SIGMOID_MEAN)));
  return ans;
}

/***************************************************************
*/

// Initialize the variance for the first iteration of the Kalma
filter
// Note: position will just be set to the first correlation
position void
InitVariance(VarianceVector& P_zero, float score)
{
  P_zero.pos.x = im_w / (12 * SEARCH_MULTIPLIER);
  P_zero.pos.y = im_w / (12 * SEARCH_MULTIPLIER);
  return;
}

/***************************************************************
*/

// Compute the noise variance for the measurement based on the
// correlation score VarianceVector
ComputeMeasurementVar(float score)
{
  VarianceVector R;
  R.pos.x = R.pos.y = ScoreFunction(score);
  return R;
}

/***************************************************************
*/

// Compute the Kalman gain matrix - since it is diagonal we wil
// just treat it as a vector VarianceVector
ComputeKalmanGain(VarianceVector& P_t_given_t_minus_1,
             VarianceVector& measurement_var)
{
  VarianceVector K;
  K.pos.x = P_t_given_t_minus_1.pos.x /
    (P_t_given_t_minus_1.pos.x + measurement_var.pos.x);
  K.pos.y = P_t_given_t_minus_1.pos.y /
    (P_t_given_t_minus_1.pos.y + measurement_var.pos.y);
  return K;
}

/***************************************************************
*/

// Compute a new motion and variance based on the old motion an
// variance, the new measurement and correalation score, and th
```

```
// Kalman equations.
// Note: since all matrices are diagonal we treat them as
vectors void
ComputeNewMotion(MotionVector& x_hat_t_given_t_minus_1,
            VarianceVector& P_t_given_t_minus_1,
            float correlation_score_t,
            MotionVector& y_t,
            MotionVector& x_hat_t_plus_1_given_t,
            VarianceVector& P_t_plus_1_given_t)
{
  VarianceVector measurement_var =
    ComputeMeasurementVar(correlation_score_t);
  VarianceVector kalman_gain =
    ComputeKalmanGain(P_t_given_t_minus_1,measurement_var);

MotionVector x_hat_t_given_t;
  VarianceVector P_t_given_t;

x_hat_t_given_t.pos.x =
    x_hat_t_given_t_minus_1.pos.x +
    kalman_gain.pos.x * (y_t.pos.x -
x_hat_t_given_t_minus_1.pos.x);
  x_hat_t_given_t.pos.y =
    x_hat_t_given_t_minus_1.pos.y +
    kalman_gain.pos.y * (y_t.pos.y -
x_hat_t_given_t_minus_1.pos.y);
  P_t_given_t.pos.x = (1 - kalman_gain.pos.x) *
P_t_given_t_minus_1.pos.x;
  P_t_given_t.pos.y = (1 - kalman_gain.pos.y) *
P_t_given_t_minus_1.pos.y;

x_hat_t_plus_1_given_t.pos.x = x_hat_t_given_t.pos.x;
  x_hat_t_plus_1_given_t.pos.y = x_hat_t_given_t.pos.y;
  P_t_plus_1_given_t.pos.x =
    P_t_given_t.pos.x + MOTION_VARIANCE;
  P_t_plus_1_given_t.pos.y =
    P_t_given_t.pos.y + MOTION_VARIANCE;

return;
}

/**************************************************************** latch.cc

Bill Freeman, Craig Weissman
   MERL, Cambridge
   7/94

Source file for latch control
****************************************************************/ include <stdlib.h> include "latch.h"
include "panel.h"
include "remote.h"

/****************************************************************/

// Constructor

Latch::Latch(Rectangle r1, char *nme, char *off_nme, char
*on_nme, int val)
```

```
{
  type = LATCH;
  x = r1.pos.x; y = r1.pos.y; w = r1.w; h = r1.h;
  name = new char[strlen(name) + 1]; strcpy(name,nme);
  remote_name = new char[strlen(off_nme) + 1];
strcpy(remote_name,off_nme);
  remote_name2 = new char[strlen(on_nme) + 1];
strcpy(remote_name2,on_nme);
  position = val; num_ticks = 2;
  CreatePixmap();
  RaisedRectangle(pixmap,HIGHLIGHT,HIGHLIGHT,w-2*HIGHLIGHT,
           h-2*HIGHLIGHT,gc,black_gc,dgrey_gc);
  XDrawString(dpy,pixmap,red_gc,
           w/2-XTextWidth(bigfstr,name,strlen(name))/2,
           h+BIG_FONT_HT+NAME_SPC,name,strlen(name));
}

/***************************************************************/

// True iff the cursor's hotspot should activate this control
int
Latch::IsInside(Rectangle cursor,Rectangle hot_spot)
{
  if (!IsVisible()) return 0;
  if (IsActive())
    return (cursor.pos.x+hot_spot.pos.x+hot_spot.w > x &&
         cursor.pos.y+hot_spot.pos.y+hot_spot.h > y &&
         cursor.pos.x+hot_spot.pos.x < x+w &&
         cursor.pos.y+hot_spot.pos.y < y+h);
  else {
    if (position)
      return (cursor.pos.x+hot_spot.pos.x+hot_spot.w >
x+HIGHLIGHT &&
         cursor.pos.y+hot_spot.pos.y+hot_spot.h > y+HIGHLIGHT
&&
         cursor.pos.x+hot_spot.pos.x < x+w/2 - HIGHLIGHT &&
         cursor.pos.y+hot_spot.pos.y < y+h - HIGHLIGHT);
    else
      return (cursor.pos.x+hot_spot.pos.x+hot_spot.w >
x+w/2+HIGHLIGHT &&
         cursor.pos.y+hot_spot.pos.y+hot_spot.h > y+HIGHLIGHT
&&
         cursor.pos.x+hot_spot.pos.x < x+w - HIGHLIGHT &&
         cursor.pos.y+hot_spot.pos.y < y+h - HIGHLIGHT);
  }
}

/***************************************************************/

// Draw the mark on top of the control
void
Latch::DrawMark() { int flag = 0;
  if (IsCursor()) { flag = 1; DrawCursor(OFF); } int X = round(3.0 * w / 8.0);
  int Y = round(h/9.0);
  int t = HIGHLIGHT + 1;

// Depending on which state the latch is currently in, draw the
  // appropriate scene if (!position) {

// Calculate the shapes to be painted
```

```
    XPoint p1[] = { {x+HIGHLIGHT+t,y+HIGHLIGHT+t},
{x+w/2,y+HIGHLIGHT+t},
                {x+w/2,y+h-HIGHLIGHT-t},
                {x+HIGHLIGHT+t,y+h-HIGHLIGHT-t} };
    XPoint p2[] = { {x+w/2,y+HIGHLIGHT+t}, {x+w-HIGHLIGHT-
t,y+HIGHLIGHT+t},
                {x+w/2+X,y+HIGHLIGHT+Y+t} };
    XPoint p3[] = { {x+w-HIGHLIGHT-t,y+h-HIGHLIGHT-t},
                {x+w/2,y+h-HIGHLIGHT-t}, {x+w/2+X,y+h-HIGHLIGHT-\
t} };
    XPoint p4[] = { {x+w/2,y+HIGHLIGHT+t},
{x+w/2+X,y+HIGHLIGHT+Y+t},
                {x+w/2+X,y+h-HIGHLIGHT-Y-t},
                {x+w/2,y+h-HIGHLIGHT-t} };
    XPoint p5[] = { {x+w/2+X,y+HIGHLIGHT+Y+t}, {x+w-HIGHLIGHT-
t,y+HIGHLIGHT+t},
                {x+w-HIGHLIGHT-t,y+h-HIGHLIGHT-t},
                {x+w/2+X,y+h-HIGHLIGHT-Y-t} };

// Draw the shapes

XFillPolygon(dpy,main_win,lgrey_gc,p1,4,Convex,CoordModeOrigin)
    XFillPolygon(dpy,main_win,gc,p2,3,Convex,CoordModeOrigin);

XFillPolygon(dpy,main_win,lgrey_gc,p3,3,Convex,CoordModeOrigin)

XFillPolygon(dpy,main_win,dgrey_gc,p4,4,Convex,CoordModeOrigin)

XFillPolygon(dpy,main_win,lgrey_gc,p5,4,Convex,CoordModeOrigin)
    XDrawLine(dpy,main_win,dgrey_gc,x+w/2+X,y+h-HIGHLIGHT-Y-t,
            x+w-HIGHLIGHT-t,y+h-HIGHLIGHT-t);

// Write the text on top of the shapes

XDrawString(dpy,main_win,red_gc,x+w/4-
XTextWidth(bigfstr,"Off",3)/2,
            y+h/2+BIG_FONT_HT/2,"Off",3);
    XDrawString(dpy,main_win,black_gc,
            x+round(11.0*w/16)-XTextWidth(bigfstr,"On",2)/2,
            y+h/2+BIG_FONT_HT/2,"On",2);

} else {

// Calculate the shapes to be drawn

XPoint p1[] = { {x+w-HIGHLIGHT-t,y+HIGHLIGHT+t},
{x+w/2,y+HIGHLIGHT+t},
                {x+w/2,y+h-HIGHLIGHT-t},
                {x+w-HIGHLIGHT-t,y+h-HIGHLIGHT-t} };
    XPoint p2[] = { {x+w/2,y+HIGHLIGHT+t},
{x+HIGHLIGHT+t,y+HIGHLIGHT+t},
                {x+w/2-X,y+HIGHLIGHT+Y+t} };
    XPoint p3[] = { {x+HIGHLIGHT+t,y+h-HIGHLIGHT-t}, {x+w/2,y+h
HIGHLIGHT-t},
                {x+w/2-X,y+h-HIGHLIGHT-Y-t} };
    XPoint p4[] = { {x+w/2,y+HIGHLIGHT+t}, {x+w/2-
X,y+Y+HIGHLIGHT+t},
                {x+w/2-X,y+h-HIGHLIGHT-Y-t}, {x+w/2,y+h-HIGHLIGHT
t} };
    XPoint p5[] = { {x+w/2-X,y+Y+HIGHLIGHT+t},
{x+HIGHLIGHT+t,y+HIGHLIGHT+t},
                {x+HIGHLIGHT+t,y+h-HIGHLIGHT-t},
                {x+w/2-X,y+h-HIGHLIGHT-Y-t} };

// Draw the shapes
```

```
    if (OutOfBounds(pos))
       SetShadowLocation(pos,cursor.pos);

// See where the cursor is now
    Control *control_after = InsideControl(cursor,hot_spot);

// If it is no longer over the same control as before the
    // movement then clear the old control
    if (control_before && control_after != control_before) {
       if (control_before->IsActive())
          control_before->DeActivate();
       control_before->ClearActivity();
    }

// If the cursor is over a control now then adjust it
    if (control_after) {

// First check that the control has been highlighted
       if (control_after->IsActive()) {

// See what actions we have forced on the control
          Position new_pos;
          new_pos.x = X_ItoP(round(pos.x)) + hot_spot.pos.x + hot_spot.w/2;
          new_pos.y = Y_ItoP(round(pos.y)) + hot_spot.pos.y + hot_spot.h/2;
          int oldvalue = control_after->Value();
          control_after->Adjust(new_pos);
          if (control_after == channelp && channelp->Value() != oldvalue)
             HandleStill();

// Otherwise make it one step closer to being lit up
       } else { control_after->CheckNewActivity();

if (control_after->IsActive()) {

// SPECIAL CASE: If power is pressed then do not do
          //               the normal activation. Instead just turn
          //               tracking off.
          if (control_after == powerp) {
             control_after->ClearActivity();
             if (powerp->Value())
                powerp->PerformAction(Press);
             TurnTracking(OFF);
             StartDelay();

}

// Otherwise the control is now active
          else
             control_after->Activate();
          }
       }
    }
    return;
}
/****************************************************************
/

// Returns true iff cursor is on screen currently int IsCursor() { return cursor_flag; }
/****************************************************************
/
```

```c
// Put the cursor on the screen
void
DrawCursor(int flag)
{
//   printf("flag %d, x,y =
%d,%d\n",flag,cursor.pos.x,cursor.pos.y);
   if (flag == ON) {
     if (!cursor_flag) {
       cursor_flag = 1;
       cursor_map = (confused) ? &closed_hand : &open_hand;
       XCopyPlane(dpy,*cursor_map,main_win,green_gc,0,0,
            cursor.w,cursor.h,
            cursor.pos.x,cursor.pos.y,1);
     }
   } else if (flag == OFF) {
     if (cursor_flag) {
       cursor_flag = 0;
       XCopyPlane(dpy,*cursor_map,main_win,green_gc,0,0,
            cursor.w,cursor.h,
            cursor.pos.x,cursor.pos.y,1);
     }
   } else
     Error("Invalid flag to DrawCursor()");
   return;
}

/***************************************************************
*/

// Create the debugging windows
void
CreateSubWindows(int argc, char **argv)
{
   if (MOUSE_DEBUG)
     MakeSubWin(video_win,TRIM,TRIM,im_w,im_h);
   else
     MakeVideoWin(argc,argv,video_win,TRIM,TRIM,im_w,im_h);
   MakeSubWin(still_win,500,80,im_w>>sh,im_h>>sh);
   MakeSubWin(change_win,TRIM+(im_w>>sh),TRIM,im_w>>sh,im_h>>sh)

MakeSubWin(score_win,TRIM+(im_w>>sh),(im_h>>sh)+TRIM,im_w>>sh,i
_h>>sh);

MakeSubWin(filter_win,TRIM+((im_w*2)>>sh)+(im_w>>sh),TRIM+(im_h
>sh),
            EXTRA_WIDTH-TRIM,im_h>>sh);
   MakeSubWin(track_win,TRIM,im_h+TRIM,im_w>>sh,im_h>>sh);

MakeSubWin(edit_win,TRIM+((im_w*2)>>sh),TRIM+(im_h>>sh),im_w>>s
,im_h>>sh);
   MakeSubWin(message_win,((im_w*2)>>sh)+TRIM,TRIM,
            EXTRA_WIDTH-TRIM+(im_w>>sh),im_h>>sh);
   if (MOUSE_DEBUG) XMapWindow(dpy,video_win);
   if (IsDebugMode())
     MapSubWindows();
//   else if (!USE_REMOTE)
//     XMapWindow(dpy,still_win);
   return;
}

/***************************************************************
*/

// Create a single debug window
void
```

```
MakeSubWin(Window& win, int x, int y, int w, int h)
{
  win = XCreateSimpleWindow(dpy,main_win,x,y,w,h,1,
WhitePixel(dpy,screen),BlackPixel(dpy,screen));
  return;
}

/***************************************************************
***/

// Destroy the debugging windows void
DestroySubWins()
{
  XDestroyWindow(dpy,change_win);
  XDestroyWindow(dpy,filter_win);
  XDestroyWindow(dpy,track_win);
  XDestroyWindow(dpy,video_win);
  XDestroyWindow(dpy,edit_win);
  XDestroyWindow(dpy,score_win);
  XDestroyWindow(dpy,message_win);
  XDestroyWindow(dpy,still_win);
  return;
}

/***************************************************************
***/

// Unmap all the debug windows
// We could use XUnmapSubWindows() but then it would try to unmap
// the video window - which causes the program to freeze for
// some reason void
UnMapSubWindows()
{
  XUnmapWindow(dpy,filter_win);
  XUnmapWindow(dpy,edit_win);
  if (im_w <= 320) XUnmapWindow(dpy,score_win);
  XUnmapWindow(dpy,track_win);
  if (im_w <= 320) XUnmapWindow(dpy,message_win);
  XUnmapWindow(dpy,change_win);
//  if (!USE_REMOTE) XMapWindow(dpy,still_win);
  return;
}

/***************************************************************
***/

// Map all the debugging windows void
MapSubWindows()
{
  static int first_flag = 1;

//  if (!USE_REMOTE)
//    XUnmapWindow(dpy,still_win);
  if (first_flag && !MOUSE_DEBUG) {
    XMapWindow(dpy,video_win);
    first_flag = 0;
  }
  if (im_w <= 320) XMapWindow(dpy,change_win);
  XMapWindow(dpy,message_win);
  XMapWindow(dpy,track_win);
  if (im_w <= 320) XMapWindow(dpy,score_win);
```

```
  XMapWindow(dpy,edit_win);
  XMapWindow(dpy,filter_win);
  return;
}
/****************************************************************
*/

// Deallocate memory for Sub-windows
void
DestroySubWindows()
{
  UnMapSubWindows();
  DestroySubWins();
}

/****************************************************************
****/ int
IsDebugMode()
{
  return DEBUGMODE;
}

/****************************************************************
/ void
TurnDebugMode(int flag)
{
  if (flag == ON) { if (!IsDebugMode()) {
      DEBUGMODE = flag;
      int flag2 = 0;
      if (IsCursor()) { flag2 = 1; DrawCursor(OFF); }

// Bring the cursor where it will be visible
      if (cursor.pos.y < im_h - cursor.h)
      cursor.pos.y = im_h - cursor.h;
      MapSubWindows();
      if (flag2) DrawCursor(ON);
      Instructions();
      DrawFilters();
    }

} else if (flag == OFF) { if (IsDebugMode()) {
      DEBUGMODE = flag;
      int flag2 = 0;
      if (IsCursor()) { flag2 = 1; DrawCursor(OFF); }
      UnMapSubWindows();
      XClearWindow(dpy,video_win);
      if (flag2) DrawCursor(ON);

// Print the digits back onto the screen if necessary
      if (powerp->Value()) {
      Slideh *sh;
      for (Control *cp = Control::list; cp; cp = cp -> next) {
        sh = may_be_slideh(cp);
        if (sh) sh->DrawNumber();
      }
      }
    }

}
```

```
    return;
}
/****************************************************************
****/

// Return true if tv is on int IsVisible() { return visible_flag; }
/****************************************************************
****/

// Change the power status of the tv so that controls are
visible
// or invisible void
TurnVisibility(int flag)
{
  if (flag != visible_flag) {
    if (flag && !powerp->Value())
      powerp->PerformAction(Press);
    visible_flag = flag;
    for (Control *cp = Control::list; cp; cp = cp->next)
      cp->TurnVisibility(flag);
    if (USE_STILL) {
      if (flag)
       XMapWindow(dpy,still_win);
      else
       XUnmapWindow(dpy,still_win);
    }
  }
  return;
}

/****************************************************************
/

Position
CursorStartPosition()
{
  Position p;
  p.x = START_POS_X - cursor.w/2,
  p.y = START_POS_Y - cursor.h/2;
  return p;
}

/****************************************************************
*** params.cc

Bill Freeman, Craig Weissman
   MERL, Cambridge
   7/94

Parameter retrieval routines for hand tracking tv program.

****************************************************************
*/ include <stdlib.h>
include <stdio.h>
```

```c
include <string.h>
include "globals.h"
include "types.h"

char general_file[] = "general.params";

/****************************************************************/

// Read the global parameters. Some of the parameters are store
// in a representation dependent file called <rep_name>.params.
// Others are stored in <general_file> since they have nothing
// to do with representation. Both sets are read by this
function.

void
GetParameters()
{
  FILE *fp;
  char s[100];
  char file[100];

/*********************************************************

FIRST WE READ THE PARAMETERS FROM THE REPRESENTATION
     DEPENDENT FILE:

*********************************************************/ sprintf(file,"%s.params",rep_name);
  // Open the file
  if (!(fp = fopen(file,"r")))
    Error("Could not open representation parameter file");

/*****************/

// Skip comments
  s[0] = '#'; while (s[0] == '#' && strlen(s) > 0)
  fgets(s,99,fp);

// Read subsmaplings
  if (sscanf(s,"%d,%d",&sub_w,&sub_h) != 2)
    Error("Could not read subsampling parameters");

/***************/

// Skip comments
  s[0] = '#'; while (s[0] == '#' && strlen(s) > 0)
  fgets(s,99,fp);

// Read video processing constants
  if
(sscanf(s,"%d,%d,%d,%f,%f,%d",&GRAD_FILTER_THRESH,&GRAD_IMAGE_TRESH,
          &BACKGROUND_THRESH,&TRIGGER_THRESH,&TRACKING_THRESH,
          &BACKGROUND_SUBTRACT) != 6)
    Error("Could not read video parameters");

/***************/

// Skip comments
  s[0] = '#'; while (s[0] == '#' && strlen(s) > 0)
  fgets(s,99,fp);

// Read Kalman filter constants
  if
(sscanf(s,"%f,%f,%f,%f,%f",&KALMAN_SIGMOID_TOP,&KALMAN_SIGMOID_OTTOM,
          &KALMAN_SIGMOID_SPREAD,&SEARCH_MULTIPLIER,
```

```c
          &MOTION_VARIANCE) != 5)
    Error("Could not read Kalman parameters");

/***************/

// Skip comments
  s[0] = '#'; while (s[0] == '#' && strlen(s) > 0)
fgets(s,99,fp);

// Read tracking percentage contants
  if
(sscanf(s,"%f,%f,%f,%f",&TRACKING_SIGMOID_TOP,&TRACKING_SIGMOID
BOTTOM,
          &TRACKING_SIGMOID_MEAN,&TRACKING_SIGMOID_SPREAD) != 4
    Error("Could not read tracking parameters");

fclose(fp);   /******** DONE WITH THE REP. DEPENDENT PART
*********/

/*******************************************************

NOW WE READ THE GENERAL PARAMETERS THAT DO NOT
    DEPEND ON REPRESENTATION:

*******************************************************/

// Open the file
  if (!(fp = fopen(general_file,"r")))
    Error("Could not open general parameter file");

// Skip comments
  s[0] = '#'; while (s[0] == '#' && strlen(s) > 0)
fgets(s,99,fp);

// Read other functional constants
  if (sscanf(s,"%d,%d,%f,%f,%d,%d",&TRACKING_BACKGROUND_COUNT,
          &TRIGGER_BACKGROUND_COUNT,&TRACKING_BACKGROUND_CONST, &TRIGGER_BACKGROUND_CONST,&LOST_THRESH,&ACTIVITY_THRESH) != 6)
    Error("Could not read functional parameters");

/***************/

// Skip comments
  s[0] = '#'; while (s[0] == '#' && strlen(s) > 0)
fgets(s,99,fp);

// Read layout parameters
  if
(sscanf(s,"%f,%f,%d,%f,%f",&IN_BOUNDS_FRACTION,&SEARCH_FRACTION &ORIENT_DASH_LENGTH,&THERMOMETER_FRACTION,&BLOWUP_SCALE) != 5)
    Error("Could not read layout parameters");

/***************/

// Skip comments
  s[0] = '#'; while (s[0] == '#' && strlen(s) > 0)
fgets(s,99,fp);

if
(sscanf(s,"%d,%d,%d,%d,%d,%d,%d,%d,%d",&SEARCH_ON,&SHOW_DIFF_MA
,
          &SHOW_SCORES,&MAKE_HELP_FILE,&DEBUGMODE,&USE_REMOTE,
          &MOUSE_DEBUG,&INTERPOLATE,&AVERAGING) != 9)
    Error("Could not read flag parameters");

if (MOUSE_DEBUG) DEBUGMODE = 0;
```

```
  fclose(fp);  /********** DONE WITH GENERAL PARAMETERS
********/
  return;
}

/************************************************************* quadfit.cc

Bill Freeman, Craig Weissman
  MERL, Cambridge
  7/94

Quadratic best fit procedures for hand tracking tv program

*************************************************************/ include <math.h>
include "quadfit.h"

/*************************************************************/

// The following is the original method of quadratic fit with a
fully
// general 2nd order polynomial.  It introduces too much error
into
// the local maximum, however.

/*
   void
QuadraticFit(float v1, float v2, float v3,
             float v4, float v5, float v6,
             float v7, float v8, float v9,
             float& xoff, float& yoff, float& max)
{

Let the grid of nine scores be:

v1  v2  v3
          v4  v5  v6
          v7  v8  v9 where v5 is the highest correlation score and
   occurs at coordinates (0,0).

Suppose the correlation surface approximates:

S = Axx + Bxy + Cyy + Dx + Ey + F

Then the total squared errors is: (assuming grid lines of
length 1)

R = (A - B + C - D + E + F - v1)^2 +
       (         C     + E + F - v2)^2 +
       (A + B + C + D + E + F - v3)^2 +
       (A         - D     + F - v4)^2 +
       (                   F - v5)^2 +
       (A         + D     + F - v6)^2 +
       (A + B + C - D - E + F - v7)^2 +
       (         C     - E + F - v8)^2 +
       (A - B + C + D - E + F - v9)^2

We want to minimize this term so we find the partials with
respect
   to the coefficients:
```

```
dR/dA =  2 * (A - B + C - D + E + F - v1) +
         2 * (A + B + C + D + E + F - v3) +
         2 * (A         - D     + F - v4) +
         2 * (A         + D     + F - v6) +
         2 * (A + B + C - D - E + F - v7) +
         2 * (A - B + C + D - E + F - v9)

dR/dB = -2 * (A - B + C - D + E + F - v1) +
         2 * (A + B + C + D + E + F - v3) +
         2 * (A + B + C - D - E + F - v7) +
        -2 * (A - B + C + D - E + F - v9)

dR/dC =  2 * (A - B + C - D + E + F - v1) +
         2 * (        C     + E + F - v2) +
         2 * (A + B + C + D + E + F - v3) +
         2 * (A + B + C - D - E + F - v7) +
         2 * (        C     - E + F - v8) +
         2 * (A - B + C + D - E + F - v9)

dR/dD = -2 * (A - B + C - D + E + F - v1) +
         2 * (A + B + C + D + E + F - v3) +
        -2 * (A         - D     + F - v4) +
         2 * (A         + D     + F - v6) +
        -2 * (A + B + C - D - E + F - v7) +
         2 * (A - B + C + D - E + F - v9)

dR/dE =  2 * (A - B + C - D + E + F - v1) +
         2 * (        C     + E + F - v2) +
         2 * (A + B + C + D + E + F - v3) +
        -2 * (A + B + C - D - E + F - v7) +
        -2 * (        C     - E + F - v8) +
        -2 * (A - B + C + D - E + F - v9)

dR/dF =  2 * (A - B + C - D + E + F - v1) +
         2 * (        C     + E + F - v2) +
         2 * (A + B + C + D + E + F - v3) +
         2 * (A         - D     + F - v4) +
         2 * (                  F - v5) +
         2 * (A         + D     + F - v6) +
         2 * (A + B + C - D - E + F - v7) +
         2 * (        C     - E + F - v8) +
         2 * (A - B + C + D - E + F - v9)

Setting these equal to zero gives the following system
of six linear equations in six unknowns:

(1)  6A + 4C + 6F = (v1 + v3 + v4 + v6 + v7 + v9)
(2)  4B          = (v3 + v7 - v1 - v9)
(3)  4A + 6C + 6F = (v1 + v2 + v3 + v7 + v8 + v9)
(4)  6D          = (v3 + v6 + v9 - v1 - v4 - v7)
(5)  6E          = (v1 + v2 + v3 - v7 - v8 - v9)
(6)  6A + 6C + 9F = (v1 + v2 + v3 + v4 + v5 + v6 + v7 + v8 + v9)

Equations (2),(4),(5) are immediately solvable.
The remaining three can be solved using substitution.
The final solution is:

A = (v1 + v3 + v4 + v6 + v7 + v9 - 2*v2 - 2*v5 - 2*v8)/6
B = (v3 + v7 - v1 - v9)/4
C = (v1 + v2 + v3 + v7 + v8 + v9 - 2*v4 - 2*v5 - 2*v6)/6
D = (v3 + v6 + v9 - v1 - v4 - v7)/6
E = (v1 + v2 + v3 - v7 - v8 - v9)/6
F = (2*v2 + 2*v4 + 5*v5 + 2*v6 + 2*v8 - v1 - v3 - v7 - v9)/9

Finally we must find the x,y position that gives us the
maximum value for this surface. Taking partials with respect
to x and y gives:
```

```
  dS/dx = 2*Ax + By + D
  dS/dy = 2*Cy + Bx + E

Setting these equal to zero and solving gives x = (2*D*C - E*B) / (B*B - 4*A*C)
  y = (2*E*A - D*B) / (B*B - 4*A*C)

From which we can calculate the maximum score.

float A =  (v1 + v3 + v4 + v6 + v7 + v9 - 2*v2 - 2*v5 -
2*v8)/6;
  float B =  (v3 + v7 - v1 - v9)/4;
  float C =  (v1 + v2 + v3 + v7 + v8 + v9 - 2*v4 - 2*v5 -
2*v6)/6;
  float D =  (v3 + v6 + v9 - v1 - v4 - v7)/6;
  float E =  (v1 + v2 + v3 - v7 - v8 - v9)/6;
  float F =  (2*v2 + 2*v4 + 5*v5 + 2*v6 + 2*v8 - v1 - v3 - v7 -
v9)/9;

float det = (B*B - 4*A*C);
  if (fabs(det) < 0.0001)
    xoff = yoff = max = 0.0;
  else {
    xoff = (2*D*C - E*B) / det;
    yoff = (2*E*A - D*B) / det;
    max = (A * xoff * xoff + B * xoff * yoff + C * yoff * yoff
        D * xoff + E * yoff + F);
  }
  return;
}
*/

/*************************************************************/

// The following (from Freeman) method fits an x,y-independent
// parabola exactly to five control points.

void
QuadraticFit(float, float v1, float,
        float v2, float v3, float v4,
        float, float v5, float,
        float& xoff, float& yoff, float& max)
{

/*

Fit (exactly) the max correlation point and its four up/down,
  left/right neighbors with a function of the form:

a (x - b)^2 + c (y - d)^2 + e

This can describe a locally maximum parabola of arbitrary
position and
  shape, but is not a general 2nd order polynomial.

We can solve for the coefficients without doing a least
squares fit;
  the number of unknowns = number of coefficients.  5 equations
and 5
  unknowns:

v1
  v2 v3 v4
     v5 a (x1 - b)^2 + c (y1 - d)^2 + e = v1
  a (x2 - b)^2 + c (y2 - d)^2 + e = v2
```

```
    a (x3 - b)^2 + c (y3 - d)^2 + e = v3
    a (x4 - b)^2 + c (y4 - d)^2 + e = v4
    a (x5 - b)^2 + c (y5 - d)^2 + e = v5

Using x1 = 0, y1 = 1;  x2 = -1, y2 = 0;  etc, we have a b^2 + c (1 - d)^2 + e = v1
    a (1 + b)^2 + c d^2 + e = v2
    a b^2 + c d^2 + e = v3
    a (1 - b)^2 + c d^2 + e = v4
    a b^2 + c (1 + d)^2 + e = v5

Subtracting the 3rd equation from each of the other 4 gives (*)
    c (1 - 2d) = v1 - v3
    a (1 + 2b) = v2 - v3
    a (1 - 2b) = v4 - v3
    c (1 + 2d) = v5 - v3

Adding together the first and last, and the middle two
  equations, of (*)
    gives 2 c = v1 - v3 + v5 - v3
    2 a = v2 - v3 + v4 - v3

Then using the above to solve (*) for b and d, the desired
  positions of the
    center of the parabola, gives b = (v2 - v3) / (2 a)  - 1/2
    d = (v5 - v3) / (2 c)  - 1/2

*/ float c = (v1 - v3 + v5 - v3)/2.0;
    float a = (v2 - v3 + v4 - v3)/2.0;

if (fabs(a) > 0.001 && fabs(c) > 0.001) {
       float b = (v2 - v3) / (2*a) - 1.0/2;
       float d = (v5 - v3) / (2*c) - 1.0/2;
       xoff = b;
       yoff = d;
       max = a * (xoff - b)*(xoff - b) + c * (yoff - d)*(yoff - d)
+
         (v3 - a*b*b - c*d*d);
    } else {
       xoff = yoff = 0.0;
       max = v5;
    }
    return;
}
/*************************************************************
*** remote.cc

Bill Freeman, Craig Weissman
    MERL, Cmabridge
    7/94

Remote control handling routines for hand tracking tv program

Note: see the files that came with the infrared to PC
 interface
         for a description of the serial communication protocall
```

```
We will use the SIGALRM interupt to take care of timing while
allowing the rest of the program to continue. Since a single
command requires several different events, each of which
require
    timing, we will set up a sequence of signal catching routines
    that each initiate the next step of the pipeline.

See the files from the pcir software interface kit for detail
*****************************************************************
**/ include <time.h>
include <signal.h>
include <stdlib.h>
include "globals.h"
include "remote.h"
include "serial.h"
include "sakcodes.h"
include "struct.h"
include "message.h"

define MAX_WAK_TRIES 7
define MAX_SAK_TRIES 7 define REMOTE_DEBUG 0 int NeedToSendTwice(char *,char *);

/****************************************************************/

// Holds the list of command to send to the remote
static RemoteQueue remote_queue;

// Used for setting signal alarm timers
static struct itimerval itv;

// Indicates that the sending pipeline is idle and needs to be
// initiated
static int ready_to_send = 1;

// This contains a copy of the current command name int the
pipeline
static char current_command[20];

// The SAK code will determine which type of remote
static unsigned char remotetype = type5000_12;

// Number of tries used to timeout
static int num_WAK_tries;
static int num_SAK_tries;

/****************************************************************/

// Initiate the modem void
InitRemote()
{
  if (!OpenSerialIO())
    Error("Could not open serial port");

// Clear all fields in the timer structure other than the
  // timer microseconds
  itv.it_value.tv_sec = 0;
  itv.it_interval.tv_sec = 0;
  itv.it_interval.tv_usec = 0;
  return;
}
```

```c
/***************************************************************/
// End the modem connection void
EndRemote()
{
   if (!CloseSerialIO())
     Error("Could not close serial port");
   return;
}

/***************************************************************/

// Place a command onto the remote queue and start the timing
// process if necessary void
SendToRemote(char *command)
{
   static char last_command[100] = "";

// For the special NONE command, do nothing at all
   if (!strcmp(command,"NONE"))
     return;

// If the global remote flag isn't set then don't do anything
   if (!USE_REMOTE) return;

// Echo the command to the message window
   char msg[100]; sprintf(msg,"%s command sent to
remote.",command);
   Message(msg);

// Add the command to the queue
   remote_queue.Enqueue(command);
   if (NeedToSendTwice(command,last_command))
     remote_queue.Enqueue(command);
   strcpy(last_command,command);

// If the remote pipeline is idle then initiate the sending
process
   if (ready_to_send)
     SendFirstCommand();
   return;
}

/***************************************************************/ void
SendFirstCommand()
{
   // Begin the pipeline process so that subsequent calls
   // to SendToRemote() will know that the pipeline is busy
   ready_to_send = 0;

// Pull off the front command for processing
   strcpy(current_command,remote_queue.Front());

// Clear timeout counters
   num_WAK_tries = num_SAK_tries = 0;

// Wake up the remote and go from there
   SendWakeup();

return;
}
```

```c
/***************************************************************
**/
// Send the wakeup signal and check for WAK after a certain amount
// of time via catchWAK()

void
SendWakeup()
{
  Message("Sending WAK\n");
  num_WAK_tries ++;

// Sets DTR high in the process    ********
  if (!SendBreak())
    Error("Could not send break in SendFirstCommand()");

// Get ready to catch the WAK
  itv.it_value.tv_usec = 50000;
  signal(SIGALRM,catchWAK);
  if (setitimer(ITIMER_REAL,&itv,(struct itimerval*)0) == -1)
    Error("Error setting timer in SendWakup()");
  return;
}

/***************************************************************/

// Check to see if WAK was received. If not then send another
// Wakeup call unless timeout occurs void catchWAK(int i)
{
  // Read all current characters and check to see if one of the
  // was the WAK
  int done = 0;
  if (ReadyToRead()) {
    while (ReadyToRead()) {
      unsigned char temp;
      ReadSerial((char *)&temp);
      if (REMOTE_DEBUG)
      printf("num_WAK_tries: %d, %d read for WAK\n",
             num_WAK_tries,int(temp));
      if (int(temp) == WAK) done = 1;
    }
  }

// If a WAK was received then proceed to send the SEX
  // Otherwise try wakeup again
  if (!done) {
    if (num_WAK_tries < MAX_WAK_TRIES) {
      SendWakeup();
      return;
    } else {
      char msg[100];
      sprintf(msg,"Timout waiting for WAK on %s. Retrying",current_command);
      Message(msg);
      SendEnd();
      return;
    }
  }

// Send the serial execute command
  SendSEX();

return;
}
```

```c
/****************************************************************/

// Send the serial execute command and wait for the SAK.

void
SendSEX()
{
  Message("Sending SEX and command\n");
  num_SAK_tries ++;

// Every other repetition we will send the actual code so tha
after
  // when one of the SAK's is received it will immediately be
followed
  // by the correct key code.

unsigned char key = (num_SAK_tries % 2) ?
Decode(current_command) : SEX;

if (!WriteSerial(key))
    Error("Could not write SEX in SendSEX()");

// Set the timing for SAK
  itv.it_value.tv_usec = 100000;
  signal(SIGALRM,catchSAK);
  if (setitimer(ITIMER_REAL,&itv,(struct itimerval*)0) == -1)
    Error("Error setting timer in SendSEX()");
  return;
}

/****************************************************************/

// Check that a SAK was received. If not try sending the SEX
again void
catchSAK(int i)
{
  // Check all characters that have been received so far.
  int done = 0;
  if (ReadyToRead()) {
    while (ReadyToRead()) {
      unsigned char temp;
      ReadSerial((char *)&temp);
      if (REMOTE_DEBUG)
      printf("num_SAK_tries: %d, %d read for SAK\n",
             num_SAK_tries,int(temp));
      if (int(temp) == Decode(current_command)) done = 1;
    }
  }

// If SAK not received then try again until timeout
  if (!done) {
    if (num_SAK_tries < MAX_SAK_TRIES) {
      SendSEX();
      return;
    } else {
      char msg[100];
      sprintf(msg,"Timout waiting for SAK on %s.
Retrying",current_command);
      Message(msg);
      SendEnd();
      return;
    }
  }
```

```c
  //SendKey(Decode(current_command));

// One the SAK has been received we can be sure that the
remote
  // will be executing the next keycode. If we have done
everything
  // correctly then this command is done for sure so remove it
from
  // the queue now and end this pipeline sequence
  remote_queue.Dequeue();
  SendEnd();

return;
}
/*************************************************************/
void
SendKey(unsigned char fkey)
{
  if (!WriteSerial(fkey))
    Error("Could not write key code in SendKey()");

signal(SIGALRM,catchKey);
  if (setitimer(ITIMER_REAL,&itv,(struct itimerval*)0) == -1)
    Error("Error setting timer in SendKey()");
  return;
}
/*************************************************************/
void catchKey(int i)
{
  int done = 0;
  if (ReadyToRead()) {
    unsigned char temp;
    ReadSerial((char *)&temp);
    if (REMOTE_DEBUG)
      printf("%d read as echo\n",int(temp));
    if (temp == Decode(current_command)) done = 1;
  }
  if (!done) {
    if (REMOTE_DEBUG)
      printf("Incorrect echo\n");
    SendEnd();
    return;
  } remote_queue.Dequeue();
  SendEnd();
  return;
}
/*************************************************************/
void SendEnd()
{
  Message("Sending End\n");
  if (!SetDTR(LOW))
    Error("Could not set DTR low in SendEnd()");
  itv.it_value.tv_usec = 200000;
  signal(SIGALRM,catchEnd);
  if (setitimer(ITIMER_REAL,&itv,(struct itimerval*)0) == -1)
    Error("Error setting timer in SendEnd()");
  return;
}
/*************************************************************/
```

```
void
catchEnd(int i)
{
  if (!remote_queue.IsEmpty()) {
    SendFirstCommand();
  } else
    ready_to_send = 1;
  return;
}

/*************************************************************/ unsigned char
Decode(char *command)
{
  unsigned char fkey = 0;
  for (int temp = 0; temp < model[remotetype].maxkeys; temp++)
    if (strcmp(command,model[remotetype].keys[temp].key) == 0)
      fkey = model[remotetype].keys[temp].code;
      break;
    }
  }
  if (!fkey) {
    char msg[100];
    sprintf(msg,"Invalid command to decode: %s",command);
    Error(msg);
  }
  return fkey;
}

/*************************************************************/ void
ClearRemote()
{
//  remote_queue.Clear();
//  SendEnd();
  SetDTR(LOW);
  ready_to_send = 1;
  return;
}

/*************************************************************/ int
NeedToSendTwice(char *nw, char *last)
{
  if (!strcmp(nw,"MUTE"))
    return 0;
  else if (!strcmp(nw,"POWER"))
    return 0;
  else if (!strcmp(nw,"CHUP"))
    return (!strcmp(last,"CHDN"));
  else if (!strcmp(nw,"CHDN"))
    return (!strcmp(last,"CHUP"));
  else if (!strcmp(nw,"VOLUP"))
    return 0;
  else if (!strcmp(nw,"VOLDN"))
    return 0;
  return 0;
}

/************************************************************* search.cc

Bill Freeman, Craig Weissman
```

```
MERL, Cambridge
7/94

Search window routines for hand tracking tv program
*************************************************************/ include "globals.h"
include "search.h"

Rectangle srch;

/*************************************************************
*/

// Determine the upper-left corner and the width and height of
the
//    search window. Once tracking has started we no longer
search
//    everywhere.
// Note: we must ensure that the window edges fall on grid
points // The width and height depend on the Variance received from
// the Kalman Filter. SEARCH_MULTIPLIER determines the search
// size propotionality constant void
LimitSearchWindow(MotionVector& x_hat, VarianceVector& P)
{
  // Round the upper left corner to the best grid point
  srch.pos.x = round(x_hat.pos.x - P.pos.x * SEARCH_MULTIPLIER)
  srch.pos.x -= srch.pos.x % sub_w;
  srch.pos.x = MAX(0,srch.pos.x);
  srch.pos.y = round(x_hat.pos.y - P.pos.y * SEARCH_MULTIPLIER)
  srch.pos.y -= srch.pos.y % sub_h;
  srch.pos.y = MAX(0,srch.pos.y);

// Round the bottom right corner to the best grid point
  // and calculate the width and height
  int bot_x, bot_y;
  bot_x = round(x_hat.pos.x + P.pos.x * SEARCH_MULTIPLIER);
  bot_x -= bot_x % sub_w;
  srch.w = MIN(im_w,bot_x) - srch.pos.x;
  bot_y = round(x_hat.pos.y + P.pos.y * SEARCH_MULTIPLIER);
  bot_y -= bot_y % sub_h;
  srch.h = MIN(im_h,bot_y) - srch.pos.y;

// Ensure that even if things are wacky, we will have a valid
  // search window
  if (srch.w < 0) {
    if (srch.pos.x == im_w) srch.pos.x -= sub_w;
    srch.w = sub_w;
    //printf("Had to adjust search window in x-direction.\n");
  }
  if (srch.h < 0) {
    if (srch.pos.y == im_h) srch.pos.y -= sub_h;
    srch.h = sub_h;
    //printf("Had to adjust search window in y-direction.\n");
  } return;
}

/*************************************************************
/

// Start the search window as the entire image
// Note: we must ensure that window edges fall on grid points
```

```
void
SearchAllImage()
{
  // If we are averagin to make a filter then we should use the
  // entire background image since we are retrieving it anyway if (!IsSearch() && AVERAGING) {
    srch.pos.x = 0; srch.pos.y = 0; srch.w = im_w; srch.h =
im_h;
    return;
  } srch.pos.x = im_w/2 - round(im_w/2 * SEARCH_FRACTION);
  srch.pos.y = im_h/2 - round(im_h/2 * SEARCH_FRACTION);
  srch.pos.x -= (srch.pos.x % sub_w);
  srch.pos.y -= (srch.pos.y % sub_h);

srch.w = round(im_w * SEARCH_FRACTION);
  srch.h = round(im_h * SEARCH_FRACTION);
  srch.w -= (srch.w % sub_w);
  srch.h -= (srch.h % sub_h);
  return;
}

/************************************************************** serial.cc

Bill Freeman, Craig Weissman
  MERL, Cambridge
  8/94

Serial port routines for hand tracking tv program

Adpated from code by John Barrus

See the file readme.doc from the pcir software kit

**************************************************************/ include <stdio.h>
include <stdlib.h>
include <termios.h>
include <sys/ioctl.h>
include <sys/fcntl.h>
include <poll.h>
include <sys/modem.h>
include <unistd.h>
include "signal.h"
include "time.h"

include "serial.h"

define SERIAL_PORT "/dev/tty00"
define FAIL 0
define SUCCESS 1 define NUM_WRITE_TRIES 100 struct pollfd tty;

/**************************************************************
/ int OpenSerialIO(void)
{
  int BAUD = B4800;
```

```c
    if ((tty.fd = open(SERIAL_PORT, O_RDWR )) < 0) {
        printf("Could not open port %s.\n", SERIAL_PORT);
        perror("open");
        return FAIL;
    }
    tty.events = POLLIN | POLLOUT;
    //printf("Opened serial port with descriptor: %d.\n",tty.fd)

struct termios term;
    if (tcgetattr(tty.fd, &term) == -1) {
      fprintf(stderr,"Could not get attributes.\n");
      close(tty.fd);
      return FAIL;
    }
    cfsetispeed(&term,BAUD);
    cfsetospeed(&term,BAUD);
    term.c_cflag = HUPCL | CLOCAL | CREAD | BAUD | CS8;
    //term.c_cflag &= ~PARENB;
    //term.c_cflag &= ~CSTOPB;

if (tcsetattr(tty.fd, TCSANOW, &term) == -1) {
      fprintf(stderr,"Could not set attributes.\n");
      close(tty.fd);
      return FAIL;
    }
    if (!SetRTS(LOW)) {
      printf("Could not set RTS low.\n");
      return FAIL;
    } return SUCCESS;
}

/***************************************************************
***/ int CloseSerialIO()
{
  if (close(tty.fd) == -1)
    return FAIL;
  else
    return SUCCESS;
}

/***************************************************************
***/

// Write to the serial port int
WriteSerial(unsigned char ch)
{
  int count = 0;

while (!ReadyToWrite()) {
    count++;
    if (count > NUM_WRITE_TRIES) {
      printf("Serial port not ready for write after %d tries.\n",
             NUM_WRITE_TRIES);
      return FAIL;
    }
  } if (write(tty.fd, &ch, 1) != 1) {
    perror("Write failed: ");
    return FAIL;
  }
```

```
  return SUCCESS;
}

/******************************************************************
***/

// Read and return a character from the serial port int
ReadSerial(char *ch)
{
  int i  = int(read(tty.fd, ch, 1));
  return i;
}

/******************************************************************
***/

// Set DTR high or low int
SetDTR(int val)
{
  long arg;
  if (ioctl(tty.fd,MCGETA,&arg) == -1) {
    perror("MCGETA in ioctl failed: ");
    return FAIL;
  }
  if (val)
    arg |= MDTR;
  else
    arg &= ~MDTR;
  if (ioctl(tty.fd,MCSETA,&arg) == -1) {
    perror("MCSETA in ioctl failed: ");
    return FAIL;
  }
  return SUCCESS;
}

/******************************************************************
***/

// Set RTS high or low int
SetRTS(int val)
{
  long arg;
  if (ioctl(tty.fd,MCGETA,&arg) == -1) {
    perror("MCGETA in ioctl failed: ");
    return FAIL;
  }
  if (val)
    arg |= MRTS;
  else
    arg &= ~MRTS;
  if (ioctl(tty.fd,MCSETA,&arg) == -1) {
    perror("MCSETA in ioctl failed: ");
    return FAIL;
  }
  return SUCCESS;
}

/******************************************************************

// Return true if the serial port is ready to be read from int
ReadyToRead()
```

```
{
  poll(&tty,1,0);
  return tty.revents & POLLIN;
}

/*****************************************************************
// Return true if the serial port is ready to be written toward
int
ReadyToWrite()
{
  poll(&tty,1,0);
  return tty.revents & POLLOUT;
}

/***************************************************************** void catcherDTRhigh(int i)
{
  SetDTR(HIGH);
  return;
}

// Send the break signal to the serial port
int
SendBreak()
{
  struct itimerval itv;

itv.it_value.tv_sec = 0;
  itv.it_value.tv_usec = 250000;
  itv.it_interval.tv_sec = 0;
  itv.it_interval.tv_usec = 0;
  signal(SIGALRM, catcherDTRhigh);
  if (setitimer(ITIMER_REAL, &itv, (struct itimerval *) 0) ==
-1) {
    return FAIL;
  }
  if (tcsendbreak(tty.fd,100) == -1) {
    perror("Send Break failed: ");
    return FAIL;
  } return SUCCESS;
}

/*****************************************************************
int
FlushRead()
{
  if (tcflush(tty.fd,TCIFLUSH) == -1) {
    perror("Flush input failed: ");
    return FAIL;
  }
  return SUCCESS;
}

/***************************************************************** shadow.cc

Bill Freeman, Craig Weissman
  MERL, Cambridge
  7/94
```

```c
/****************************************************************
/ include "globals.h"
include "shadow.h"
include "panel.h"

// These coordinates hold the upper left hand corner of the
shadowed
// control panel in the actual video image if we were to assume
that
// the point at which the trigger gesture was found was located
at the
// origin of the hand cursor. After setting these coordinates
all other
// conversions are made relative to them.

extern Rectangle cursor;

static int xoffset;
static int yoffset;

/****************************************************************
/

// The position in the image always translates into some
position
// in the control panel when we are tracking. This function
allows
// us to specify what gets mapped to what. The position fil_pos
will
// now map to the control panel position start_pos on all
// subsequent calls to the conversion functions below void
SetShadowLocation(FPosition fil_pos,Position start_pos)
{
  xoffset =
    round(fil_pos.x -
(float(start_pos.x)*(im_w*IN_BOUNDS_FRACTION) /
                ENTIRE_WIDTH));
  yoffset =
    round(fil_pos.y -
(float(start_pos.y)*(im_h*IN_BOUNDS_FRACTION) /
                ENTIRE_HEIGHT));
  return;
}

/****************************************************************
/

// Draw the shadowed control panel in the given window void
DrawControlShadow(Window win)
{
  XDrawRectangle(dpy,win,red_gc,X_PtoI(0)>>sh,Y_PtoI(0)>>sh,
           W_PtoI(ENTIRE_WIDTH)>>sh,H_PtoI(ENTIRE_HEIGHT)>>sh);

XDrawRectangle(dpy,win,red_gc,X_PtoI(TRIM)>>sh,Y_PtoI(TRIM)>>sh
                W_PtoI(ENTIRE_WIDTH-
2*TRIM)>>sh,H_PtoI(im_h)>>sh);

for (Control *cp = Control::list; cp; cp = cp -> next)
    XDrawRectangle(dpy,win,red_gc,X_PtoI(cp->X())>>sh,Y_PtoI(cp
>Y())>>sh,
           W_PtoI(cp->W())>>sh,H_PtoI(cp->H())>>sh);
  return;
```

```c
}

/***************************************************************
*/
// The following convert coordinates in the control panel to
// coordinates in the small shadowed panel inside the image
window.
/***************************************************************
*/ int X_PtoI(float x)
{
   return xoffset +
round(float(x)*im_w*IN_BOUNDS_FRACTION/ENTIRE_WIDTH);
}

/***************************************************************
/ int Y_PtoI(float y)
{
   return yoffset +
round(float(y)*im_h*IN_BOUNDS_FRACTION/ENTIRE_HEIGHT);
}

/***************************************************************
/ int W_PtoI(float w)
{
   return round(IN_BOUNDS_FRACTION * w * im_w / ENTIRE_WIDTH);
}

/***************************************************************
/ int H_PtoI(float h)
{
   return round(IN_BOUNDS_FRACTION * h * im_h / ENTIRE_HEIGHT);
}

/***************************************************************
/
// The following convert coordinates inside the shadowed panel
// to coordinates in the real control panel.
/***************************************************************
/ int X_ItoP(float x)
{
   return round((x-
xoffset)*ENTIRE_WIDTH/(im_w*IN_BOUNDS_FRACTION));
}

/***************************************************************
/ int Y_ItoP(float y)
{
   return round((y-
yoffset)*ENTIRE_HEIGHT/(im_h*IN_BOUNDS_FRACTION));
}
```

```
/*************************************************************
  slideh.cc

Bill Freeman, Craig Weissman
  MERL, Cambridge
  7/94

Source file for horizontal slider control
*************************************************************/ include <stdlib.h> include "slideh.h"
include "panel.h"
include "remote.h"
include "digital.h"
include "sound.h"

define SHOW_CHANNEL 0 static void DrawThermometer(Position,int,int,int);

/*************************************************************/

// Constructor

Slideh::Slideh(Rectangle r1, int ticks, char *nme, char
*left_nme,
            char *right_nme, Position spos, int f_depth, int
wrap_flg,
            int use_therm, int pos, int slide_w, int slide_h)
{
  // Set basic parameters
  type = SLIDEH;
  x = r1.pos.x; y = r1.pos.y; w = r1.w; h = r1.h;
  num_ticks = ticks;

// Copy the strings
  name = new char[strlen(nme) + 1]; strcpy(name,nme);
  remote_name = new char[strlen(left_nme) + 1];
strcpy(remote_name,left_nme);
  remote_name2 = new char[strlen(right_nme)
+1];strcpy(remote_name2,right_nme);

// Set other parameters
  font_depth = (f_depth == DEF) ? font_depth : f_depth;
  position = (pos == DEF) ? (evenp(ticks) ? ticks / 2 :
(ticks+1)/2)  : pos;
  slide_width = round(0.04 * w);
  slide_height = round(h * 2.0);
  if (slide_w != DEF) slide_width = slide_w;
  if (slide_h != DEF) slide_height = slide_h;
  score_pos = spos;
  wrap_flag = wrap_flg;
  use_thermom = use_therm;

// Draw the control in the pixmap
  CreatePixmap();
  RoundedRectangle(pixmap,h/2+HIGHLIGHT,slide_height/2-h/2,
            w,h,gc,lgrey_gc,dgrey_gc);
  for (int i = 1; i <= num_ticks; i ++) {
    int x1 = h/2 + HIGHLIGHT + round(w * float(i) /
(num_ticks+1));
    XDrawLine(dpy,pixmap,black_gc,x1,slide_height/2-h/2,x1,
            slide_height/2+h/2);
  }
  XDrawString(dpy,pixmap,red_gc,
```

```
              h2+HIGHLIGHT+w/2-
XTextWidth(bigfstr,name,strlen(name))/2, slide_height/2+h/2+BIG_FONT_HT+font_depth,name,strlen(name));
}
/************************************************************/

// Return true iff the cursor's hot spot is over the control int
Slideh::IsInside(Rectangle cursor,Rectangle hot_spot)
{
  if (!IsVisible()) return 0;
  if (IsActive())

// If the control is active then we only need to be inside any
    // part of it between the slide height return (cursor.pos.x+hot_spot.pos.x+hot_spot.w > x &&
         (cursor.pos.y+hot_spot.pos.y+hot_spot.h >
         y + h/2 -slide_height/2) &&
         cursor.pos.x+hot_spot.pos.x < x + w &&
         cursor.pos.y+hot_spot.pos.y < y + h/2 + slide_height /
2);
  else // When the control is not active we must grab the
    // slider itself return ((cursor.pos.x+hot_spot.pos.x+hot_spot.w >
         SlideXPosition(position)) &&
         (cursor.pos.y+hot_spot.pos.y+hot_spot.h >
         y + h/2 -slide_height/2) &&
         (cursor.pos.x+hot_spot.pos.x <
         SlideXPosition(position)+slide_width) &&
         cursor.pos.y+hot_spot.pos.y < y + h/2 + slide_height /
2);
}
/************************************************************/

// Draw the mark over the appropriate spot on the slider void
Slideh::DrawMark()
{
  int flag = 0;
  if (IsCursor()) { flag = 1; DrawCursor(OFF); }

// Draw the red slider
  RaisedRectangle(main_win,SlideXPosition(position),y+h/2-
slide_height/2, slide_width,slide_height,lgrey_gc,mark_gc,dgrey_gc,3);

// If the slider is currently cleared then draw the shadow of
  // its restoration position if (save_pos)

XDrawRectangle(dpy,main_win,dgrey_gc,SlideXPosition(save_pos),
         y+h/2-slide_height/2+1,slide_width,slide_height-2)
  DrawNumber();
  if (flag) DrawCursor(ON);
  return;
}
```

```c
/**************************************************************/

// Draw the digital number or thermometer on the screen at the
// score position // Current size is always height = 100. This can be made a
parameter
// if desired void
Slideh::DrawNumber()
{
  if (use_thermom)
    DrawThermometer(score_pos,position,num_ticks,200);
  else
    DrawDigital(score_pos,position,100);
  return;
}

/**************************************************************/

// Draw a highlight border around the control. Note, Since we
can
// not draw an annulus along the edges we must draw the entire
// half circles and then paint over them void
Slideh::DrawHL()
{
  // First draw the top and bottom of the highlight
  XFillRectangle(dpy,main_win,hl_gc,x,y-
HIGHLIGHT,w+1,HIGHLIGHT);
  XFillRectangle(dpy,main_win,hl_gc,x,y+h,w+1,HIGHLIGHT);

// Now draw the left and right circular parts of the highligh
  XFillArc(dpy,main_win,hl_gc,x-h/2-HIGHLIGHT,y-HIGHLIGHT,
        h+2*HIGHLIGHT,h+2*HIGHLIGHT,64*90,180*64);
  XFillArc(dpy,main_win,hl_gc,x+w-h/2-HIGHLIGHT,y-HIGHLIGHT,
        h+2*HIGHLIGHT,h+2*HIGHLIGHT,270*64,180*64);

// Redraw the parts of the slide control that were covered by
  // drawing the highlight circles
  int thickness = HIGHLIGHT;
  XFillArc(dpy,main_win,gc,x-h/2,y,h,h,90*64,180*64);
  XFillArc(dpy,main_win,dgrey_gc,x+w-h/2,y,h,h,270*64,180*64);
  XFillArc(dpy,main_win,lgrey_gc,x-h/2+thickness,y+thickness,
        h-2*thickness,h-2*thickness,90*64,180*64);
  XFillArc(dpy,main_win,lgrey_gc,x+w-h/2+thickness,y+thickness,
        h-2*thickness,h-2*thickness,270*64,180*64);

return;
}

/**************************************************************
*/

// Peform the appropriate action for a hor. slider given an
action
// Also tell the cursor where to go afterwards.

void
Slideh::PerformAction(Action action)
{
  switch (action) {
  case Left:

// Unmute the attached control if there is a saved position
    if (save_pos && connected_control) {
```

```
      connected_control->PerformAction(Clear);
      position = save_pos;
      save_pos = 0;
      Draw();
    }

// Decrement the slider
    if (position > 1) {
      SlideSound();
      position--;
      Draw();
      SendToRemote(remote_name);

// If necessary, wrap around to the left
    } else if (wrap_flag) {
      SlideSound();
      position = num_ticks;
      Draw();
      SendToRemote(remote_name);
    }
    break;

case Right:

// Unmute the attached control if there is a saved position
    if (save_pos && connected_control) {
      connected_control->PerformAction(Clear);
      position = save_pos;
      save_pos = 0;
      Draw();
    }

// Increment the slider
    if (position < num_ticks) {
      SlideSound();
      position++;
      Draw();
      SendToRemote(remote_name2);

// If necessary, wrap around to the right
    } else if (wrap_flag) {
      SlideSound();
      position = 1;
      Draw();
      SendToRemote(remote_name2);
    }
    break;

case Clear:

// Clear the slider back to zero and save the position
(mute)
    save_pos = position;
    position = 1;
    Draw();
    break;

case Restore:

// Put the slider back where it was before muting
    if (save_pos) {
      position = save_pos;
      save_pos = 0;
      Draw();
    } break;

default:
    break;
  }
```

```
  return;
}

/***************************************************************
*/

// Return the current x coord of the mark if it were at positio
p inline int
Slideh::SlideXPosition(int p)
{
  return round(x + float(p) * w / (num_ticks+1) -
slide_width/2);
}

/***************************************************************
/

// If the control is a Slideh then cast it as such, Otherwise
NULL

Slideh *may_be_slideh(Control *control)
{
  if (slidehp(control))
    return (Slideh *)control;
  else
    return NULL;
}

/***************************************************************

// Return true iff the control is a Slideh int
slidehp(Control *control)
{
  return (control->type == SLIDEH);
}

/***************************************************************

// Perform the appropriate action on the slider given the
postion
// of the cursor void
Slideh::Adjust(Position pos)
{
  // Width of an increment
  int inc_length = w / (num_ticks+1);

// Make sure we stay within increment area
  if (pos.x <= x + inc_length/2)
    pos.x = x + inc_length;
  if (pos.x >= x + w - inc_length/2)
    pos.x = x + w - inc_length;

// Calculate the difference the cursor has moved and act
accordingly
  int curr_x = SlideXPosition(position);
  float change_x = float(pos.x - curr_x);
  Action action = NO_ACTION;
  if (change_x < 0) {
    change_x *= -1;
    action = Left;
  } else action = Right;
  int num_times = round(change_x / inc_length);
```

```cpp
  // Make the slider catch up with the cursor
  for (int i = 0; i < num_times; i++)
    PerformAction(action);
  return;
}
/*************************************************************/
// Clears the area where the control is located.

void
Slideh::UnDraw()
{
  int flag = 0;
  if (IsCursor()) { flag = 1; DrawCursor(OFF); }
  XClearArea(dpy,main_win,x-h/2-HIGHLIGHT,y+h/2-slide_height/2,
 w+h+2*HIGHLIGHT,slide_height+BIG_FONT_HT+font_depth+5,False);

// Also clear the digital number or thermometer
  if (use_thermom)
XClearArea(dpy,main_win,score_pos.x,score_pos.y,33,203,False);
  else
XClearArea(dpy,main_win,score_pos.x,score_pos.y,125,105,False);
  if (flag) { DrawCursor(ON); }
  return;
}
/*************************************************************/
// Make a pixmap containing the control in its original form
before
// any mark movement occurs. This allows redrawing the control
later.

void
Slideh::CreatePixmap()
{
  pixmap = XCreatePixmap(dpy,main_win,w+h+2*HIGHLIGHT,
            slide_height+BIG_FONT_HT+font_depth+5,
            DefaultDepth(dpy,screen));
  XFillRectangle(dpy,pixmap,black_gc,0,0,w+h+2*HIGHLIGHT,
         slide_height+BIG_FONT_HT+font_depth+5);
  return;
}
/*************************************************************/

// Draws the control without the mark void
Slideh::DrawPixmap()
{
  int flag = 0;
  if (IsCursor()) { flag = 1; DrawCursor(OFF); }
  XCopyArea(dpy,pixmap,main_win,gc,0,0,w+h+2*HIGHLIGHT,
        slide_height+BIG_FONT_HT+font_depth+5,
        x-h/2-HIGHLIGHT,y+h/2-slide_height/2);
  if (flag) DrawCursor(ON);
  return;
}
/*************************************************************/ void
DrawThermometer(Position score_pos,int position,int
num_ticks,int h)
```

```
{
   XDrawRectangle(dpy,main_win,gc,score_pos.x,score_pos.y,32,h+2);
     int t = round(float(h)*position/num_ticks);

XFillRectangle(dpy,main_win,black_gc,score_pos.x+1,score_pos.y+
   ,30,h);

XFillRectangle(dpy,main_win,red_gc,score_pos.x+1,score_pos.y+1+
   -t,30,t);
     return;
}
/************************************************************* slidev.cc

Bill Freeman, Craig Weissman
   MERL, Cambridge
   7/94

Source file for vertical slider control

*************************************************************/ include <stdlib.h> include "slidev.h"
include "panel.h"
include "remote.h"
include "digital.h"
include "sound.h"

/*************************************************************/

// Constructor

Slidev::Slidev(Rectangle r1, int ticks, char *nme, char *up_nme
               char *down_nme, Position spos, int f_depth, int pos
               int wrap_flg, int slide_w, int slide_h)
{
   // Set basic parameters
   type = SLIDEV;
   x = r1.pos.x; y = r1.pos.y; w = r1.w; h = r1.h;
   num_ticks = ticks;

// Copy the strings
   name = new char[strlen(nme) + 1]; strcpy(name,nme);
   remote_name = new char[strlen(up_nme) + 1];
strcpy(remote_name,up_nme);
   remote_name2 = new char[strlen(down_nme) + 1];
strcpy(remote_name2,down_nme);

// Set other parameters
   position = (pos == DEF) ? (evenp(ticks) ? ticks / 2 :
(ticks+1)/2) : pos;
   slide_width = round(2.0 * w);
   slide_height = round(h * 0.04);
   if (slide_w != DEF) slide_width = slide_w;
   if (slide_h != DEF) slide_height = slide_h;
   score_pos = spos;
   wrap_flag = wrap_flg;

// Draw the control in the pixmap
   CreatePixmap();
   RoundedVertRectangle(pixmap,slide_width/2-w/2,w/2+HIGHLIGHT,
                w,h,gc,lgrey_gc,dgrey_gc);
   for (int i = 1; i <= num_ticks; i ++) {
      int y1 = w/2 + HIGHLIGHT + round(h * float(i) /
(num_ticks+1));;
```

```
    XDrawLine(dpy,pixmap,black_gc,slide_width/2-w/2,y1,slide_width/2+w/2,y1);
  }
  XDrawString(dpy,pixmap,red_gc,
              slide_width/2-XTextWidth(bigfstr,name,strlen(name))/2,
              w+2*HIGHLIGHT+h+BIG_FONT_HT+font_depth,name,strlen(name));
}
/************************************************************/
int
Slidev::IsInside(Rectangle cursor, Rectangle hot_spot)
{
  if (!IsVisible()) return 0;
  if (IsActive())
    // If the control is active then we only need to be inside any
    // part of it between the slide height
    return ((cursor.pos.x+hot_spot.pos.x+hot_spot.w >
             x + w/2 - slide_width/2) &&
            cursor.pos.y+hot_spot.pos.y+hot_spot.h > y &&
            cursor.pos.x+hot_spot.pos.x < x + w/2 + slide_width / 2 &&
            cursor.pos.y+hot_spot.pos.y < y + h);
  else
    // When the control is not active we must grab the
    // slider itself
    return ((cursor.pos.x+hot_spot.pos.x+hot_spot.w >
             x + w/2 - slide_width/2) &&
            (cursor.pos.y+hot_spot.pos.y+hot_spot.h >
             SlideYPosition(position)) &&
            (cursor.pos.x+hot_spot.pos.x <
             x + w/2 + slide_width / 2) &&
            cursor.pos.y+hot_spot.pos.y <
            SlideYPosition(position)+slide_height);
}
/************************************************************/
// Draws the mark over the slider
void
Slidev::DrawMark()
{
  int flag = 0;
  if (IsCursor()) { flag = 1; DrawCursor(OFF); }
  RaisedRectangle(main_win,x+w/2-slide_width/2,SlideYPosition(position),
                  slide_width,slide_height,lgrey_gc,mark_gc,dgrey_gc,3);

// If the slider is currently cleared then draw the shadow of
  // its restoration position
  if (save_pos)
    XDrawRectangle(dpy,main_win,dgrey_gc,x+w/2-slide_width/2+1,
                   SlideYPosition(save_pos),slide_width-2,slide_height);
  DrawNumber();
  if (flag) DrawCursor(ON);
  return;
}
/************************************************************/
```

```
void
Slidev::DrawNumber()
{
  DrawDigital(score_pos,position,100);
  return;
}

/**************************************************************/ void
Slidev::DrawHL()
{
  XFillRectangle(dpy,main_win,hl_gc,x-
HIGHLIGHT,y,HIGHLIGHT,h+1);
  XFillRectangle(dpy,main_win,hl_gc,x+w,y,HIGHLIGHT,h+1);
  XFillArc(dpy,main_win,hl_gc,x-HIGHLIGHT,y-w/2-HIGHLIGHT,
        w+2*HIGHLIGHT,w+2*HIGHLIGHT,0,180*64);
  XFillArc(dpy,main_win,hl_gc,x-HIGHLIGHT,y+h-w/2-HIGHLIGHT,
        w+2*HIGHLIGHT,w+2*HIGHLIGHT,180*64,180*64);

int thickness = HIGHLIGHT;
  XFillArc(dpy,main_win,gc,x,y-w/2,w,w,0,180*64);
  XFillArc(dpy,main_win,dgrey_gc,x,y+h-w/2,w,w,180*64,180*64);
  XFillArc(dpy,main_win,lgrey_gc,x+thickness,y-w/2+thickness,
        w-2*thickness,w-2*thickness,0,180*64);
  XFillArc(dpy,main_win,lgrey_gc,x+thickness,y+h-w/2+thickness,
        w-2*thickness,w-2*thickness,180*64,180*64);
  return;
}

/**************************************************************
*/

// Perform the appropriate action for the control given the
message.
// Also tell the cursor where to go afterwards.

void
Slidev::PerformAction(Action action)
{
  switch (action) {
  case Up:

// Unmute the attached control if there is a saved position
    if (save_pos && connected_control) {
      connected_control->PerformAction(Clear);
      position = save_pos;
      save_pos = 0;
    } if (position > 1) {
      SlideSound();
      position--;
      Draw();
      SendToRemote(remote_name);
    } else if (wrap_flag) {
      SlideSound();
      position = num_ticks;
      Draw();
      SendToRemote(remote_name);
    } break;

case Down:

// Unmute the attached control if there is a saved position
    if (save_pos && connected_control) {
      connected_control->PerformAction(Clear);
      position = save_pos;
```

```
      save_pos = 0;
    } if (position < num_ticks) {
      SlideSound();
      position++;
      Draw();
      SendToRemote(remote_name2);
    } else if (wrap_flag) {
      SlideSound();
      position = 1;
      Draw();
      SendToRemote(remote_name2);
    } break;

case Clear:

// Clear the slider back to zero and save the position
(mute)
    save_pos = position;
    position = 1;
    Draw();
    break;

case Restore:

// Put the slider back where it was before muting
    if (save_pos) {
      position = save_pos;
      save_pos = 0;
      Draw();
    } break;

default:
    break;
  }
  return;
}
/***************************************************************
*/

// Return the current y coord of the slider inline int
Slidev::SlideYPosition(int p)
{
  return round(y + float(p) * h / (num_ticks+1) -
slide_height/2);
}

/***************************************************************

// If the control is a slidev then cast it as such, Otherwise
NULL

Slidev *may_be_slidev(Control *control)
{
  if (slidevp(control))
    return (Slidev *)control;
  else
    return NULL;
}

/***************************************************************

// Return 1 iff the control is a slidev int
```

```
slidevp(Control *control)
{
  return (control->type == SLIDEV);
}

/*************************************************************** void
Slidev::Adjust(Position pos)
{
  // Height of an increment
  int inc_length = h / (num_ticks+1);

// Make sure we stay within increment area
  if (pos.y <= y + inc_length/2)
    pos.y = y + inc_length;
  if (pos.y >= y + h - inc_length/2)
    pos.y = y + h - inc_length;

// Calculate the difference the cursor has moved and act
accordingly
  int curr_y = SlideYPosition(position);
  float change_y = float(pos.y - curr_y);
  Action action = NO_ACTION;
  if (change_y < 0) {
    change_y *= -1;
    action = Up;
  } else action = Down;
  int num_times = round(change_y / inc_length);

// Make the slider catch up with the cursor
  for (int i = 0; i < num_times; i++)
    PerformAction(action);
  return;
}

/***************************************************************/

// Clears the area where the control is located.

void
Slidev::UnDraw()
{
  int flag = 0;
  if (IsCursor()) { flag = 1; DrawCursor(OFF); }
  XClearArea(dpy,main_win,x+w/2-slide_width/2,y-w/2-HIGHLIGHT, slide_width,w+h+2*HIGHLIGHT+BIG_FONT_HT+font_depth+5,False);

XClearArea(dpy,main_win,score_pos.x,score_pos.y,125,105,False);
  if (flag) { DrawCursor(ON); }
  return;
}

/***************************************************************/

// Make a pixmap containing the control in its original form
before
// any mark movement occurs. This allows redrawing the control
later.

void
Slidev::CreatePixmap()
{
  pixmap = XCreatePixmap(dpy,main_win,slide_width,
                 w+h+2*HIGHLIGHT+BIG_FONT_HT+font_depth+5,
                 DefaultDepth(dpy,screen));
  XFillRectangle(dpy,pixmap,black_gc,0,0,slide_width,
          w+h+2*HIGHLIGHT+BIG_FONT_HT+font_depth+5);
```

```
    return;
}
/**************************************************************/
// Draws the control without the mark void
Slidev::DrawPixmap()
{
  int flag = 0;
  if (IsCursor()) { flag = 1; DrawCursor(OFF); }
  XCopyArea(dpy,pixmap,main_win,gc,0,0,slide_width,
          w+h+2*HIGHLIGHT+BIG_FONT_HT+font_depth+5,
          x+w/2-slide_width/2,y-w/2-HIGHLIGHT);
  if (flag) DrawCursor(ON);
  return;
}

/************************************************************** sound.cc

Bill Freeman, Craig Weissman
  MERL, Cambridge
  1/95

Source code for routines that implement the sounds for the
  hand tracking tv program.

Note:  XBell takes arguments from -100 (softest) to 100
(loudest).

**************************************************************/ include "sound.h"
include <X11/Xlib.h> extern Display *dpy;          // The X display

// Routine to play the sound when the trigger gesture is found void
TriggerSound()
{
    XBell(dpy, 0);
}
/**************************************************************/

// Routine to play the sound when a button is pressed void
ButtonSound()
{
    XBell(dpy, 0);
}
/**************************************************************/

// Routine to play the sound when a slider is moved void
SlideSound()
{
    XBell(dpy, 0);
}
```

```
/**************************************************************/
// Routine to play the sound when the arrows are pressed void
ArrowsSound()
{
    XBell(dpy, 0);
}
/**************************************************************/
/************************************************************** track.cc

Bill Freeman, Craig Weissman
   MERL, Cambridge
   6/94

Tracking routines for tv program.

**************************************************************/ include <signal.h> include "globals.h"
include "track.h"
include "panel.h"
include "video.h"
include "message.h"
include "search.h"
include "edit.h"
include "instructions.h"
include "filter.h"
include "remote.h"
include "shadow.h"
include "kalman.h"
include "sound.h"

/**************************************************************/ static int tracking_on = 0; // Whether tracking is on or off
static int search_on = 0;   // Whether searching is on or off
static int lost_count = 0;  // Number of iterations with low
score MotionVector old_x_hat;     // Previous position and velocity o
filter
VarianceVector old_P;       // Previous variance of filter

/**************************************************************
 */ static struct timeval last_poweroff;
static int first_time_delay = 1;

/**************************************************************
 */ void
StartDelay()
{
  struct timezone ignore;

first_time_delay = 0;
  gettimeofday(&last_poweroff,&ignore);
  return;
}
```

```
    /* Bill's code to delay restart
    int ii;

delay_trigger = ON;
      for (ii=0; ii<3000000; ii++)
        {    }
      delay_trigger = OFF;
    */
/***************************************************************
*/

// Return true if not enough time has elapsed since last
poweroff int
StillDelaying()
{
  struct timeval now;
  struct timezone ignore;

if (first_time_delay) return 0;
  gettimeofday(&now,&ignore);
  //printf("elapsed = %ld\n",ElapsedTime(&now,&last_poweroff));
  return (ElapsedTime(&now,&last_poweroff) < 2000);
}

/***************************************************************
*/

// Search the image for the signal to start tracking int
CheckTrigger()
{
  MotionVector measurement; float frac;
  float score = -1.0;

// When we just want to test the controls (using the mouse)
  // we wait for the user to click inside the video window.
  // Of course, they can also quit the program by typing Ctrl-C
  // Note: since this is meant as a debugging feature it does
  // not allow full range of control keys if (MOUSE_DEBUG) {

// Wait for a button of key press

Message("Waiting for trigger gesture...");
    XEvent ev;
    while (1) {
      XNextEvent(dpy,&ev);
      if (ev.type == ButtonPress || ev.type == KeyPress) break;
    }

// Start tracking
    if (ev.type == ButtonPress) {
      measurement.pos.x = ev.xbutton.x;
      measurement.pos.y = ev.xbutton.y;
      score = 1.0;

} else if (ev.type == KeyPress) {

// Quit program int ctrl = ev.xkey.state & ControlMask;
      char chr = XLookupKeysym(&ev.xkey,0);

// Exit on Ctrl-C
```

```
      if (chr=='c' && ctrl)
      return -1;
    }

}

// Everything else is for normal operation. First we search
for
  // the position of best match else {

// Make sure filter is valid
    if (!curr_fil->nm) {
      Message("Can not correlate with blank filter.\n"
           "No longer searching for filter.\n");
      TurnSearch(OFF); return 0;
    }

// Perform the correlation over the image
    score = Correlate(curr_fil,measurement,frac);

}

// If the score is high enough then start tracking
  // Also, make sure we have not powered off recently.
  // Note: since correlation is performed before this is
  //       checked we avoid a tight loop if (score > TRIGGER_THRESH && !StillDelaying()) {

// Make a noise
    TriggerSound();

// Initialize the motion parameters
    old_x_hat.pos.x = measurement.pos.x;
    old_x_hat.pos.y = measurement.pos.y;
    old_x_hat.disp.x = old_x_hat.disp.y = 0;
    InitVariance(old_P,score);
    TurnTracking(ON);
    Message("Trigger gesture found. Tracking in
progress...\n",CLEAR);

// Only search near the first location
    LimitSearchWindow(old_x_hat,old_P);
    lost_count = 0;

} else

// If the score wasn't high enough then just draw the image
    // and the best fit position DrawCorrelation(score,measurement.pos,measurement.pos,frac)

return 0;
}

/***************************************************************
*/

// Perform the correlation to search for the filter inside the
search
// window. If the score drops too low for too long then quit
tracking
// and return to search mode void
TrackFilter()
```

```
{
   float score;              // Correlation for the best filter
   float frac;               // Fraction of filter data used
   MotionVector measurement; // Measurement position of the
filter in the image
   MotionVector new_x_hat;   // New motion characteristics after
Kalman stage
   VarianceVector new_P;     // New variance after Kalman stage
   int confusion;            // Whether or not tracking is lost // When we are testing the controls with the mouse we
   // consider the "filter position" to be the location of the
   // mouse pointer if (MOUSE_DEBUG) { score = 1.0;
     Window w1,w2; int cx, cy, rx, ry; unsigned int mask;
     XQueryPointer(dpy,video_win,&w1,&w2,&rx,&ry,&cx,&cy,
             &mask);
     measurement.pos.x = float(cx);
     measurement.pos.y = float(cy);

}

// Everything else is for normal operation. First we find the
position
   // of best match else {

// Find out which filter matches best and with what score
     GetSample(score,measurement,frac);

}

// If score is high enough to be new motion if (score > TRACKING_THRESH)

// We are sure of our position
     lost_count = confusion = 0;

// Otherwise we might have lost the filter so keep track of
how
   // long we have not had a good score.

else { lost_count++;
     confusion = (lost_count > 1) ? 1 : 0;

// If we've been lost for a while then quit tracking if (lost_count > LOST_THRESH) {
       Message("Tracking has been stopped.");
       TurnTracking(OFF);
       return;
     }

// Just use the old position since we don't trust the new
one
     measurement = old_x_hat;

}

// Based on the new measurement, calculate the new cursor
position and
   // perfrom the movement
```

```
  // Use kalman filter first

ComputeNewMotion(old_x_hat,old_P,score,measurement,new_x_hat,ne
_P);

// Draw the image and the rectangles on the screen
  DrawCorrelation(score,new_x_hat.pos,measurement.pos,frac);

// Move the cursor
  DoMovement(new_x_hat,confusion);

// As long as something didn't occur that would stop us from
  // tracking anymore (since the above procedures can cause
that)
  // we get ready for the next iteration.

if (IsTracking()) {
    LimitSearchWindow(new_x_hat,new_P);
    old_x_hat = new_x_hat;
    old_P = new_P;
  }
  return;
}
/***************************************************************
*/

// True if tracking is on int
IsTracking() {   return tracking_on; }
/***************************************************************
*/

// True if searching is on int
IsSearch() { return search_on; }
/***************************************************************
*/

// Turn search off and clear correlation displays void
TurnSearch(int flag)
{
  static int first_flag = 1;

// Use whichever filter has been designated as the one to
  // start searching with (for when we have multiple filters).

InitialFilter();

if (flag == ON) {

// Turning searching on means we are no longer editing, and
    // that we are searching the entire window.

if (!IsSearch() || first_flag) {
      TurnEditFilter(OFF);
      search_on = 1;
      SearchAllImage();
    }

} else if (flag == OFF) {
```

```
    // Turning searching off puts us into debug mode (otherwise
nothing
    // would be visible). We also clear all windows that show
searching
    // results.

if (IsSearch() || first_flag) {
      if (!IsDebugMode())
     TurnDebugMode(ON);
      XClearWindow(dpy,edit_win);
      EraseScoreBox();
      XClearWindow(dpy,video_win);
      XClearWindow(dpy,score_win);
      SearchAllImage();
      search_on = 0;
    }
  } else
    Error("Illegal flag in TurnSearch()");

// Since the global state has changed we must reprint the
instructions
  Instructions();

first_flag = 0;
  return;
}

/***************************************************************
*/

// Reinitialize the tracking and control parameters after the
filter
// has been lost void
TurnTracking(int flag)
{
  if (flag == ON) {

// Turning tracking on means that the controls are now
visible
    // and that the cursor should appear at the specified start
    // position based on the image position from which the
trigger
    // gesture was found.

if (!IsTracking()) {
      tracking_on = 1;
      TurnVisibility(ON);
      InitCursor(old_x_hat.pos);
    } else
      Error("Attempt to turn on tracking when it is already
on");

} else if (flag == OFF) {

// Turning tracking off means that the controls are no
longer
    // visible, that we start searching with the inital filter
    // again, and we search over the entire window.

if (IsTracking()) {
      EndCursor();
      TurnVisibility(OFF);
      tracking_on = 0;
      InitialFilter();
// wtf removed      ClearRemote();
      SearchAllImage();
```

```
      } else
        Error("Attempt to turn off tracking when it is already
off");
    } else
      Error("Illegal flag in TurnTracking()");
    HandleStill();
    return;
}

/****************************************************************
*/

// Clear the score thermometer from wherever it is located void
EraseScoreBox()
{
    XClearArea(dpy,filter_win,0,0, round((im_w>>sh)*THERMOMETER_FRACTION),im_h>>sh,False);
    return;
}

/****************************************************************
*/

// Draw the image with the search window and the best match
rectangle
// Also draw the score thermometer.
// Also draw the edit picture of the filter.

void
DrawCorrelation(float val,FPosition& rect_pos, FPosition&
measure_pos,
                float frac_used)
{
    // Don't print ANYTHING if diagnostics are not on
    if (!IsDebugMode())
       return;

char msg[100];

// Fill in the image window and mark the search window

DrawImage(track_win);
    XDrawRectangle(dpy,track_win,blue_gc,srch.pos.x>>sh,
              srch.pos.y>>sh,srch.w>>sh,srch.h>>sh);

// Show the position of best match if (val > 0.0) {

// First draw it on top of the image representation window

XDrawRectangle(dpy,track_win,green_gc,
                 round(rect_pos.x-curr_fil->w/2)>>sh,
                 round(rect_pos.y-curr_fil->h/2)>>sh,
                 curr_fil->w>>sh,curr_fil->h>>sh);

// Now draw it on top of the video window itself

XClearWindow(dpy,video_win);
       XDrawRectangle(dpy,video_win,gc,round(rect_pos.x-curr_fil-
>w/2),
              round(rect_pos.y-curr_fil->h/2),curr_fil-
>w,curr_fil->h);
    }

// Draw the score thermometer and fill it to the correct leve
```

```
    EraseScoreBox();
    Rectangle therm;
    int win_w = EXTRA_WIDTH-TRIM;
    therm.pos.x = round(win_w*THERMOMETER_FRACTION/3.0);
    therm.pos.y = round((im_h>>sh)/6.0);
    therm.w     = round(win_w*THERMOMETER_FRACTION/3.0);
    therm.h     = round(2.0*(im_h>>sh)/3);
    int red_h = round(val*therm.h);

// Draw the thermometer
    XDrawRectangle(dpy,filter_win,gc,therm.pos.x-1,therm.pos.y,
            therm.w+2,therm.h+1);

// Draw the score in red
    XFillRectangle(dpy,filter_win,red_gc,therm.pos.x,
            therm.pos.y+(therm.h-red_h),therm.w,red_h);

// Print the score number to the right of the thermometer
    sprintf(msg,"%.2f",val);
    XDrawString(dpy,filter_win,gc,therm.pos.x+therm.w+5,
            therm.pos.y+(therm.h-red_h)+4,msg,strlen(msg));

// Draw the upper tick mark for the thermometer to the left int y = therm.pos.y+(therm.h - round(therm.h*TRIGGER_THRESH))
    XDrawLine(dpy,filter_win,gc,therm.pos.x-10,y,therm.pos.x-2,y)
    sprintf(msg,"%.2f",TRIGGER_THRESH);
    XDrawString(dpy,filter_win,gc,
            therm.pos.x-10-XTextWidth(smallfstr,msg,strlen(msg))
            y+4,msg,strlen(msg));

// Draw the lower tick mark for the thermometer to the left y = therm.pos.y+(therm.h - round(therm.h*TRACKING_THRESH));
    sprintf(msg,"%.2f",TRACKING_THRESH);
    XDrawLine(dpy,filter_win,gc,therm.pos.x-10,y,therm.pos.x-2,y)
    XDrawString(dpy,filter_win,gc,
            therm.pos.x-10-XTextWidth(smallfstr,msg,strlen(msg))
            y+4,msg,strlen(msg));

// Draw the separation line from the filters

XDrawLine(dpy,filter_win,gc,round(win_w*THERMOMETER_FRACTION),0 round(win_w*THERMOMETER_FRACTION),im_h>>sh);

// Draw the fraction of the filter that was used sprintf(msg,"Used: %.2f",frac_used);
    XDrawString(dpy,filter_win,gc,
            therm.pos.x+therm.w/2-
XTextWidth(smallfstr,msg,strlen(msg))/2,
            therm.pos.y+therm.h+22,msg,strlen(msg));

// Draw the blow up picture of the filter and nearby image
lines

DrawEditFilter(measure_pos);
    DrawEditImage(measure_pos);

return;
}
/****************************************************************
*/

// Check the current filter and (if needed) the ones on either
side
```

```
// for the best match void
GetSample(float& maxval, MotionVector& measurement, float &frac
{
  MotionVector temp_measurement; float temp_frac;
  float t;

maxval = 0.0;

// Always try the current filter
  if (curr_fil->nm &&
(t=Correlate(curr_fil,temp_measurement,temp_frac))
      > maxval) {
    maxval = t;
    measurement = temp_measurement;
    frac = temp_frac;
  }
  return;
}
/************************************************************

Name: tv.cc

Bill Freeman, Craig Weissman
  MERL, Cambridge
  6/94

Hand tracking program using Xv video interface and correlatio
  for tracking.

This program uses a representation dependent correlation scor
  to make a best guess as to where a template image is located
  in the video image in order to trace the movement of that
template.

The template image (filter) is convolved with each local
section
  of the image and the position of best match is displayed
graphically.
  Subsampling and limiting the search window are employed as
speedup
  techniques.

The motions of the template are used to control various
  onscreen virtual controls that are declared as full-fledged
  C++ entities.

The movements of these controls are then used to control
  the serial port which sends characters to a remote control to
  ideally control a real tv.

Various debugging tools are available including template
editing
  and raw data dumping.

************************************************************

NOTE: the various modules of the program should really be
        declared as C++ classes to avoid the Init..() and
      End..() calls, but that is left for another day.

************************************************************/ include <X11/Xlib.h>
include <X11/Xutil.h> include "globals.h"
include "tv.h"
```

```c
include "panel.h"
include "video.h"
include "filter.h"
include "track.h"
include "params.h"
include "remote.h"
include "gc.h"
include "mouse.h"
include "search.h"
include "instructions.h"

static void InitStill();
static void LoadStill();
static void EndStill();
static void PutStill(int);
static void MakeStill();
static XImage *still_image[NUM_CHANNELS];
static Colormap cmap;
XColor colors[256];

/**************************************************************/

// Name of the main window
char main_name[] = "Tracker";

// Coordinates of main window
const int main_x = 11;
const int main_y = 31;

/**************************************************************/

// Globals vars

Display *dpy;           // The X display
Window main_win;        // The main window of the application
long screen;            // The default screen of the X display
Pixmap pixmap;          // For black and white images GC gc;                  // White graphic context
GC green_gc, red_gc, blue_gc;
GC dgrey_gc,lgrey_gc;
GC yellow_gc, black_gc;
GC hl_gc;               // Highlight graphic context
GC mark_gc;             // Control mark graphic context
GC greys[NUM_GREYS];    // Grey scale graphic context Window video_win;       // Video window
Window track_win;       // Tracking window
Window filter_win;      // Filter orientation window
Window change_win;      // Map of image differences
Window edit_win;        // Window with edit map
Window message_win;     // Window with text
Window score_win;       // Window with score map
Window still_win;       // Window for still pictures Font bigfont;           // Font used for control names
XFontStruct *bigfstr;   // Font structure for control name font
Font smallfont;         // Font used for messages
XFontStruct *smallfstr;// Font structure for messages
Font vbigfont;          // Font used for big letters
XFontStruct *vbigfstr;  // Font structure for big letters int SHOULD_SAVE = 0;    // For internal use: to save an image as
dumped data

/*****************************************************************
***/

// Useful functions
```

```c
int SHOW_SCORES;
int BACKGROUND_SUBTRACT;
int AVERAGING;
int USE_STILL;

/***************************************************************
***/

// Display the windows and perform the hand tracking main(int argc,char **argv)
{
  /** INITIALIZATION **/
  GetParameters();
  InitWorld(argc,argv);

/*
  if (USE_STILL) {
    printf("\n\nLoading still images...\n\n");
    InitStill();
    LoadStill();
  }
  */

/** SEARCH? **/
  TurnSearch(SEARCH_ON || MOUSE_DEBUG);

/** GET FILTERS *****/
  GetFilters();
  DrawFilters();

// PrintGreyScales();

/** REQUEST MESSAGES ***/
  long event_mask = ButtonPressMask | ButtonReleaseMask;
  XSelectInput(dpy,edit_win,event_mask);
  XSelectInput(dpy,video_win,event_mask);
  event_mask = KeyPressMask;
  XSelectInput(dpy,main_win,event_mask);
  event_mask = ButtonPressMask;
  XSelectInput(dpy,filter_win,event_mask);
  event_mask = ButtonPressMask;
  XSelectInput(dpy,message_win,event_mask);

/** MAIN LOOP **/
  event_mask = ButtonPressMask | ButtonReleaseMask |
KeyPressMask;
  while (1) {

/** MOUSE INPUT **/
    XEvent event;
    if (0 != XCheckMaskEvent(dpy, event_mask, &event) )

// Check button presses
      if (event.type == ButtonPress) {
      if (event.xbutton.button == 1)
        ProcessButton1(event);
      else if (event.xbutton.button == 2)
        ProcessButton2(event);
      else if (event.xbutton.button == 3)
        ProcessButton3(event);

// Now check for keypresses
      } else if (event.type == KeyPress) { int ctrl = event.xkey.state & ControlMask;
      char chr = XLookupKeysym(&event.xkey,0);

// Exit on Ctrl-C
```

```
float MAX(float x,float y) { return x > y ? x : y; }
float MIN(float x,float y) { return x > y ? y : x; } int MAX(int x,int y) { return x > y ? x : y; }
int MIN(int x,int y) { return x > y ? y : x; } int round(float f) { return int(f + 0.5); }
/***************************************************************
***/

// Program parameters - see the file params for descriptions of
// what each of these controls int sub_w;              // Subsampling in x direction
int sub_h;              // Subsampling in y direction // Dynamics params int GRAD_FILTER_THRESH;
int GRAD_IMAGE_THRESH;
int BACKGROUND_THRESH;
float TRIGGER_THRESH;
float TRACKING_THRESH;

// Kalman filtering params float SEARCH_MULTIPLIER;
float MOTION_VARIANCE;

float KALMAN_SIGMOID_TOP;
float KALMAN_SIGMOID_BOTTOM;
//float KALMAN_SIGMOID_MEAN;
float KALMAN_SIGMOID_SPREAD;

// Sigmoid params for orientation based correlation float TRACKING_SIGMOID_TOP;
float TRACKING_SIGMOID_BOTTOM;
float TRACKING_SIGMOID_MEAN;
float TRACKING_SIGMOID_SPREAD;

// Background update params int TRACKING_BACKGROUND_COUNT;
int TRIGGER_BACKGROUND_COUNT;
float TRACKING_BACKGROUND_CONST;
float TRIGGER_BACKGROUND_CONST;

// Debugging/Visual params int ORIENT_DASH_LENGTH;
float BLOWUP_SCALE;
float IN_BOUNDS_FRACTION;
float SEARCH_FRACTION;
float THERMOMETER_FRACTION;
int LOST_THRESH;
int ACTIVITY_THRESH;

// Program flags int SHOW_DIFF_MAP;
int MAKE_HELP_FILE;
int DEBUGMODE;
int USE_REMOTE;
int SEARCH_ON;
int MOUSE_DEBUG;
int INTERPOLATE;
```

...

```c
    if (chr=='c' && ctrl) {
      break;

/** TOGGLES *******/

} else if (chr=='d' && ctrl) {
      ToggleDebugMode();
    } else if (chr=='r' && ctrl)
      ToggleRemote();
    else if (chr=='s' && ctrl) {
      ToggleScores();
    } else if (chr=='b' && ctrl) {
      ToggleDiffMap();
    } else if (chr=='f' && ctrl) {
      MakeStill();
    }

}

/** VIDEO PROCESSING ***/ if (!IsEditFilter()) {

// SHOULD_SAVE is to dump the image to disk
    if (!MOUSE_DEBUG) ConvertVideo(SHOULD_SAVE);
    SHOULD_SAVE = 0;

// Search as neessary
    if (IsSearch()) {
    if (IsTracking())
      TrackFilter();
    else
      if (CheckTrigger() == -1) break; // For MOUSE_DEBUG mode
    } else
      DrawImage(track_win);
    }
  }

/** CLEAN UP ***/
  EndWorld();
  return 0;
}
/***************************************************************
***/

// Initialize the display, etc.

void
InitWorld(int argc,char **argv)
{
  // Open display and screen
  if ((dpy = XOpenDisplay(NULL)) == NULL)
    Error("Can't connect to X server");
  screen = XDefaultScreen(dpy);

// Create and handle the main window
  main_win =
XCreateSimpleWindow(dpy,XDefaultRootWindow(dpy),0,0,
                    ENTIRE_WIDTH,ENTIRE_HEIGHT,5,
                    WhitePixel(dpy,screen),
                    BlackPixel(dpy,screen));

// Change the name and position to desired atributes
  XMapWindow(dpy,main_win);
  XTextProperty text;
  char *str = (char *)malloc(sizeof(char)*100);
  strcpy(str,main_name);
  XStringListToTextProperty(&str,1,&text);
```

```
  XSetWMName(dpy,main_win,&text);
  free(str);
  XMoveWindow(dpy,main_win,main_x,main_y);

// Wait for mapping of this window before proceeding
  XSelectInput(dpy,main_win,VisibilityChangeMask);
  XEvent event;
  while (1) {
    XNextEvent(dpy, &event);
    if (event.type == VisibilityNotify) break;
  }
  XSelectInput(dpy,main_win,False);

// Create the pixmap for the b/w maps
  pixmap = XCreatePixmap(dpy,main_win,im_w>>sh,im_h>>sh,8);

/***********************************************

IMPORTANT: Initialize the various modules here.
                If classes were used this would
              be done automatically.

***********************************************/

CreateGCs();
  InitControlPanel(argc,argv);
  InitRemote();
  InitVideo();

return;
}
/****************************************************************
/

// Perform clean-up operations void
EndWorld()
{
  //   if (USE_STILL) EndStill();

XFreePixmap(dpy,pixmap);
  EndControlPanel();
  EndVideo();
  EndRemote();
  DestroyGCs();

XUnmapWindow(dpy,main_win);
  XDestroyWindow(dpy,main_win);
  XCloseDisplay(dpy);
}

/****************************************************************
/

// Global error routines void
Error(char *str)
{
  printf("%s. Exiting\n",str);
  exit(-1);
}

/****************************************************************
/ include "control.h"
```

```
extern Control *channelp;
const char still_name[] = "stillshot";

/**************************************************************
/ void
LoadStill()
{
  char filename[100];
  FILE *fp;
  unsigned char data;
  short flag;

for (int p = 0; p < NUM_CHANNELS; p++) {
    flag = 0;
    still_image[p] =
XCreateImage(dpy,DefaultVisual(dpy,screen),8,ZPixmap,0,0,
                    im_w>>sh,im_h>>sh,8,0);
    still_image[p]->data =
      (char*)malloc(still_image[p]->bytes_per_line*(im_h>>sh));

sprintf(filename,"%s.%d",still_name,p);

if (!(fp = fopen(filename,"r"))) flag = 1;

for (int i = 0; i < (im_w>>sh); i++)
      for (int j = 0; j < (im_h>>sh); j++) {
      if (!flag) {
        fscanf(fp,"%c",&data);
        XPutPixel(still_image[p],i,j,colors[data].pixel);
      } else
        XPutPixel(still_image[p],i,j,BlackPixel(dpy,screen));
      }
  }

}

/**************************************************************
/ void
InitStill()
{
  // Black and white for still window
  cmap =
XCreateColormap(dpy,still_win,DefaultVisual(dpy,screen),
              AllocNone);
  XColor color;
  for (int i = 0; i < 256; i++) {
    color.red = color.blue = color.green = int(65535.0 * i /
256);
    if (XAllocColor(dpy,cmap,&color) == 0) {
      printf("Could not allocate color %d\n",i);
      colors[i].pixel = BlackPixel(dpy,screen);
    } else
      colors[i].pixel = color.pixel;
  }
  XSetWindowColormap(dpy,still_win,cmap);
}

/**************************************************************
*****/ void EndStill()
{
  XFreeColormap(dpy,cmap);
  for (int p = 0; p < NUM_CHANNELS; p++) {
    free(still_image[p]->data);
```

```
    XDestroyImage(still_image[p]);
  }
  return;
}

/***************************************************************
/ void
HandleStill()
{
  /*
  if (!USE_STILL) return;

if (IsTracking() && !USE_REMOTE && !DEBUGMODE) {
    //    XMapWindow(dpy,still_win);
    PutStill(channelp->Value());
  }
  */ return;
}

/***************************************************************
/ void
PutStill(int n)
{

XPutImage(dpy,still_win,gc,still_image[n],0,0,0,0,im_w>>sh,im_h
>sh);
  return;
}

/***************************************************************
/ void
MakeStill()
{
  int i;
  printf("Number of still to make: "); scanf("%d",&i);

XImage *still_image = XGetImage(dpy,video_win,0,0,im_w,im_h,
                        (long unsigned int)-1,ZPixmap);
  char *data = still_image->data + 1;

char filename[100];
  sprintf(filename,"%s.%d",still_name,i);
  FILE *fp = fopen(filename,"w");
  while (data < &still_image->data[4*im_w*im_h]) {
    fprintf(fp,"%c",*data); data += 4;
  }
  fclose(fp);
  return;
}

/***************************************************************
/

/***************************************************************
* video.cc
```

Bill Freeman, Craig Weissman
MERL, Cambridge
6/94

Video processing routines for the hand tracking tv program.
=============================================================

The actual image will be stored in an array of DataRep called
image.

Now for speed of computation image will be indexed as a singl
dimensional array so that image-wide operations will be done
by roving pointers with the double subscripting being done
implicitly.

Now in order to handle the correlation operation whereby a
filter will be placed on top of the image in such a way that
parts of the filter may extend over the edge of the image, we
will embed the actual image array inside a larger array
called image_with_padding. This array will be initializad to
all zeros originally. The real array (image) will then sit
with its origin at position
&(image_wtih_padding[pad_w][pad_h]),
although image_with_padding is actually declared as a single
dimensional array also.

image_with_padding:

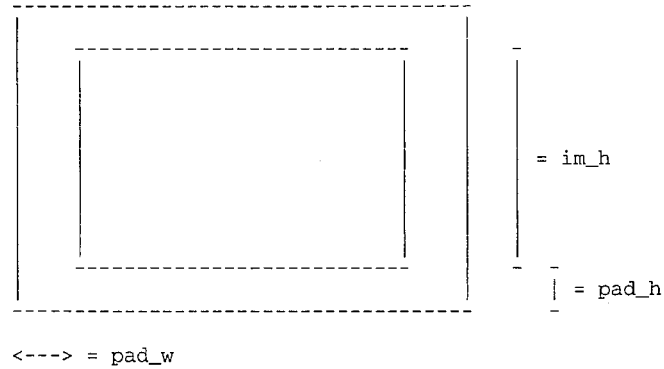

```
<---> = pad_w

<-------------------------> = im_w

<-----------------------------------> = im_row_length
```

The row length of image_with_padding is (2*pad_w+im_w), so
that
when we scan through image, we must add this amount to skip u
one row.

Note: Since image represents the search window, which changes
size during tracking of the filter, we must "zero-out" the
right and bottom boundaries of image at each iteration in
order
to ensure that the "padding" on these sides is correctly 0.

LOOPING THROUGH THE IMAGES:

The following describes the looping mechanism used here and
in other procedures that must scan some part of the image:

For speed the 2-d arrays will be searched consecutively by
pointers rather than doing repeated array indexing.

```
    The integer <blank>_row_length represents the amount that
    needs to be added to the pointer for that type in order
    to be at the next logical row. The integer
jump_to_next_<blank>_row
    is used to skip from the end of one logical row to the
beginning
    of the next, based upon the known scan length per line.

**************************************************************** include <X11/Xlib.h>
    #include <X11/Xutil.h>
    #include <X11/Xatom.h>
    #include <string.h> include "types.h"
    #include "globals.h"
    #include "rep.h"
    #include "video.h"
    #include "search.h"
    #include "shadow.h"
    #include "gc.h"

const int im_w = 320;    // Width of the image
    const int im_h = 240;    // Height of the image
    const int pad_w = 100;   // Half-width of the padding area
    const int pad_h = 100;   // Half-height of the padding area
    const int sh = 0;        // Bit shift factor from image to
    subwindows int im_row_length;       // Length of a memory row in the image
    matrix
    int im_col_length;       // length of a memory col in the image
    matrix // For internal use: to dump an image to disk
    static void SaveForBill();

/****************************************************************
/

// Here is the background image. The only field that matters
    // here is background->data which contains the rgb values
    // (stored in 4-byte blocks where the first is alwats zero)

static XImage *background;

// This will be dynamically allocated with padding once
    // subsampling has been read. See InitVideo() below static DataRep *image_with_padding;

/****************************************************************
/

// This is the actual image array that "floats" inside of
    // image_with_padding DataRep *image;

/****************************************************************
*********/

// Allocate space and initialize video variables before calling
    // ConvertVideo() for the first time.

void
    InitVideo()
    {
```

```
   // Figure out the lenght of an image row based upon the read
   // subsampling im_row_length = (2*pad_w+im_w)/sub_w;
   im_col_length = (2*pad_h+im_h)/sub_h;

// Dynamically allocate the image array and make image
   // point to the correct point inside so that it "floats"
   // inside of image_with_padding image_with_padding = new DataRep[im_row_length*im_col_length]
   image = &image_with_padding[im_row_length*pad_h/sub_h+
                   pad_w/sub_w];

// Initialize the background image if it will be used
   if (BACKGROUND_SUBTRACT || AVERAGING)
     background = XGetImage(dpy,video_win,0,0,im_w,im_h,
                 (long unsigned int)-1,ZPixmap);

// Clear the embedding array for image so that the
   // outer boundaries are always zero (actually only the left
   // and upper edges will stay zero since image will change
   // size even though its upper-left corner remains fixed)

memset((void *)image_with_padding,MemFillChar(),
       sizeof(DataRep)*im_row_length*im_col_length);

return;
}

/****************************************************************
*/

// Deallocate video resources after last call to ConvertVideo()

void
EndVideo()
{
   // Get rid of dynamically allocated image array
   delete image_with_padding;

// Get rid of background image if necessary
   if (BACKGROUND_SUBTRACT || AVERAGING)
     XDestroyImage(background);

return;
}

/****************************************************************
*/

// Convert the video to an orientation map.

void
ConvertVideo(int SHOULD_SAVE)
{
   static count = 0;

// For each time step - get an image only the size of the
search
   // window and process only that window. From this point onwar
   // we perform all tracking operations over this limited searc
window XImage *new_video =
XGetImage(dpy,video_win,srch.pos.x,srch.pos.y,
                  srch.w,srch.h,(long unsigned int)-1,
                  ZPixmap);
```

```
   // Update the background periodically if (BACKGROUND_SUBTRACT || AVERAGING) {
      if (IsTracking()) {
         if (!(count++ % TRACKING_BACKGROUND_COUNT) &&
!IsTracking())
         BlendIntoBackground();
      } else {
         if ((!(count++ % TRIGGER_BACKGROUND_COUNT) &&
!IsTracking()) ||
         AVERAGING)
         BlendIntoBackground();
      }
   }

// Clear the image array to ensure proper blank padding on
   // the right and bottom of the search window (this is really
only
   // needed to blank out the bottom and right edges)

memset((void*)(image-pad_w/sub_w),
       MemFillChar(),sizeof(DataRep)*im_row_length*
       ((srch.h+pad_h)/sub_h));

// Show the difference maps if necessary
   if (SHOW_DIFF_MAP && (BACKGROUND_SUBTRACT || AVERAGING))
      DrawDiffMap(new_video);

// Perform te actual calculations on the new picture and then
remove it
   VideoToImage(new_video);
   if (SHOULD_SAVE) SaveForBill();
   XDestroyImage(new_video);
   return;
}

/****************************************************************
/

// This procedure converts the video picture to a usable image
// representation.
//
// Only the grid points based on subsampling are examined.
//
// Only points where motion has occurred (based on comparison
with
// the background) become actual data during searching
//
// The actual representation is based on the change of Green
intensity
// across the pixel vertically and horizontally // These determine how many rows on the border to skip in order
to
// prevent Seg. Faulting since sometimes we want to use pixels
// that are displaced from our grid points. For instance, if we
// started with the upper left corner of the video image then
// we would exceed the array when we tried to find the left or
upper
// pixel there (we don't want to have tests for this condition
inside
// the loop since it will slow us down)

const int SKIP_UP = 1;
const int SKIP_LEFT = 1;
const int SKIP_DOWN = 1;
const int SKIP_RIGHT = 1;

void
```

```
VideoToImage(XImage *video)
{

// These are used to loop through the image and videos
  // We must start them at the appropriate array element
  // Since these are the three loop variables of interest
  // they are declared registers register unsigned char *vd = (unsigned char *)
    &video->data[4*(srch.w*SKIP_UP*sub_h+SKIP_LEFT*sub_w)];
  register unsigned char *bd = (unsigned char *)
    &background->data[4*(im_w*(srch.pos.y+SKIP_UP*sub_h)+
              srch.pos.x+SKIP_LEFT*sub_w)];
  register DataRep *im = image + SKIP_LEFT + im_row_length *
SKIP_UP;

// These are used to determine the end of a row or the end of
 the image unsigned char *lastvd = (unsigned char *)
    &video->data[4*(srch.w-SKIP_DOWN*sub_h)*(srch.h-
sub_h*SKIP_RIGHT)];
  unsigned char *last_in_this_row;

// We precompute some things to avoid having to do it many
times
  // within the loop const int sub_w_times_4 = sub_w * 4;
  int video_row_length = 4 * srch.w;
  int back_row_length = im_w * 4;

// These allow us to skip ahead at the end of the scan line t
the
  // beginning of the next scan line int jump_to_next_im_row =
    im_row_length - srch.w/sub_w + SKIP_LEFT + SKIP_RIGHT;
  int jump_to_next_video_row =
    sub_w_times_4 * (SKIP_LEFT + SKIP_RIGHT) + (sub_h-1) *
video_row_length;
  int jump_to_next_back_row =
    4 * (sub_h * im_w - srch.w + sub_w * (SKIP_LEFT +
SKIP_RIGHT));

// We have two different loops here based on the following
"if" statement
  // only so that we don't have to keep testing whether
searching is on
  // in the loop - i.e. for efficiency only.

// If we are not searching then just treat the entire image a
data if (!IsSearch() || !BACKGROUND_SUBTRACT)

while (vd < lastvd) { last_in_this_row =
      vd + video_row_length - sub_w_times_4 * (SKIP_LEFT +
SKIP_RIGHT);
      while (vd < last_in_this_row) {
      StoreValues(((AVERAGING && !IsSearch()) ? bd : vd),im);
      vd += sub_w_times_4; bd += sub_w_times_4; im ++;
      }
      vd += jump_to_next_video_row;
      bd += jump_to_next_back_row;
      im += jump_to_next_im_row;
    }
```

```
    // If searching is on then we only treat grid points where
motion
    // has occurred against the background as data else {

// These will be used to average in a close neighborhood of
the grid
        // point in order to decide whether a given location has
changed
        // enough from the background image that it should be
considered
        // foreground.

int avg_video_val,avg_back_val;

while (vd < lastvd) { last_in_this_row =
          vd + video_row_length - sub_w_times_4 * (SKIP_LEFT +
SKIP_RIGHT);
          while (vd < last_in_this_row) {

// Compute local averages and check for motion
        avg_video_val =
          SCALAR(vd-4)+SCALAR(vd-video_row_length)+SCALAR(vd+4);
        avg_back_val =
          SCALAR(bd-4)+SCALAR(bd-back_row_length)+SCALAR(bd+4);

if (abs(avg_back_val-avg_video_val) > BACKGROUND_THRESH)
          StoreValues(vd,im);
        else
          ClearValues(im);

vd += sub_w_times_4; bd += sub_w_times_4;
        im ++;
          }
          vd += jump_to_next_video_row;
          bd += jump_to_next_back_row;
          im += jump_to_next_im_row;
        }
    }
    return;
}

/***************************************************************
*/

// Display the image gradient threshold map on the screen void
DrawImage(Window win)
{

// This is intended to prevent X server errors from printing
too much
    // It doesn't always work static count = 0;
    count++;

// If diagnostics not on then don't print anything if (!IsDebugMode())
      return;

// Scan throught the image as described above and in
VideoToImage()
```

```
  register DataRep *im = image;
  DataRep *lastim = &image[im_row_length*(srch.h/sub_h-
1)+srch.w/sub_w];
  DataRep *last_in_this_row;

// Allow us to go to the next scan line
  int jump_to_next_row = im_row_length - srch.w/sub_w;

// Current position to draw the mark
  register int x = srch.pos.x;
  register int y = srch.pos.y;

XFillRectangle(dpy,pixmap,black_gc,0,0,im_w>>sh,im_h>>sh);
  while (im < lastim) { last_in_this_row = im + srch.w/sub_w;
    while (im < last_in_this_row) {
      DrawImageMark(pixmap,x>>sh,y>>sh,im);
      im ++; x += sub_w;
    }
    y += sub_h; x = srch.pos.x;
    im += jump_to_next_row;
  }

// To prevent an XIO error (?!?!) we cannot print this every
time
  // step during searching (presumably that much info confuses
the server)

if (/*!(count % 2) ||*/1 || IsTracking())

XCopyArea(dpy,pixmap,track_win,gc,0,0,im_w>>sh,im_h>>sh,0,0);

// Draw the control panel if we are currently tracking to giv
feedback to
  // the user.

if (IsTracking())
    DrawControlShadow(win);
  return;
}

/**************************************************************
*/

// When this is called a new image is retrieved and then mixed
with
// the old background. Depending on the size of the CONST, old
images
// will gradually fade away exponentially.

void
BlendIntoBackground()
{

// Get a new (full-scale) image to blend into the background
  XImage *new_back = XGetImage(dpy,video_win,0,0,im_w,im_h,
                    (long unsigned int)-1,ZPixmap);

// These will be used to scan through both arrays
  register unsigned char *nd = (unsigned char *)new_back->data;
  register unsigned char *bd = (unsigned char *)background-
>data;

// This will tell us when we are done
  unsigned char *lastnd = (unsigned char *)&new_back-
>data[4*im_w*im_h];
```

```
  // bc = background_const = the fraction of the new background
  //                         that is made up of the new image float bc = (AVERAGING) ? 0.1 :
  (IsTracking()) ? TRACKING_BACKGROUND_CONST :
TRIGGER_BACKGROUND_CONST;
  float one_minus_bc = 1 - bc;

while (nd < lastnd) {
    BLEND(bd,nd,one_minus_bc,bc);
    nd += 4; bd += 4;
  }
  XDestroyImage(new_back);
  return;
}

/****************************************************************
*/

// Display a grayscale difference image between the current
// image and the background void
DrawDiffMap(XImage *video)
{
  if (!IsDebugMode()) return;

// Move through the images
  register char *vd = &video->data[4*(sub_h*srch.w+sub_w)];
  register char *bd = &background->
    data[4*(im_w*(srch.pos.y+sub_h)+srch.pos.x+sub_w)];

// These tell us when we are done
  char *lastvd = &video->data[4*(srch.h-sub_h)*(srch.w-sub_w)];
  char *last_in_this_row;

// We are interested in the absolute value of the difference
  // between the current image and the background
  unsigned char diff;

// Precompute these for speed int video_row_length = 4 * srch.w;
  int back_row_length = 4 * im_w;
  int sub_w_times_4 = sub_w * 4;

// Thesea allow us to jump to the next scan line int jump_to_next_video_row = 4 * (srch.w * (sub_h - 1) + 2 *
sub_w);
  int jump_to_next_back_row = 4 * (sub_h * im_w - (srch.w - 2 *
sub_w));
  int jump_to_end_of_video_row = 4 * (srch.w - 2 * sub_w);

// Clear the pixmap
  XFillRectangle(dpy,pixmap,black_gc,0,0,im_w>>sh,im_h>>sh);

// The current point in the window to light up register int x = srch.pos.x + sub_w;
  register int y = srch.pos.y + sub_h;

// The local averages of the current and backrgound images
  // at a given point
  int avg_video_val, avg_back_val;

while (vd < lastvd) { last_in_this_row = vd + jump_to_end_of_video_row;
```

```
    while (vd < last_in_this_row) {

// Compute the difference and display it appropriately
        // We do this by averaging over the pixel and two of its
neighbors
        // and seeing whether the background and current image
differ
        // significantly.

avg_video_val =
        SCALAR(vd-4)+SCALAR(vd-video_row_length)+SCALAR(vd+4);
        avg_back_val =
        SCALAR(bd-4)+SCALAR(bd-back_row_length)+SCALAR(bd+4);
        diff = abs(avg_video_val-avg_back_val);

if (diff > BACKGROUND_THRESH)
        XDrawPoint(dpy,pixmap,gc,x>>sh,y>>sh);
        vd += sub_w_times_4; bd += sub_w_times_4; x += sub_w;
    }
    vd += jump_to_next_video_row;
    bd += jump_to_next_back_row;
    y += sub_h; x = srch.pos.x + sub_w;
  }
  XCopyArea(dpy,pixmap,change_win,gc,0,0,im_w>>sh,im_h>>sh,0,0)
  return;
}

/****************************************************************
*/

// Dump image data to a file for Bill void
SaveForBill()
{
  /*
  printf("Saving %d x %d\n",srch.w/sub_w,srch.h/sub_h);
  FILE *fp = fopen("im","w");
  for (int j = 0; j < srch.h/sub_w; j ++)
    for (int i = 0; i < srch.w/sub_h; i ++)
      fprintf(fp,"%c",image[i + im_row_length * j].g);
  fclose(fp);
  */
  return;
}

/****************************** xvutils.c

Bill Freeman, Craig Weissman
   MERL, Cambridge
   6/94

Utilities for the Xv interface
   of the HP VideLive card

******************************/ include <stdio.h>
include <stdlib.h>
include <stdarg.h>
include <math.h>
include <X11/Xlib.h>
include <X11/Xutil.h>
include <unistd.h>
extern "C" {
include <X11/Xv/Xvlib.h>
```

```
}
include "xvutils.h"

extern Display *dpy;
extern long screen;
extern Window main_win;
extern GC gc;

unsigned long depth = 8;
unsigned long vis_id = 32;

/****************************************************************

The following code was written by Michal Roth for the origina
   demonstration of hand gesture recognition.  It contains the Xv
   interface and has been treated here as a black box routine to
   present the video image.

****************************************************************/ void
MakeVideoWin(int argc,char **argv, Window& win, int x, int y,
             int desired_w, int desired_h)
{
   int i,status;
   unsigned long port;
   Atom eatom;
   int nEncodings;
   XvEncodingInfo *encodingInfo;
   XvEncodingInfo *enc;
   unsigned int event_base;

port = validateXv(argc, argv, &event_base);
   win = XCreateSimpleWindow(dpy, main_win,
 x,y,desired_w,desired_h,1,
             WhitePixel(dpy,screen),BlackPixel(dpy,screen));
   /*
   XSelectInput(dpy,win,VisibilityChangeMask);
   XMapWindow(dpy,win);
   while (1) {
     XNextEvent(dpy, &event);
     if (event.type == VisibilityNotify &&
       event.xvisibility.window == win)
       break;
   }
   XvSelectVideoNotify(dpy, win, True);
   */
   XSelectInput(dpy,win,False);

eatom = XInternAtom(dpy, "XV_ENCODING", True);
   if (eatom == (Atom)NULL)
     printf("XV encoding property is not set \n");
   XvQueryEncodings(dpy, port, &nEncodings, &encodingInfo);
     for (i=0; i<nEncodings; i++) {
       enc = &encodingInfo[i];
       if (strcmp(enc->name, "ntsc-svideo") == 0) {
         XvSetPortAttribute(dpy, port, eatom, enc->encoding_id);
         break;
       }
     }
   XvFreeEncodingInfo(encodingInfo);

int actual_w, actual_h;
   XvQueryBestSize(dpy, port, True, 640, 480, desired_w,
 desired_h,
                         &actual_w, &actual_h);
   if (desired_w != actual_w || desired_h != actual_h) {
     printf("Unable to get correct video dimensions. Exiting.\n\n");
```

```
    exit(-1);
  } status = XvSelectPortNotify(dpy, port, True);
  if (status == XvBadExtension) {
    printf("\n  Xv video extension is not available "
        "(XvSelectPortNotify)\n");
    printf("\n  demo terminated\n");
    exit(1);
  }
  if (status == XvBadAlloc) {
    printf("\nXv video extension (XvSelectPortNotify) failed "
        "to allocate memory to process request\n");
    printf("\n  demo terminated\n");
    exit(1);
  }
  status = XvPutVideo(dpy, port, win, gc, 0, 0, 640, 480,
              0, 0, desired_w, desired_h);
  if (status != Success) {
    printf("\n  Xv Put video failed\n");
    exit(1);
  }
  return;
}

/***************************************************************
*/ void
UseMsg()
{
  printf("\n\t-help          to print this info\n");
  printf("\n\n\tIncorrect command line parameters\n");
  exit(1);
}

/***************************************************************
*/

/* Read command line arguments and setup video extension */ int
Setup(int argc, char **argv, unsigned int nAdaptors,
      XvAdaptorInfo *pAdaptors, unsigned long *p_port,
      unsigned long *p_depth, unsigned long *p_vis_id)
{
  XvAdaptorInfo *pAdaptor;
  XvFormat      *pFormat;
  int           ii, adaptor, port, dept, visual_id;

adaptor = port = dept = visual_id = -1;

/* LOOK THROUGH COMMAND LINE ARGUMENTS */ for ( ii = 1; ii < argc; ii++ )
    {
      if (strcmp( argv[ii], "-adaptor") == 0)
      {
          if(++ii < argc)
            adaptor = atoi(argv[ii]);
            else
            UseMsg();
      }
      else if (strcmp( argv[ii], "-port") == 0)
      {
          if(++ii < argc)
            port = atoi(argv[ii]);
            else
            UseMsg();
```

```
      }
      else if (strcmp( argv[ii], "-depth") == 0)
      {
          if(++ii < argc)
            dept = atoi(argv[ii]);
             else
            UseMsg();
      }
      else if (strcmp( argv[ii], "-visual") == 0)
      {
          if(++ii < argc)
            visual_id = atoi(argv[ii]);
             else
            UseMsg();
      }
      else if (strcmp( argv[ii], "-help") == 0)
      {
        UseMsg();
      }
    } if (adaptor < 0)
    {
      pAdaptor = pAdaptors;
    }
  else
    {
      if (adaptor > nAdaptors)
      {
        printf("\n  Adaptor #%d doesn't exist.\n", adaptor);
        return False;
      }
      pAdaptor = pAdaptors+(adaptor-1);
    } if (port < 0)
    {
      port = pAdaptor->base_id;
    }
  else
    {
      if (port > pAdaptor->num_ports)
      {
        printf("\n  Port #%d doesn't exist for adaptor #%d.\n",
            port, adaptor);
        return False;
      }
    } pFormat = pAdaptor->formats;
  if (dept < 0)
    {
      dept = pFormat->depth;
    }
  else
    {
      for (ii=0; ii<pAdaptor->num_formats; ii++)
      {
        if (pFormat->depth == dept) break;
        pFormat++;
      } if (ii >= pAdaptor->num_formats)
      {
        printf("\n  Depth %d not supported by adaptor.\n", dept)
        return False;
      }
    }
```

```
   if (visual_id < 0)
      {
         visual_id = pFormat->visual_id;
      }
   else
      { pFormat = pAdaptor->formats;

for (ii=0; ii<pAdaptor->num_formats; ii++)
         {
            if ((pFormat->visual_id == visual_id) && pFormat->depth
== dept)
               break;
            pFormat++;
         } if (ii >= pAdaptor->num_formats)
         {
            printf("\n  Visual-id %d at depth %d not supported by
adaptor.\n",
               visual_id, dept);
            return False;
         }
      }

*p_port = port;
   *p_depth = dept;
   *p_vis_id = visual_id;

return True;
}
/****************************************************************
*/

/* Check that the Video extensions are available */ unsigned long  validateXv(int argc, char **argv,
                  unsigned int *p_event_base)
{ int         status;
   unsigned int   major_opcode;
   unsigned int   version;
   unsigned int   revision;
   unsigned int   error_base;
   unsigned int   nAdaptors;
   XvAdaptorInfo *pAdaptors;
   unsigned long port;

/* checks if Xv video extension is loaded on the current
system */
   status =
      XvQueryExtension(dpy, &version, &revision, &major_opcode,
                  p_event_base, &error_base);

if (status == XvBadExtension) {
      fprintf(stderr, "\n  Xv video extension not available for
that display\n");
      exit(1);
   }
   if (status == XvBadAlloc) {
      printf("\nXv video extension failed to allocate memory to
process request\n");
      exit(1);
   }
   XvQueryAdaptors(dpy, main_win, &nAdaptors, &pAdaptors);
```

```
  if (!nAdaptors) {
    fprintf(stderr, "\n  Your display has no video adaptors\n")
    exit(1);
  }

/* Setup video extension using command line params */
  if (!Setup(argc, argv, nAdaptors, pAdaptors, &port, &depth,
&vis_id)) {
    printf("\n  Setup failed.\n");
    exit(1);
  }
  return port;
}
/************************************************************** arrows.h

Bill Freeman, Craig Weissman
  MERL, Cambridge
  7/94

Header file for arrows control

**************************************************************/ ifndef _ARROWS
define _ARROWS include "control.h"
/**************************************************************/

// See control.h for a description of member functions class Arrows : public Control
{
public:
  Arrows(Rectangle,char *,Control *);
  void DrawMark();
  void PerformAction(Action);
  void Adjust(Position);
  void DeActivate();
};

/**************************************************************/

Arrows *may_be_arrows(Control *);
int arrowsp(Control *);

endif
/************************************************************** button.h

Bill Freeman, Craig Weissman
  MERL, Cambridge
  7/94

Header file for button control

**************************************************************/ ifndef _BUTTON
define _BUTTON include "control.h"
/**************************************************************/
```

```
// See control.h for a description of memeber functions class Button : public Control
{
public:
  Button(Rectangle,char *,char *,char *,int pos);
  void DrawMark();
  void PerformAction(Action);
  void Adjust(Position);
  void DeActivate();
  void Activate();
};

/****************************************************************/

Button *may_be_button(Control *);
int buttonp(Control *);

endif
/**************************************************************** clrrep.h

Bill Freeman, Craig Weissman
   MERL, Cambridge
   6/94

Representation dependent code for correlation in the
   hand tracking tv program based on color.

****************************************************************/ ifndef _REP
define _REP include <stdlib.h>
include "globals.h"

define BLUE_OFFSET 1
define GREEN_OFFSET 2
define RED_OFFSET 3

// Area radius over which to perform quadratic maximization
define DELTA 1

/****************************************************************/

// Representation used for point in the image.
//
//     len_sqrd: The length of the original gradient vector befor
//               normalization.
//
//     xsingle:  The single-angle normalized components needed to
correctly
//     ysingle   display the orientation maps.
//
//     xdouble:  The components of the double-angle normalized
vector
//     ydouble:  obtained by gradient analysis on the scalars.
//
//     score:    The correlation score at this image point typedef struct _DataRep {
  float score;
  short invalid;
  char r,g,b;
} DataRep;

/****************************************************************/
```

```
// Filter representation
//
// The filter is described only at valid points (that is why
// xoffset and yoffset are needed in DataRep) to save space
// and time.
//
//    nm      : Number of valid filter locations
//    w and h : Width and height used for displaying rectangles.
//    data    : The actual filter.

typedef struct _FilterDataRep {
  short on_flag;
  int xoffset, yoffset;
  DataRep data;
} FilterDataRep;

typedef struct _FilterRep {
  int nm;
  int w, h;
  int minx, miny;
  FilterDataRep array[MAX_FSIZE];
} FilterRep;
/***********************************************************/ inline int ShouldBeInFilter(DataRep *) { return 1; } inline void SetOffsets(FilterDataRep& fil, int x, int y)
{ x -= x % sub_w; y -= y % sub_h; fil.xoffset = x; fil.yoffset
y; } inline int XOffset(FilterDataRep *fil) { return fil->xoffset; } inline int YOffset(FilterDataRep *fil) { return fil->yoffset; } inline float Score(DataRep *data)
{ return data->score; } inline void ClearValues(DataRep *im)
{ im->r = im->g = im-> b = -128; im->invalid = 1; return; } inline int MemFillChar() { return -128; } inline void StoreValues(unsigned char *vd, DataRep *im)
{ im->r = *(vd+RED_OFFSET)-128;
  im->g = *(vd+GREEN_OFFSET)-128;
  im->b = *(vd+BLUE_OFFSET)-128;
  im->invalid = 0;
}
/***************************************************************
*/

// Representation dependent macros define BLEND(bd,nd,K1,K2) \
*(bd+GREEN_OFFSET) = round(K1* *(bd+GREEN_OFFSET) + K2*
*(nd+GREEN_OFFSET));

define SCALAR(pixel) int(*(pixel+GREEN_OFFSET)-128)

/**************************************************************/ void WriteOneFilterPos(FILE *, FilterDataRep*);
int ReadOneFilterPos(FILE *, FilterDataRep *, int);
void SetOffsets(FilterDataRep&,int,int);
void StoreValues(unsigned char *, DataRep *);
float Correlate(FilterRep *, MotionVector&, float&);
```

```
void MakeHelpFile(FilterRep *,MotionVector&,float);

void DrawEditFilterMark(Window,FilterDataRep*,float,FPosition
pos);
void DrawEditImageMark(Window,int,int,DataRep*,float);
void DrawImageMark(Pixmap,int,int,DataRep*);
void DrawFilterMark(Window,int,int,DataRep*);
void DrawToggleFilterMark(Window,FilterDataRep*,float);
void DrawLegend(Window,int,int,int);

endif
/****************************************************************
**** control.h

Bill Freeman, Craig Weissman
  MERL, Cambridge
  6/94

Header file for virtual controls for hand tracker

*****************************************************************
***/ ifndef _CONTROL
define _CONTROL include <X11/Xlib.h>
include "time.h"
include "globals.h"

/****************************************************************

// Default value for constructurs
const int DEF = -999;
// Thichness of highlights, etc.
const int HIGHLIGHT = 5;

/**************************************************************** typedef enum {DIAL, SLIDEH, SLIDEV, BUTTON, LATCH, ARROWS}
ControlType;

/****************************************************************

// Abstract base class for all controls class Control
{
public:

// Used to decide when to cast a control as a derived class
  ControlType type;

// Keep a linked list of all controls and initialize things
  Control() {

// Each time a control is created we add it to a global lis
    next = list;
    list = this;

// Control starts inactive with immediate activity upon
entry
    activity = 0;
    activity_thresh = 0;

// Control starts with visibility
    visibility = ON;
```

```
    // The name appears at some constant distance below the
control by default
    font_depth = NAME_SPC;

// The control is not connected to any others by default
    connected_control = (Control *)0;

}
static Control *list;
Control *next;

// Used to draw the control or its mark on the screen
void Draw();
virtual void UnDraw();   // Clear area
virtual void DrawPixmap();
virtual void DrawMark() = 0;
virtual void DrawHL();   // Draw Highlight // Performs the appropriate changes for the given action
virtual void PerformAction(Action) = 0;

// Determine which actions to take based on the given positio
virtual void Adjust(Position) = 0;

// Determines when the cursor is over a control
virtual int IsInside(Rectangle,Rectangle);

// Used to determine when the control is "lit"
// Activity is the number of consecutive times the
// cursor has been on top of that control
int IsActive();
void CheckNewActivity();
void ClearActivity();
virtual void Activate();
virtual void DeActivate();

// Visibility controls whether or not the control appears on
the
// screen and can be activated.
int IsVisible() { return (visibility == ON); }
void TurnVisibility(int);

// The following just give read access to protected data
char *Title() { return name; }
int Value() { return position; }
int X() { return x; } int Y() { return y; }
int W() { return w; } int H() { return h; }

// Connect this control to another control so that this
control
// can give the other one actions to perform
void ConnectToControl(Control *);

protected:

// For timing things using the system clock
struct timeval start_time;

// Position and dimensions
int x,y,w,h;

// Stores the original appearance for redrawing
Pixmap pixmap;

// Onscreen name(s) and remote command name(s)
char *name;
char *name2;
char *remote_name;
```

```
  char *remote_name2;

// Whether or not the control is "lit"
  int highlight_flag;

// Current position of mark
  int position;
  int num_ticks;

// Used to control delay before control is activated
  int activity;
  int activity_thresh;

// Used to repaint the control for mark movements
  virtual void CreatePixmap();

// Whether or not the control appears on the screen
  int visibility;

// A pointer to the control that this one can send actions to
  Control *connected_control;

// Number of pixels below control that name appears
  int font_depth;
};

/***************************************************************

// See control.cc for desciptions of these

Control *InsideControl(Rectangle,Rectangle);
void RaisedRectangle(Pixmap,int,int,int,int,GC,GC,GC,int
thickness=HIGHLIGHT);
void RoundedRectangle(Pixmap,int,int,int,int,GC,GC,GC,int
thickness=HIGHLIGHT);
void RoundedVertRectangle(Pixmap,int,int,int,int,GC,GC,GC,int
thickness=HIGHLIGHT);
void RaisedCircle(Pixmap,int,int,int,int);
long ElapsedTime(struct timeval *,struct timeval *);

endif

/*************************************************************** dial.h

Bill Freeman, Craig Weissman
  MERL, Cambridge
  7/94

Header file for dial control

***************************************************************/ ifndef _DIAL
define _DIAL include <stdlib.h> include "globals.h"
include "control.h"

/***************************************************************

// See control.h for a description of most member functions class Dial : public Control
```

```
{
public:
  Dial(Circle,int,const char *,const char *, const char *,
       int pos = DEF, float max = DEF, float min = DEF,
       int dot_dist = DEF, int tick_len = DEF,
       int dot_radius = DEF);
  void DrawMark();
  void DrawHL();
  void PerformAction(Action);
  int IsInside(Rectangle,Rectangle);
  void Adjust(Position);

// Returns the dial back to its original marked position
  void ReturnToMiddle();

private:

// Radius
  int r;

// Beginning and ending angles for marks
  float min_angle, max_angle;

// Radius of the mark
  int dot_radius;

// Thickness of the tick marks
  int tick_length;

// Distance of the mark from the dial's edge
  int dot_distance;

// Allows us to draw into different windows/pixmaps
  void DrawInto(Window,int,int);
};
/***********************************************************/

Dial *may_be_dial(Control *);
int dialp(Control *);

endif

/***************************************************************
 * digital.cc

Bill Freeman, Craig Weissman
   MERL, Cambridge
   8/94

Routines for digital numbers for hand tracking tv program

***************************************************************
 / ifndef _DIGITAL
define _DIGITAL include "types.h"
```

```
void DrawDigital(Position,int,int);
void DrawDigit(int,int,int,int);

endif
/*************************************************************** edit.h

Bill Freeman, Craig Weissman
  MERL, Cambridge
  7/94

Header file for routines for the blowup image of the filter, and
  for editting the filter.

*************************************************************** ifndef _EDIT
define _EDIT define TOGGLE 2
define PAD 1 void ChangeFilterPoint(int,int,int flag = TOGGLE);
void FinalizeEditFilter();
void DrawEditFilter(FPosition);
void DrawEditImage(FPosition);

float ComputeFactor();
void RemoveEditBlock(int,int,int,int);

endif
/***************************************************************
* filter.h

Bill Freeman, Craig Weissman
  MERL, Cambridge
  6/94

Header file for filter routines for the hand tracking tv
program.

***************************************************************
/ ifndef _FILTER
define _FILTER include "rep.h"

/***************************************************************

// Number of filters
define NUM_FILTS 1
define NUM_POS 1 extern FilterRep *curr_fil;

/**********************************************/ void MakeFilter(int, int, int, int);
void GetFilters();
void DrawFilters();
void SaveFilter();

void InitialFilter();
```

```
void BestFilter(DataRep *, MotionVector&, float&);
void FindFilter(int,int);

void GetFilter(int,int);
void ClearFilter(FilterRep *);

endif
/*************************************************************
  gc.cc

Bill Freeman, Craig Weissman
  MERL, Cmabridge
  8/94

Graphic context routines for hand tracking tv program

*************************************************************/ ifndef _GC
define _GC void CreateGCs();
void DestroyGCs();
void DrawBW(Window,int,int,int);
void DrawBWBox(Window,int,int,int);
void PrintGreyScale();

endif
/*************************************************************
  globals.h Bill Freeman, Craig Weissman
  MERL, Cambride
  7/94

Globals for hand tracking tv program.

*************************************************************/ ifndef _GLOBALS
define _GLOBALS include <X11/Xlib.h>
include "types.h"

// Maximum data points in a filter.
define MAX_FSIZE 1000

// Empirical height of fonts
define FONT_HT 12
define BIG_FONT_HT 24
define NAME_SPC 20 define ON 1
define OFF 0 ifndef _PI
define _PI
const float PI = 3.14159;
endif

/*************************************************************/

// Name of represenation - to choose correct files extern char rep_name[];
```

```c
/*************************************************************/
// Main X variables extern Display *dpy;
extern Window main_win;
extern long screen;
extern Pixmap pixmap;

/*************************************************************/
// Graphic contexts define NUM_GREYS 16
define LGREY 10
define DGREY 7 extern GC green_gc;
extern GC red_gc;
extern GC blue_gc;
extern GC hl_gc;      // Highlight graphic context
extern GC mark_gc;    // Control mark graphic context
extern GC yellow_gc;
extern GC greys[NUM_GREYS];

extern GC gc;
extern GC dgrey_gc;
extern GC lgrey_gc;
extern GC black_gc;

/*************************************************************/
// Windows extern Window video_win;
extern Window track_win;
extern Window filter_win;
extern Window change_win;
extern Window edit_win;
extern Window message_win;
extern Window score_win;
extern Window still_win;

/*************************************************************/
// Fonts extern Font bigfont;
extern XFontStruct *bigfstr;
extern Font smallfont;
extern XFontStruct *smallfstr;
extern Font vbigfont;
extern XFontStruct *vbigfstr;

/*************************************************************/
// Global dimensions extern const int im_w;
extern const int im_h;
extern const int pad_w;
extern const int pad_h;
extern const int sh;

extern int im_row_length;
extern int im_col_length;

extern int sub_w;
extern int sub_h;
```

```
/****************************************************************/

// Global control parameters.
// See file: params  for a description of each extern int GRAD_FILTER_THRESH;
extern int GRAD_IMAGE_THRESH;
extern int BACKGROUND_THRESH;
extern float TRIGGER_THRESH;
extern float TRACKING_THRESH;

extern float SEARCH_MULTIPLIER;
extern float MOTION_VARIANCE;

extern float KALMAN_SIGMOID_TOP;
extern float KALMAN_SIGMOID_BOTTOM;
//extern float KALMAN_SIGMOID_MEAN;
extern float KALMAN_SIGMOID_SPREAD;

extern float TRACKING_SIGMOID_TOP;
extern float TRACKING_SIGMOID_BOTTOM;
extern float TRACKING_SIGMOID_MEAN;
extern float TRACKING_SIGMOID_SPREAD;

extern int TRACKING_BACKGROUND_COUNT;
extern int TRIGGER_BACKGROUND_COUNT;
extern float TRACKING_BACKGROUND_CONST;
extern float TRIGGER_BACKGROUND_CONST;

extern float IN_BOUNDS_FRACTION;
extern float SEARCH_FRACTION;
extern int ORIENT_DASH_LENGTH;
extern float THERMOMETER_FRACTION;
extern float BLOWUP_SCALE;
extern int LOST_THRESH;
extern int ACTIVITY_THRESH;

extern int SHOW_DIFF_MAP;
extern int MAKE_HELP_FILE;
extern int DEBUGMODE;
extern int USE_REMOTE;
extern int SEARCH_ON;
extern int SHOW_SCORES;
extern int BACKGROUND_SUBTRACT;
extern int INTERPOLATE;
extern int AVERAGING;
extern int USE_STILL;

// For internal use only when we want to test the control flow
extern int MOUSE_DEBUG;

/****************************************************************/

// The following functions (declared in several different code files)
// are included here since they access the "state" of the program at
// the current instant and are needed by various modules // Defined in panel.cc
int IsDebugMode();
void TurnDebugMode(int);

// Defined in track.cc
int IsSearch();
void TurnSearch(int);
int IsTracking();
void TurnTracking(int);
```

```
// Defined in edt.cc
int IsEditFilter();
void TurnEditFilter(int);

// Defined in panel.cc
void TurnVisibility(int);
int IsVisible();
/**************************************************************/

// Defined in tv.cc float MAX(float,float);
float MIN(float,float);
int MAX(int,int);
int MIN(int,int);
int round(float f);
void Error(char *);
inline int evenp(int n) { return ((n/2)*2 == n) ? 1 : 0; }
void HandleStill();

endif

/************************************************************* greenrep.h

Bill Freeman, Craig Weissman
   MERL, Cambridge
   6/94

Representation dependent code for correlation in the
   hand tracking tv program based on green component of color.

*************************************************************/ ifndef _REP
define _REP include <stdlib.h>
include "globals.h"

define BLUE_OFFSET 1
define GREEN_OFFSET 2
define RED_OFFSET 3

// Area radius over which to perform quadratic maximization
define DELTA 1
/*********************************************************/

// Representation used for point in the image.
//
//    len_sqrd: The length of the original gradient vector befor
//              normalization.
//
//    xsingle:  The single-angle normalized components needed to
correctly
//    ysingle   display the orientation maps.
//
//    xdouble:  The components of the double-angle normalized
vector
//    ydouble:  obtained by gradient analysis on the scalars.
//
//    score:    The correlation score at this image point typedef struct _DataRep {
```

```
  float score;
  short invalid;
  char r,g,b;
} DataRep;

/*****************************************************/

// Filter representation
//
// The filter is described only at valid points (that is why
// xoffset and yoffset are needed in DataRep) to save space
// and time.
//
//    nm      : Number of valid filter locations
//    w and h : Width and height used for displaying rectangles.
//    data    : The actual filter.

typedef struct _FilterDataRep {
  short on_flag;
  int xoffset, yoffset;
  DataRep data;
} FilterDataRep;

typedef struct _FilterRep {
  int nm;
  int w, h;
  int minx, miny;
  FilterDataRep array[MAX_FSIZE];
} FilterRep;

/*****************************************************************
*/

// Representation dependent macros define BLEND(bd,nd,K1,K2) \
*(bd+GREEN_OFFSET) = round(K1* *(bd+GREEN_OFFSET) + K2*
*(nd+GREEN_OFFSET));

define SCALAR(pixel) int(*(pixel+GREEN_OFFSET)-128)

/*************************************************************/ inline void SetOffsets(FilterDataRep& fil, int x, int y)
{ x -= x % sub_w; y -= y % sub_h; fil.xoffset = x; fil.yoffset
y; } inline int ShouldBeInFilter(DataRep *) { return 1; } inline int XOffset(FilterDataRep *fil) { return fil->xoffset; } inline int YOffset(FilterDataRep *fil) { return fil->yoffset; } inline float Score(DataRep *data) { return data->score; } inline void ClearValues(DataRep *im)
{ im->g = -128; im->invalid = 1; } inline void StoreValues(unsigned char *vd, DataRep *im)
{ im->g = SCALAR(vd); im->invalid = 0; } inline int MemFillChar() { return -128; }

/*************************************************************/ void WriteOneFilterPos(FILE *, FilterDataRep*);
int ReadOneFilterPos(FILE *, FilterDataRep *, int);
void SetOffsets(FilterDataRep&,int,int);
float Correlate(FilterRep *, MotionVector&, float&);
```

```
void MakeHelpFile(FilterRep *,MotionVector&,float);

void DrawEditFilterMark(Window,FilterDataRep*,float,FPosition
pos);
void DrawEditImageMark(Window,int,int,DataRep*,float);
void DrawImageMark(Pixmap,int,int,DataRep*);
void DrawFilterMark(Window,int,int,DataRep*);
void DrawToggleFilterMark(Window,FilterDataRep*,float);
void DrawLegend(Window,int,int,int);

endif
/*********************************************************** instructions.h

Bill Freeman, Craig Weissman
  MERL, Cambridge
  8/94

Header file for program instructions for hand tracking tv
progrm

***********************************************************/ ifndef _INSTRUCTIONS
define _INSTRUCTIONS void Instructions();

endif
/*************************************************************
* kalman.h

Bill Freeman, Craig Weissman
  MERL, Cambridge
  6/94

Header file for Kalman fitler routines for the hand tracking
tv
  program.

*************************************************************/ ifndef _KALMAN
define _KALMAN

/************************************************************* void InitVariance(VarianceVector&, float);
void ComputeNewMotion(MotionVector&, VarianceVector&, float,
                MotionVector&, MotionVector&, VarianceVector&);

/*************************************************************
*/ float ScoreFunction(float);
VarianceVector ComputeMeasurementVar(float);
VarianceVector ComputeKalmanGain(VarianceVector&,
VarianceVector&);

endif

/********************************************************* latch.h
```

```
Bill Freeman, Craig Weissman
MERL, Cambridge
7/94

Header file for latch control
***********************************************************/ ifndef _LATCH
define _LATCH include "control.h"
/***********************************************************/

// See control.h for a description of member functions class Latch : public Control
{
public:
  Latch(Rectangle,char *,char *,char *,int val);
  void DrawMark();
  void PerformAction(Action);
  int IsInside(Rectangle,Rectangle);
  void Adjust(Position);
};

/***********************************************************/

Latch *may_be_latch(Control *);
int latchp(Control *);

endif

/*********************************************************** message.h

Bill Freeman, Craig Weissman
  MERL, Cambridge
  7/94

Meader file for message printing routines for hand tracking t
program.
***********************************************************/ ifndef _MESSAGE
define _MESSAGE define CLEAR 1
define DONT_CLEAR 0
define FREEZE 1
define DONT_FREEZE 0
define REFREEZE 2 void Message(char *, int clear_flag = CLEAR, int freeze_flag =
DONT_FREEZE);

endif

/***********************************************************
*
```

```
  mouse.h

Bill Freeman, Craig Weissman
  MERL, Cambridge
  8/94

Header file for mouse click processing routines for hand
tracking
  tv program
***************************************************************
/ ifndef _MOUSE
define _MOUSE include <X11/Xlib.h> void ProcessButton1(XEvent&);
void ProcessButton2(XEvent&);
void ProcessButton3(XEvent&);

void ToggleScores();
void ToggleDebugMode();
void ToggleDiffMap();
void ToggleRemote();
void GetReleasePoint(int&,int&);

endif
/*************************************************************** orientrep.h

Bill Freeman, Craig Weissman
  MERL, Cambridge
  6/94

Representation dependent code for correlation in the
  hand tracking tv program based on orientation.

***************************************************************/ ifndef _REP
define _REP include <stdlib.h>
include "globals.h"

define BLUE_OFFSET 1
define GREEN_OFFSET 2
define RED_OFFSET 3

// Area radius over which to perform quadratic maximization
define DELTA 1

/*******************************************************/

// Representation used for point in the image.
//
//     len_sqrd: The length of the original gradient vector befor
//               normalization.
//
//     xsingle: The single-angle normalized components needed to
correctly
//     ysingle   display the orientation maps.
//
//     xdouble: The components of the double-angle normalized
vector
```

```
//    ydouble:  obtained by gradient analysis on the scalars.
//
//    score:    The correlation score at this image point typedef struct _DataRep {
  long len_sqrd;
  float xsingle,ysingle;
  float xdouble,ydouble;
  float score;
} DataRep;
/*******************************************************/

// Filter representation
//
// The filter is described only at valid points (that is why
// xoffset and yoffset are needed in DataRep) to save space
// and time.
//
//    nm       : Number of valid filter locations
//    w and h  : Width and height used for displaying rectangles.
//    data     : The actual filter.

typedef struct _FilterDataRep {
  short on_flag;
  int xoffset, yoffset;
  DataRep data;
} FilterDataRep;

typedef struct _FilterRep {
  int nm;
  int w, h;
  int minx, miny;
  FilterDataRep array[MAX_FSIZE];
} FilterRep;
/*******************************************************/ inline int XOffset(FilterDataRep *fil)
{ return fil->xoffset; }
inline int YOffset(FilterDataRep *fil)
{ return fil->yoffset; } inline int AboveFilterThresh(DataRep *data)
{ return data->len_sqrd > GRAD_FILTER_THRESH; } inline int AboveImageThresh(DataRep *data)
{ return data->len_sqrd > GRAD_IMAGE_THRESH; } inline float XSingleAngle(DataRep *data)
{ return data->xsingle; }
inline float YSingleAngle(DataRep *data)
{ return data->ysingle; } inline float XDoubleAngle(DataRep *data)
{ return data->xdouble; }
inline float YDoubleAngle(DataRep *data)
{ return data->ydouble; } inline float Score(DataRep *data)
{ return data->score; } inline int ShouldBeInFilter(DataRep *im)
{ return AboveFilterThresh(im); } inline void ClearValues(DataRep *im) {} inline int MemFillChar() { return 0; }
```

```c
/**********************************************************/
define BLEND(bd,nd,K1,K2) \
*(bd+GREEN_OFFSET) = round(K1* *(bd+GREEN_OFFSET) + K2*
*(nd+GREEN_OFFSET));

define SCALAR(pixel) int(*(pixel+GREEN_OFFSET))

/**********************************************************/
void WriteOneFilterPos(FILE *, FilterDataRep*);
int ReadOneFilterPos(FILE *, FilterDataRep *, int);
void SetOffsets(FilterDataRep&,int,int);
void StoreValues(unsigned char *, DataRep *);
float Correlate(FilterRep *, MotionVector&, float&);
DataRep* Correlate_One_Filter(FilterRep *, DataRep *, int, int,
MotionVector&, float&, float&);
void MakeHelpFile(FilterRep *,MotionVector&,float);

void DrawEditFilterMark(Window,FilterDataRep*,float,FPosition
pos);
void DrawEditImageMark(Window,int,int,DataRep*,float);
void DrawImageMark(Pixmap,int,int,DataRep*);
void DrawFilterMark(Window,int,int,DataRep*);
void DrawToggleFilterMark(Window,FilterDataRep*,float);
void DrawLegend(Window,int,int,int);

endif

/****************************************************************
* panel.h

Bill Freeman, Craig Weissman
   MERL, Cambridge
   6/94

Header file for control panel routines for the hand tracking
   tv program.

****************************************************************/ ifndef _PANEL
define _PANEL include <X11/Xlib.h>
include "control.h"
include "types.h"

/****************************************************************/ const int TRIM = 5;
const int EXTRA_WIDTH = 293;
const int EXTRA_HEIGHT = 257;
const int ENTIRE_WIDTH = 640+(im_w>>sh) + EXTRA_WIDTH + TRIM;
const int ENTIRE_HEIGHT = 480+(im_h>>sh) + EXTRA_HEIGHT + TRIM;

const int HOT_SPOT_WIDTH = 80;
const int HOT_SPOT_HEIGHT = 80;

const int START_POS_X = int(ENTIRE_WIDTH*7.0/30.0+0.5);
const int START_POS_Y = int(ENTIRE_HEIGHT*25.0/32.0+0.5);

const int NUM_CHANNELS = 13;
```

```
/**************************************************************
void InitControlPanel(int,char**);
void EndControlPanel();

void InitCursor(FPosition);
void EndCursor();
void DrawCursor(int);
int IsCursor();

void CreateSubWindows(int, char **);
void DestroySubWindows();
void MakeSubWin(Window&, int,int,int,int);
void DestroySubWins();
void MapSubWindows();
void UnMapSubWindows();

void DoMovement(MotionVector&,int);
int OutOfBounds(FPosition&);
void HandleNewCursor(Control *,FPosition&);

void KeepWithinPanel(Rectangle&, Displacement&);
void KeepWithinBounds(int&,int,int,int);

void HandlePowerPress();

Position CursorStartPosition();

endif

/**************************************************************
*** params.h

Bill Freeman, Craig Weissman
  MERL, Cambridge
  7/94

Header file for parameter retrieval routines for hand trackin
tv program.
**************************************************************
*/ ifndef _PARAMS
define _PARAMS void GetParameters();

endif
/************************************************************* quadfit.h

Bill Freeman, Craig Weissman
  MERL, Cambridge
  7/94

Header file for quadratic best fit procedures for hand
tracking
    tv program
*************************************************************/ ifndef _QUADFIT
```

```c
define _QUADFIT void QuadraticFit(float,float,float,
                  float,float,float,
                  float,float,float,float&,float&,float&);

endif
/****************************************************************
*** remote.h

Bill Freeman, Craig Weissman
   MERL, Cmabridge
   7/94

Remote control handling routines for hand tracking tv program

****************************************************************
**/ ifndef _REMOTE
define _REMOTE include <stdio.h>
include <stdlib.h> const int MAX_COMMANDS = 100;

class RemoteQueue {
public:
  void Clear() { front_index = back_index = 0; return; }
  void Enqueue(char *command) {
    if (IsFull()) {
      printf("Remote queue is full in Enqueue.\n"); exit(-1);
    }
    commands[back_index] = new char[strlen(command)+1];
    strcpy(commands[back_index],command);
    back_index++;
    if (back_index == MAX_COMMANDS) back_index = 0;
  }
  void Dequeue() {
    if (IsEmpty()) {
      printf("Remote queue is empty in Dequeue.\n"); exit(-1);
    } else {
      delete[] commands[front_index];
      front_index++;
      if (front_index == MAX_COMMANDS) front_index = 0;
    }
  }
  char *Front() {
    if (IsEmpty()) {
      printf("Movement queue is empty in Front.\n"); exit(-1);
    } else
      return commands[front_index];
  }
  int IsEmpty() { return front_index == back_index; }
  int IsFull() {
    return ((!front_index && back_index == MAX_COMMANDS - 1) ||
           (back_index == front_index - 1));
  }
  RemoteQueue() { Clear(); }
private:
  char *commands[MAX_COMMANDS];
  int front_index;
  int back_index;
};

void InitRemote();
```

```c
void EndRemote();
void SendToRemote(char *);
void SendFirstCommand();
void ClearRemote();

void SendWakeup();
void SendSEX();
void SendKey(unsigned char);
void SendEnd();
void catchWAK(int);
void catchSAK(int);
void catchKey(int);
void catchEnd(int);

unsigned char Decode(char *);

endif
/*************************************************************** orientrep.h

Bill Freeman, Craig Weissman
   MERL, Cambridge
   6/94

Representation dependent code for correlation in the
   hand tracking tv program based on orientation.

***************************************************************/ ifndef _REP
define _REP include <stdlib.h>
include "globals.h"

define BLUE_OFFSET 1
define GREEN_OFFSET 2
define RED_OFFSET 3

// Area radius over which to perform quadratic maximization
define DELTA 1

/********************************************************/

// Representation used for point in the image.
//
//    len_sqrd: The length of the original gradient vector befor
//              normalization.
//
//    xsingle:  The single-angle normalized components needed to
correctly
//    ysingle   display the orientation maps.
//
//    xdouble:  The components of the double-angle normalized
vector
//    ydouble:  obtained by gradient analysis on the scalars.
//
//    score:    The correlation score at this image point typedef struct _DataRep {
  long len_sqrd;
  float xsingle,ysingle;
  float xdouble,ydouble;
  float score;
} DataRep;

/********************************************************/
```

```c
// Filter representation
//
// The filter is described only at valid points (that is why
// xoffset and yoffset are needed in DataRep) to save space
// and time.
//
//    nm       : Number of valid filter locations
//    w and h  : Width and height used for displaying rectangles.
//    data     : The actual filter.

typedef struct _FilterDataRep {
  short on_flag;
  int xoffset, yoffset;
  DataRep data;
} FilterDataRep;

typedef struct _FilterRep {
  int nm;
  int w, h;
  int minx, miny;
  FilterDataRep array[MAX_FSIZE];
} FilterRep;

/***************************************************************/ inline int XOffset(FilterDataRep *fil)
{ return fil->xoffset; }
inline int YOffset(FilterDataRep *fil)
{ return fil->yoffset; } inline int AboveFilterThresh(DataRep *data)
{ return data->len_sqrd > GRAD_FILTER_THRESH; } inline int AboveImageThresh(DataRep *data)
{ return data->len_sqrd > GRAD_IMAGE_THRESH; } inline float XSingleAngle(DataRep *data)
{ return data->xsingle; }
inline float YSingleAngle(DataRep *data)
{ return data->ysingle; } inline float XDoubleAngle(DataRep *data)
{ return data->xdouble; }
inline float YDoubleAngle(DataRep *data)
{ return data->ydouble; } inline float Score(DataRep *data)
{ return data->score; } inline int ShouldBeInFilter(DataRep *im)
{ return AboveFilterThresh(im); } inline void ClearValues(DataRep *im) {} inline int MemFillChar() { return 0; }

/***************************************************************/ define BLEND(bd,nd,K1,K2) \
*(bd+GREEN_OFFSET) = round(K1* *(bd+GREEN_OFFSET) + K2*
*(nd+GREEN_OFFSET));

define SCALAR(pixel) int(*(pixel+GREEN_OFFSET))

/***************************************************************/ void WriteOneFilterPos(FILE *, FilterDataRep*);
int ReadOneFilterPos(FILE *, FilterDataRep *, int);
void SetOffsets(FilterDataRep&,int,int);
```

```
void StoreValues(unsigned char *, DataRep *);
float Correlate(FilterRep *, MotionVector&, float&);
DataRep* Correlate_One_Filter(FilterRep *, DataRep *, int, int,
MotionVector&, float&, float&);
void MakeHelpFile(FilterRep *,MotionVector&,float);

void DrawEditFilterMark(Window,FilterDataRep*,float,FPosition
pos);
void DrawEditImageMark(Window,int,int,DataRep*,float);
void DrawImageMark(Pixmap,int,int,DataRep*);
void DrawFilterMark(Window,int,int,DataRep*);
void DrawToggleFilterMark(Window,FilterDataRep*,float);
void DrawLegend(Window,int,int,int);

endif

/***************************************************************
**
This header file includes the SAK, WAK and port addresses

***************************************************************
**/ define         FALSE                           0
define         TRUE                            1
define         ESC                             0x1b
define         SEX                             0x0bc
define    WAK                          0x6e
define         SAK4000_6                       0x4d
define         SAK4000_6A                              0x0cd
define         SAK4000                         0x6d
define         SAK5000                         0x6f
define         SAK5000_12                      0x0c3
define         SAK8256                         0x38
define         SAKMEGA                         0x0b8

///* serial port base addresses */
//#define        PORT1_BASE_AD                   0x3f8
//#define        PORT2_BASE_AD                   0x2f8
//#define        PORT3_BASE_AD                   0x3e8
//#define        PORT4_BASE_AD                   0x2e8
//static int
serial_port_address[]={PORT1_BASE_AD,PORT2_BASE_AD,PORT3_BASE_A
,PORT4_BASE_AD};

/* timer/counter base addresses */
//#define        i8255b                          0x61
//#define        i8253c                          0x43
//#define        i8253t2                         0x42
//#define        spkrgate                        0x01
//#define        spkrdata                        0x02

/************************************************************* search.h
```

```
  Bill Freeman, Craig Weissman
  MERL, Cambridge
  7/94

Header file for search window routines for hand tracking tv
program

******************************************************/ ifndef _SEARCH
define _SEARCH include "types.h"

void LimitSearchWindow(MotionVector&, VarianceVector&);
void SearchAllImage();
//void SearchShadowPanel();

extern Rectangle srch;

endif
/************************************************************* serial.h

Bill Freeman, Craig Weissman
  MERL, Cambridge
  8/94

Header file for serial port routines for hand tracking tv
program

******************************************************/ ifndef _SERIAL
define _SERIAL include <poll.h> define NOT_READY ((unsigned char)-1)

define HIGH 1
define LOW 0
define TIMEOUT 2 extern struct pollfd tty;

int OpenSerialIO();
int CloseSerialIO();
int WriteSerial(unsigned char);
int ReadSerial(char *);
int SetDTR(int);
int SetRTS(int);
int ReadyToRead();
int ReadyToWrite();
int SendBreak();
int FlushRead();

endif
/************************************************************* shadow.h

Bill Freeman, Craig Weissman
  MERL, Cambridge
  7/94

Header file for shadowed control panel routines for the hand
```

```c
    tracking tv program
******************************************************
*/ ifndef _SHADOW
define _SHADOW void SetShadowLocation(FPosition,Position);
void DrawControlShadow(Window win);

int X_PtoI(float);
int Y_PtoI(float);
int W_PtoI(float);
int H_PtoI(float);

int X_ItoP(float);
int Y_ItoP(float);

endif
/****************************************************** slideh.h

Bill Freeman, Craig Weissman
   MERL, Cambridge
   7/94

Header file for horizontal slide control

******************************************************/ ifndef _SLIDEH
define _SLIDEH include "control.h"

/******************************************************/

// See control.h for a description of most member functions class Slideh : public Control
{
public:

Slideh(Rectangle,int,char *,char *,char *,Position spos,
       int f_depth = DEF,int wrap_flag = 0,int use_therm = 0,
       int pos = DEF,int slide_w = DEF,int slide_h = DEF);
   void DrawMark();
   void DrawHL();
   void DrawPixmap();
   void UnDraw();
   void PerformAction(Action);
   int IsInside(Rectangle,Rectangle);
   void Adjust(Position);

// Draw the digital number value of the slider's position
   void DrawNumber();

private:

// Return the current x coordinate of the mark
   int SlideXPosition(int);

// Dimensions of the mark
   int slide_width, slide_height;

void CreatePixmap();
```

```
    Position score_pos;
    int save_pos;

int use_thermom;

// Whether or not wrapping is allowed
    int wrap_flag;
};
/****************************************************************/

Slideh *may_be_slideh(Control *);
int slidehp(Control *);

endif
/**************************************************************** slidev.h

Bill Freeman, Craig Weissman
    MERL, Cambridge
    7/94

Header file for vertical slide control

****************************************************************/ ifndef _SLIDEV
define _SLIDEV include "control.h"

/****************************************************************/

// See control.h for a description of most member functions class Slidev : public Control
{
public:

Slidev(Rectangle,int,char *,char *,char *,Position spos,
        int f_depth = DEF, int pos = DEF, int wrap_flag = 0,
        int slide_w = DEF, int slide_h = DEF);
    void DrawMark();
    void DrawHL();
    void DrawPixmap();
    void UnDraw();
    void PerformAction(Action);
    int IsInside(Rectangle,Rectangle);
    void Adjust(Position);

// Draw the digital number value of the slider's position
    void DrawNumber();

private:

// Return the current y coordinate of the mark
    int SlideYPosition(int);

// Dimensions of the mark
    int slide_width, slide_height;

void CreatePixmap();

Position score_pos;
    int save_pos;

int wrap_flag;
```

```
};
/**************************************************************/
Slidev *may_be_slidev(Control *);
int slidevp(Control *);

endif
/************************************************************** sound.h

Bill Freeman, Craig Weissman
  MERL, Cambridge
  1/95

Header file for routines that implement the sounds for the
  hand tracking tv program.

**************************************************************/ void TriggerSound();
void ButtonSound();
void SlideSound();
void ArrowsSound();

/**************************************************************
*
  This header file contains the structures used to cross
reference
  the command line keycmd into the proper hex code based on wha
type
  of remote that is being used.
**************************************************************
*/

/* SAK return codes */
define type8256       0
define type5000_12 1
define type4000       2
define type5000       3
define type4000_6  4
define typemegamem 5
/* this is the total number of remotes supported */
define max_remotes 6
/* largest number of keys of supported remotes */
define max_keys       44 struct remote
{
  char key[8]; /* string to compare */
  char code;   /* hex key code */
};

/* this is the structure to change to add another remote */
struct
{
  char brand[12];
  int maxkeys;
  char SAK;
  struct remote keys[max_keys];
} model[max_remotes] =
{
  {
    "HE8256",
    38,
    0x38,
    {
```

```
            {"A",0x1f},
            {"B",0x17},
            {"C",0x0f},
            {"POWER",0x07},
            {"CD",0x1e},
            {"VCR",0x16},
            {"CABLE",0x0e},
            {"TV",0x06},
            {"AUX4",0x1d},
            {"AUX3",0x15},
            {"AUX2",0x0d},
            {"AUX1",0x05},
            {"REC",0x1a},
            {"TV-VCR",0x13},
            {"STOP",0x0b},
            {"PAUSE",0x03},
            {"FREW",0x19},
            {"REW",0x11},
            {"PLAY",0x0a},
            {"FFWD",0x02},
            {"1",0x38},
            {"2",0x30},
            {"3",0x28},
            {"4",0x39},
            {"5",0x31},
            {"6",0x29},
            {"ENTER",0x21},
            {"7",0x3a},
            {"8",0x32},
            {"9",0x2a},
            {"0",0x22},
            {"VOLUP",0x3c},
            {"RECALL",0x2c},
            {"CHUP",0x25},
            {"VOLDN",0x3d},
            {"MUTE",0x35},
            {"CHDN",0x26}
        }
    },
    {
      "URC5000_12",
      44,
      0x0c3,
      {
        {"TV",0x1f},
        {"VCR",0x17},
        {"CABLE",0x0f},
        {"SAT",0x07},
        {"AUX",0x1e},
        {"AMP",0x16},
        {"TUNER",0x0e},
        {"CD",0x06},
        {"A",0x1d},
        {"B",0x15},
        {"C",0x0d},
        {"POWER",0x05},
        {"1",0x1a},
        {"2",0x13},
        {"3",0x0b},
        {"VOLUP",0x03},
        {"4",0x19},
        {"5",0x11},
        {"6",0x0a},
        {"VOLDN",0x02},
        {"7",0x18},
        {"8",0x10},
        {"9",0x08},
        {"MUTE",0x01},
```

```
            {"RECALL",0x38},
            {"0",0x30},
            {"ENTER",0x28},
            {"CHUP",0x21},
            {"PLAY",0x32},
            {"CHDN",0x22},
            {"REW",0x3B},
            {"PAUSE",0x33},
            {"FFWD",0x2B},
            {"STOP",0x34},
            {"REC",0x25},
            {"SLEEP",0x3d},
            {"DISPLAY",0x35},
            {"A/B",0x2e},
            {"PGM",0x26},
            {"F1",0x3e},
            {"F2",0x37},
            {"F3",0x2f},
            {"F4",0x27}
        }
    },

{
        "URC4000",
        33,
        0x6d,
        {
            {"A",0x1e},
            {"B",0x16},
            {"TV",0x0e},
            {"POWER",0x06},
            {"AUX",0x1d},
            {"VCR",0x15},
            {"CABLE",0x0d},
            {"C",0x05},
            {"1",0x1a},
            {"2",0x13},
            {"3",0x0b},
            {"MUTE",0x03},
            {"4",0x19},
            {"5",0x11},
            {"6",0x0a},
            {"7",0x18},
            {"8",0x10},
            {"9",0x08},
            {"VOLUP",0x01},
            {"0",0x30},
            {"VOLDN",0x20},
            {"ENTER",0x2A},
            {"CHUP",0x22},
            {"RECALL",0x2b},
            {"CHDN",0x23},
            {"REC",0x3d},
            {"TV-VCR",0x35},
            {"STOP",0x2E},
            {"PAUSE",0x26},
            {"FREW",0x3E},
            {"REW",0x37},
            {"PLAY",0x2F},
            {"FFWD",0x27}
        }
    },

{
        "URC5000",
        42,
        0x6f,
        {
            {"VCR1",0x1f},
```

```
            {"CABLE",0x17},
            {"TV",0x0f},
            {"POWER",0x07},
            {"VCR2",0x1e},
            {"CD",0x16},
            {"DO1",0x0e},
            {"DO2",0x06},
            {"REC",0x1c},
            {"TV-VCR",0x14},
            {"STOP",0x0c},
            {"PAUSE",0x04},
            {"FREW",0x1a},
            {"REW",0x13},
            {"PLAY",0x0b},
            {"FFWD",0x03},
            {"MUTE",0x02},
            {"1",0x18},
            {"2",0x10},
            {"3",0x08},
            {"VOLUP",0x01},
            {"4",0x38},
            {"5",0x30},
            {"6",0x28},
            {"VOLDN",0x20},
            {"7",0x39},
            {"8",0x31},
            {"9",0x29},
            {"0",0x32},
            {"ENTER",0x2a},
            {"CHUP",0x22},
            {"RECALL",0x2b},
            {"CHDN",0x23},
            {"DO",0x3c},
            {"A",0x3d},
            {"C",0x35},
            {"E",0x2e},
            {"G",0x26},
            {"B",0x3e},
            {"D",0x37},
            {"F",0x2f},
            {"H",0x27}
        }
    },
    {
      "URC4000_6",
      35,
      0x4d,
      {
        {"AUX1",0x1e},
        {"CD",0x16},
        {"TV",0x0e},
        {"POWER",0x06},
        {"AUX2",0x1d},
        {"VCR",0x15},
        {"CABLE",0x0d},
        {"C",0x05},
        {"1",0x1a},
        {"2",0x13},
        {"3",0x0b},
        {"MUTE",0x03},
        {"4",0x19},
        {"5",0x11},
        {"6",0x0a},
        {"7",0x18},
        {"8",0x10},
        {"9",0x08},
        {"VOLUP",0x01},
        {"0",0x30},
```

```
        {"VOLDN",0x20},
        {"A",0x3a},
        {"ENTER",0x2A},
        {"CHUP",0x22},
        {"B",0x3b},
        {"RECALL",0x2b},
        {"CHDN",0x23},
        {"REC",0x3d},
        {"TV-VCR",0x35},
        {"STOP",0x2E},
        {"PAUSE",0x26},
        {"FREW",0x3E},
        {"REW",0x37},
        {"PLAY",0x2F},
        {"FFWD",0x27}
      }
   },

{
      "MEGA MEMORY",
      37,
      0x0b8,
      {
        {"A",0x1f},
        {"B",0x17},
        {"C",0x0f},
        {"POWER",0x07},
        {"TV",0x1e},
        {"VCR",0x16},
        {"CAB",0x0e},
        {"SAT",0x06},
        {"CD",0x1d},
        {"AUDIO",0x15},
        {"AUX1",0x0d},
        {"AUX2",0x05},
        {"MUTE",0x04},
        {"1",0x1a},
        {"2",0x13},
        {"3",0x0b},
        {"CHUP",0x03},
        {"4",0x19},
        {"5",0x11},
        {"6",0x0a},
        {"CHDN",0x02},
        {"7",0x18},
        {"8",0x10},
        {"9",0x08},
        {"VOLUP",0x01},
        {"RECALL",0x38},
        {"0",0x30},
        {"ENTER",0x28},
        {"VOLDN",0x20},
        {"REC",0x39},
        {"TV/VCR",0x31},
        {"STOP",0x29},
        {"PAUSE",0x21},
        {"<<",0x3a},
        {"SF",0x32},
        {"PLAY",0x2a},
        {">>",0x22}
      }
   }
};
/*******************************
   track.h Bill Freeman, Craig Weissman
```

```
   MERL, Cambridge
   6/94

Header file for hand tracker

********************************/ ifndef _TRACK
define _TRACK include "types.h"
include "rep.h"

/**************************************************************/ void TrackFilter();
int CheckTrigger();

/**************************************************************
*/ void DrawCorrelation(float,FPosition&,FPosition&,float);
void GetSample(float&, MotionVector&,float&);
void EraseScoreBox();
void StartDelay();
int StillDelaying();

endif

/************************************************************** tv.h

Bill Freeman, Craig Weissman
   MERL, Cambridge
   6/94

Main header for hand tracking tv program

**************************************************************** ifndef _TV
define _TV include <X11/Xlib.h>

// Main functions void InitWorld(int,char **);
void EndWorld();

endif
/******************************************************* types.h

Bill Freeman, Craig Weissman
   MERL, Cambridge
   6/94
```

```
   Data structures for the hand tracking tv program.
***********************************************/ ifndef _TYPES
define _TYPES

/***********************************************/

// Spatial structures. The following are used to pass around
// several dimenstions at one time. The scale of a Position mus
// be determined from context. That is, this one structure is used
// to refer to positions in the image, in the control panel, an in
// the diagnostic windows as well. See the specific instance fo
// more information.

typedef struct _position {
  int x,y;
} Position;

typedef struct _fposition {
  float x,y;
} FPosition;

// Not used
typedef struct _displacement {
  int x,y;
} Displacement;

typedef struct _motionvector {
  FPosition pos;
  Displacement disp; // Not implemented
} MotionVector;

typedef struct _vector {
  float x,y;
} Vector;

typedef struct _variancevector {
  Vector pos;
  Vector disp;      // Not implemented
} VarianceVector;

typedef struct _rect {
  Position pos;
  int w,h;
} Rectangle;

// Not used
typedef struct _circle {
  Position pos;
  int r;
} Circle;

/***********************************************/

// These are the actions that can be forced on a control based
// on some cursor movement or other user input. The member
// function PerformAction for each control type determines
// how the control will respond // The actions that can be taken on a control
enum Action {
  Left, Right, Up, Down, LeftSpin, RightSpin, Press, NO_ACTION,
  Clear, Restore };

endif
```

```
/***************************************************************
* video.h

Bill Freeman, Craig Weissman
  MERL, Cambridge
  6/94

Header file for video processing routines for the hand
tracking
  tv program.

***************************************************************/ ifndef _VIDEO
define _VIDEO include <math.h>
include "types.h"
include "rep.h"

/*************************************************************** extern DataRep *image;

/***************************************************************
/
void InitVideo();
void EndVideo();
void ConvertVideo(int);
void DrawImage(Window);

void VideoToImage(XImage *);
void ScalarToImage();
void BlendIntoBackground();
void DrawDiffMap(XImage *);

endif

/******************************* xvutils.h

Bill Freeman, Craig Weissman
  MERL, Cambridge
  6/94

Header file for Xv utilities

*******************************/ ifndef _XVUTILS
define _XVUTILS include <X11/Xv/Xvlib.h> void MakeVideoWin(int, char **,Window&, int, int, int, int);
int Setup(int, char**, unsigned int, XvAdaptorInfo *, unsigned
long *,
```

```
        unsigned long *, unsigned long *);
unsigned long validateXv(int, char **, unsigned int *);

endif

/********************************
general.params
/********************************

General control parameters for the hand tracking tv program
jan 95 wtf: smaller trigger gesture search, interp mode on.
-------------------------------------------------------

TRACKING_BACKGROUND_COUNT - Number of iterations before
background is updated
TRIGGER_BACKGROUND_COUNT  - Number of iterations before
background is updated
TRACKING_BACKGROUND_CONST - Amount of new background that is
the new image
TRIGGER_BACKGROUND_CONST  - Amount of new background that is
the new image
LOST_THRESH               - Number of below thresh scores neede
to be lost
ACTIVITY_THRESH           - Time constant for activating
controls

50,5,0.4,0.7,5,200

IN_BOUNDS_FRACTION        - Size of the shadow control panel in
the image
SEARCH_FRACTION           - Fraction of image to search for
trigger gesture
ORIENT_DASH_LENGTH        - Length of the dashes in the gradien
images
THERMOMETER_FRACTION      - Fraction of filter window for the
score thermometer
BLOWUP_SCALE              - Control the length of lines in the
blowup image

0.18,0.35,2,0.4,1.2

SEARCH_ON                 - Start program in search mode
SHOW_DIFF_MAP             - Flag for whether or not to display
diff. map
SHOW_SCORES               - Flag for whether or not to display
score map
MAKE_HELPFILE             - Flag for whether to make correlatio
debug file
DEBUGMODE                 - Whether or not to start with
diagnostic windows
(Will be set automatically if
SEARCH_ON is false)
USE_REMOTE                - Whether or not to actually use the
serial port
MOUSE_DEBUG               - For testing controls with mouse
tracking
INTERPOLATE               - Whether or not to use quadratic fit
AVERAGING                 - Whether or not to use background fo
making filter

1,1,1,0,0,0,0,0,0

/********************************

orient.params
/********************************

Control parameters for the hand tracking tv program
(orientation based)
```

```
jan 95 wtf: "hot" (low) thresholds
------------------------------------------------------

sub_w, sub_h - Subsampling in width and height

2,2

GRAD_FILTER_THRESH  - Length of gradient vector needed to be
part of filter
GRAD_IMAGE_THRESH   - Length of gradient vector needed to be
non-zero in
the image. This isn't displayed but is
used for correl.
BACKGROUND_THRESH   - Difference needed to register as
foreground
TRIGGER_THRESH      - Correlation score needed to trigger
tracking
TRACKING_THRESH     - Correlation score needed to maintain
tracking
BACKGROUND_SUBTRACT - Whether background subtraction is used

400,400,30,0.45,0.30,1

Kalman sigmoid that controls noise of the measurement based o
correlation

KALMAN_SIGMOID_TOP    - Y value for top of the sigmoid curve
KALMAN_SIGMOID_BOTTOM - Y value for bottom of the sigmoid
curve
KALMAN_SIGMOID_SPREAD - How fast the sigmoid changes away fro
mean
SEARCH_MULITIPLIER    - How much bigger search window is than
variance
MOTION_VARIANCE       - Noise parameter for hand motion (x an
y)

1.0,0.5,70.0,4.0,7.0

Tracking sigmoid that controls what fracion of filter needs t
be used

TRACKING_SIGMOID_TOP    - Y value for the top of the sigmoid
curve
TRACKING_SIGMOID_BOTTOM - Y value for the bottom of the
sigmoid curve
TRACKING_SIGMOID_MEAN   - Inflection point of the sigmoid
TRACKING_SIGMOID_SPREAD - How fast the sigmoid changes away
from mean

1.0,0.0,0.40,25.0

/*********************************
Makefile for hand tracking tv program
/*********************************

Craig Weissman
MERL, Cambridge
8/94

CC = g++
INCLUDES = -I/releases/X11R5/include -I/usr/local/include
CFLAGS = -O2
LIBS = -lm -lXv -lX11
LDFLAGS = -L/releases/X11R5/lib -L/usr/local/lib
```

```
To change representations you must change the following two
lines to clrrep, greenrep, or orientrep. In addition you must copy the
correct header file ON TOP OF rep.h (clrrep.h, greenrep.h, or orientrep.h)
before compiling REP_SRCS = orientrep.cc
REP_OBJS = orientrep.o SRCS = $(REP_SRCS) arrows.cc kalman.cc video.cc panel.cc
control.cc track.cc slideh.cc button.cc filter.cc xvutils.cc
tv.cc message.cc shadow.cc params.cc search.cc remote.cc
serial.cc edit.cc gc.cc instructions.cc mouse.cc quadfit.cc
digital.cc sound.cc OBJS = $(REP_OBJS) arrows.o kalman.o video.o panel.o control.o
track.o slideh.o button.o filter.o xvutils.o tv.o message.o
shadow.o params.o search.o remote.o serial.o edit.o gc.o
instructions.o mouse.o quadfit.o digital.o sound.o PROGRAM = tv $(PROGRAM): $(OBJS)
    $(CC) $(CFLAGS) $(OBJS) -o $(PROGRAM) $(LDFLAGS) $(LIBS)

.cc.o:
    $(CC) $(CFLAGS) -c $< depend: ${SRCS}
    makedepend ${INCLUDES} ${SRCS} clean:
    rm -f *.o
    rm -f *~ backup:
    ci -l -q -tcheckin_text -m"no log message" *.cc *.h
    ci -l -q -tcheckin_text -m"no log message" *hand
    ci -l -q -tcheckin_text -m"no log message" Makefile
    ci -l -q -tcheckin_text -m"no log message" *.params big:
    cat *.cc *.h *.params > big
    wc big
    rm -f big

DO NOT DELETE THIS LINE -- make depend depends on it.

orientrep.o: /usr/include/math.h /usr/include/sys/stdsyms.h
rep.h
orientrep.o: /usr/include/stdlib.h globals.h
orientrep.o: /releases/X11R5/include/X11/Xlib.h
/usr/include/sys/types.h
orientrep.o: /releases/X11R5/include/X11/X.h
orientrep.o: /releases/X11R5/include/X11/Xfuncproto.h
orientrep.o: /releases/X11R5/include/X11/Xosdefs.h
/usr/include/stddef.h
orientrep.o: types.h quadfit.h search.h gc.h filter.h edit.h
video.h
arrows.o: /usr/include/stdlib.h arrows.h control.h
arrows.o: /releases/X11R5/include/X11/Xlib.h
/usr/include/sys/types.h
arrows.o: /usr/include/sys/stdsyms.h
/releases/X11R5/include/X11/X.h
arrows.o: /releases/X11R5/include/X11/Xfuncproto.h
arrows.o: /releases/X11R5/include/X11/Xosdefs.h
/usr/include/stddef.h
```

```
arrows.o: /usr/include/time.h /usr/include/sys/time.h globals.h
types.h
arrows.o: panel.h remote.h /usr/include/stdio.h
kalman.o: /usr/include/math.h /usr/include/sys/stdsyms.h
/usr/include/stdio.h
kalman.o: globals.h /releases/X11R5/include/X11/Xlib.h
kalman.o: /usr/include/sys/types.h
/releases/X11R5/include/X11/X.h
kalman.o: /releases/X11R5/include/X11/Xfuncproto.h
kalman.o: /releases/X11R5/include/X11/Xosdefs.h
/usr/include/stddef.h types.h
kalman.o: kalman.h
video.o: /releases/X11R5/include/X11/Xlib.h
/usr/include/sys/types.h
video.o: /usr/include/sys/stdsyms.h
/releases/X11R5/include/X11/X.h
video.o: /releases/X11R5/include/X11/Xfuncproto.h
video.o: /releases/X11R5/include/X11/Xosdefs.h
/usr/include/stddef.h
video.o: /releases/X11R5/include/X11/Xutil.h
video.o: /releases/X11R5/include/X11/Xatom.h
/usr/include/string.h types.h
video.o: globals.h rep.h /usr/include/stdlib.h video.h
/usr/include/math.h
video.o: search.h shadow.h gc.h
panel.o: /usr/include/stdlib.h /usr/include/math.h
/usr/include/sys/stdsyms.h
panel.o: globals.h /releases/X11R5/include/X11/Xlib.h
panel.o: /usr/include/sys/types.h
/releases/X11R5/include/X11/X.h
panel.o: /releases/X11R5/include/X11/Xfuncproto.h
panel.o: /releases/X11R5/include/X11/Xosdefs.h
/usr/include/stddef.h types.h
panel.o: control.h /usr/include/time.h /usr/include/sys/time.h
panel.h
panel.o: xvutils.h /usr/local/include/X11/Xv/Xvlib.h
panel.o: /usr/local/include/X11/extensions/Xv.h shadow.h
message.h
panel.o: instructions.h filter.h rep.h track.h arrows.h slideh.
button.h
control.o: /usr/include/stdlib.h /usr/include/math.h
control.o: /usr/include/sys/stdsyms.h
/releases/X11R5/include/X11/Xlib.h
control.o: /usr/include/sys/types.h
/releases/X11R5/include/X11/X.h
control.o: /releases/X11R5/include/X11/Xfuncproto.h
control.o: /releases/X11R5/include/X11/Xosdefs.h
/usr/include/stddef.h
control.o: types.h control.h /usr/include/time.h
/usr/include/sys/time.h
control.o: globals.h panel.h
track.o: /usr/include/signal.h /usr/include/sys/signal.h
track.o: /usr/include/sys/stdsyms.h /usr/include/sys/types.h
track.o: /usr/include/sys/syscall.h globals.h
track.o: /releases/X11R5/include/X11/Xlib.h
/releases/X11R5/include/X11/X.h
track.o: /releases/X11R5/include/X11/Xfuncproto.h
track.o: /releases/X11R5/include/X11/Xosdefs.h
/usr/include/stddef.h types.h
track.o: track.h rep.h /usr/include/stdlib.h panel.h control.h
track.o: /usr/include/time.h /usr/include/sys/time.h video.h
track.o: /usr/include/math.h message.h search.h edit.h
instructions.h
track.o: filter.h remote.h /usr/include/stdio.h shadow.h
kalman.h
slideh.o: /usr/include/stdlib.h slideh.h control.h
slideh.o: /releases/X11R5/include/X11/Xlib.h
/usr/include/sys/types.h
```

```
slideh.o: /usr/include/sys/stdsyms.h
/releases/X11R5/include/X11/X.h
slideh.o: /releases/X11R5/include/X11/Xfuncproto.h
slideh.o: /releases/X11R5/include/X11/Xosdefs.h
/usr/include/stddef.h
slideh.o: /usr/include/time.h /usr/include/sys/time.h globals.h
types.h
slideh.o: panel.h remote.h /usr/include/stdio.h digital.h
button.o: /usr/include/stdlib.h button.h control.h
button.o: /releases/X11R5/include/X11/Xlib.h
/usr/include/sys/types.h
button.o: /usr/include/sys/stdsyms.h
/releases/X11R5/include/X11/X.h
button.o: /releases/X11R5/include/X11/Xfuncproto.h
button.o: /releases/X11R5/include/X11/Xosdefs.h
/usr/include/stddef.h
button.o: /usr/include/time.h /usr/include/sys/time.h globals.h
types.h
button.o: panel.h remote.h /usr/include/stdio.h
filter.o: /releases/X11R5/include/X11/Xlib.h
/usr/include/sys/types.h
filter.o: /usr/include/sys/stdsyms.h
/releases/X11R5/include/X11/X.h
filter.o: /releases/X11R5/include/X11/Xfuncproto.h
filter.o: /releases/X11R5/include/X11/Xosdefs.h
/usr/include/stddef.h
filter.o: globals.h types.h filter.h rep.h /usr/include/stdlib.
message.h
filter.o: panel.h control.h /usr/include/time.h
/usr/include/sys/time.h
filter.o: search.h edit.h gc.h video.h /usr/include/math.h
xvutils.o: /usr/include/stdio.h /usr/include/stdlib.h
/usr/include/stdarg.h
xvutils.o: /usr/include/sys/stdsyms.h /usr/include/varargs.h
xvutils.o: /usr/include/math.h
/releases/X11R5/include/X11/Xlib.h
xvutils.o: /usr/include/sys/types.h
/releases/X11R5/include/X11/X.h
xvutils.o: /releases/X11R5/include/X11/Xfuncproto.h
xvutils.o: /releases/X11R5/include/X11/Xosdefs.h
/usr/include/stddef.h
xvutils.o: /releases/X11R5/include/X11/Xutil.h
/usr/include/unistd.h
xvutils.o: /usr/include/sys/unistd.h
/usr/local/include/X11/Xv/Xvlib.h
xvutils.o: /usr/local/include/X11/extensions/Xv.h xvutils.h
tv.o: /releases/X11R5/include/X11/Xlib.h
/usr/include/sys/types.h
tv.o: /usr/include/sys/stdsyms.h /releases/X11R5/include/X11/X.
tv.o: /releases/X11R5/include/X11/Xfuncproto.h
tv.o: /releases/X11R5/include/X11/Xosdefs.h
/usr/include/stddef.h
tv.o: /releases/X11R5/include/X11/Xutil.h globals.h types.h tv.
panel.h
tv.o: control.h /usr/include/time.h /usr/include/sys/time.h
video.h
tv.o: /usr/include/math.h rep.h /usr/include/stdlib.h filter.h
track.h
tv.o: params.h remote.h /usr/include/stdio.h gc.h mouse.h
search.h
tv.o: instructions.h
message.o: /releases/X11R5/include/X11/Xlib.h
/usr/include/sys/types.h
message.o: /usr/include/sys/stdsyms.h
/releases/X11R5/include/X11/X.h
message.o: /releases/X11R5/include/X11/Xfuncproto.h
message.o: /releases/X11R5/include/X11/Xosdefs.h
/usr/include/stddef.h
```

```
message.o: /usr/include/string.h globals.h types.h message.h
panel.h
message.o: control.h /usr/include/time.h /usr/include/sys/time.
shadow.o: globals.h /releases/X11R5/include/X11/Xlib.h
shadow.o: /usr/include/sys/types.h /usr/include/sys/stdsyms.h
shadow.o: /releases/X11R5/include/X11/X.h
shadow.o: /releases/X11R5/include/X11/Xfuncproto.h
shadow.o: /releases/X11R5/include/X11/Xosdefs.h
/usr/include/stddef.h types.h
shadow.o: shadow.h panel.h control.h /usr/include/time.h
shadow.o: /usr/include/sys/time.h
params.o: /usr/include/stdlib.h /usr/include/stdio.h
/usr/include/string.h
params.o: globals.h /releases/X11R5/include/X11/Xlib.h
params.o: /usr/include/sys/types.h /usr/include/sys/stdsyms.h
params.o: /releases/X11R5/include/X11/X.h
params.o: /releases/X11R5/include/X11/Xfuncproto.h
params.o: /releases/X11R5/include/X11/Xosdefs.h
/usr/include/stddef.h types.h
search.o: globals.h /releases/X11R5/include/X11/Xlib.h
search.o: /usr/include/sys/types.h /usr/include/sys/stdsyms.h
search.o: /releases/X11R5/include/X11/X.h
search.o: /releases/X11R5/include/X11/Xfuncproto.h
search.o: /releases/X11R5/include/X11/Xosdefs.h
/usr/include/stddef.h types.h
search.o: search.h
remote.o: /usr/include/time.h /usr/include/sys/time.h
remote.o: /usr/include/sys/stdsyms.h /usr/include/sys/signal.h
remote.o: /usr/include/sys/signal.h /usr/include/sys/types.h
remote.o: /usr/include/sys/syscall.h /usr/include/stdlib.h
globals.h
remote.o: /releases/X11R5/include/X11/Xlib.h
/releases/X11R5/include/X11/X.h
remote.o: /releases/X11R5/include/X11/Xfuncproto.h
remote.o: /releases/X11R5/include/X11/Xosdefs.h
/usr/include/stddef.h types.h
remote.o: remote.h /usr/include/stdio.h serial.h
/usr/include/poll.h
remote.o: /usr/include/sys/poll.h sakcodes.h struct.h message.h
serial.o: /usr/include/stdio.h /usr/include/stdlib.h
/usr/include/termios.h
serial.o: /usr/include/sys/termio.h /usr/include/sys/stdsyms.h
serial.o: /usr/include/sys/ioctl.h /usr/include/sys/fcntl.h
serial.o: /usr/include/sys/types.h /usr/include/poll.h
serial.o: /usr/include/sys/poll.h /usr/include/sys/modem.h
serial.o: /usr/include/unistd.h /usr/include/sys/unistd.h
serial.o: /usr/include/signal.h /usr/include/sys/signal.h
serial.o: /usr/include/sys/syscall.h /usr/include/time.h
serial.o: /usr/include/sys/time.h serial.h
edit.o: globals.h /releases/X11R5/include/X11/Xlib.h
/usr/include/sys/types.h
edit.o: /usr/include/sys/stdsyms.h
/releases/X11R5/include/X11/X.h
edit.o: /releases/X11R5/include/X11/Xfuncproto.h
edit.o: /releases/X11R5/include/X11/Xosdefs.h
/usr/include/stddef.h types.h
edit.o: rep.h /usr/include/stdlib.h edit.h filter.h search.h
video.h
edit.o: /usr/include/math.h message.h instructions.h panel.h
control.h
edit.o: /usr/include/time.h /usr/include/sys/time.h track.h gc.
gc.o: /usr/include/stdio.h globals.h
/releases/X11R5/include/X11/Xlib.h
gc.o: /usr/include/sys/types.h /usr/include/sys/stdsyms.h
gc.o: /releases/X11R5/include/X11/X.h
gc.o: /releases/X11R5/include/X11/Xfuncproto.h
gc.o: /releases/X11R5/include/X11/Xosdefs.h
/usr/include/stddef.h types.h
```

```
gc.o: gc.h panel.h control.h /usr/include/time.h
/usr/include/sys/time.h
instructions.o: /usr/include/stdio.h globals.h
instructions.o: /releases/X11R5/include/X11/Xlib.h
/usr/include/sys/types.h
instructions.o: /usr/include/sys/stdsyms.h
/releases/X11R5/include/X11/X.h
instructions.o: /releases/X11R5/include/X11/Xfuncproto.h
instructions.o: /releases/X11R5/include/X11/Xosdefs.h
/usr/include/stddef.h
instructions.o: types.h instructions.h message.h
mouse.o: globals.h /releases/X11R5/include/X11/Xlib.h
mouse.o: /usr/include/sys/types.h /usr/include/sys/stdsyms.h
mouse.o: /releases/X11R5/include/X11/X.h
mouse.o: /releases/X11R5/include/X11/Xfuncproto.h
mouse.o: /releases/X11R5/include/X11/Xosdefs.h
/usr/include/stddef.h types.h
mouse.o: mouse.h message.h filter.h rep.h /usr/include/stdlib.h
mouse.o: instructions.h panel.h control.h /usr/include/time.h
mouse.o: /usr/include/sys/time.h remote.h /usr/include/stdio.h
edit.h
quadfit.o: /usr/include/math.h /usr/include/sys/stdsyms.h
quadfit.h
digital.o: /releases/X11R5/include/X11/Xlib.h
/usr/include/sys/types.h
digital.o: /usr/include/sys/stdsyms.h
/releases/X11R5/include/X11/X.h
digital.o: /releases/X11R5/include/X11/Xfuncproto.h
digital.o: /releases/X11R5/include/X11/Xosdefs.h
/usr/include/stddef.h
digital.o: /usr/include/stdio.h globals.h types.h digital.h /*********************************
orient.fil.2x2    (contains an example hand gesture orientation
template)
/*********************************
105,-16,-16,30,32,320,240,2,2
2,-16,-0.312927,0.949777,-0.586120,-0.810224
4,-16,-0.533273,-0.845944,0.483077,-0.875578
-6,-14,0.929978,0.367615,-0.982339,-0.187112
-4,-14,-0.450644,0.892704,-0.524097,-0.851658
-2,-14,0.820791,-0.571229,0.954147,-0.299340
2,-14,0.686963,0.726692,-0.918413,-0.395624
4,-14,0.751551,0.659675,0.935829,0.352455
8,-14,-0.986207,-0.165517,0.083045,-0.996546
-6,-12,0.985413,0.170178,-0.996347,-0.085401
-4,-12,0.645331,0.763903,-0.907009,-0.421111
-2,-12,0.988235,0.152941,0.997054,0.076697
0,-12,0.844530,0.535509,-0.960346,-0.278810
2,-12,0.998271,-0.058773,-0.999568,0.029399
4,-12,0.967247,0.253838,0.991778,0.127971
6,-12,0.523414,0.852079,-0.872758,-0.488153
8,-12,-0.097329,-0.995252,0.671815,-0.740719
10,-12,0.898876,-0.438202,0.974391,-0.224860
-6,-10,0.993846,-0.110769,-0.998460,0.055470
-2,-10,0.989848,-0.142132,0.997459,-0.071247
0,-10,0.591456,0.806338,-0.892036,-0.451965
2,-10,0.875122,0.483902,0.968277,0.249878
4,-10,0.600000,0.800000,0.894427,0.447214
6,-10,0.618764,0.785577,-0.899657,-0.436598
8,-10,0.329038,0.944317,0.815180,0.579207
-6,-8,0.998686,0.051248,-0.999671,-0.025633
-2,-8,0.642336,-0.766423,0.906183,-0.422885
0,-8,0.236593,0.971609,-0.786318,-0.617822
2,-8,0.600000,0.800000,0.894427,0.447214
4,-8,-0.120769,0.992681,-0.663035,-0.748588
8,-8,0.786769,0.617247,0.945190,0.326520
-6,-6,0.995012,-0.099751,-0.998752,0.049938
-4,-6,0.370899,0.928673,-0.827919,-0.560848
```

```
-2,-6,0.470588,-0.882353,0.857493,-0.514496
0,-6,0.773756,-0.633484,-0.941742,0.336336
2,-6,0.693369,0.720583,0.920155,0.391555
4,-6,0.524061,0.851681,-0.872943,-0.487821
6,-6,-0.124514,0.992218,0.661622,0.749838
8,-6,0.960000,-0.280000,0.989949,-0.141421
12,-6,-0.574977,0.818170,-0.460990,-0.887405
14,-6,0.680663,-0.732597,0.916696,-0.399585
-14,-4,-0.849057,0.528302,-0.274721,-0.961524
-6,-4,0.996534,0.083189,-0.999133,-0.041631
-4,-4,0.694018,-0.719958,-0.920331,0.391141
-2,-4,0.700885,0.713274,0.922194,0.386727
2,-4,-0.204706,-0.978824,0.630593,-0.776114
4,-4,0.574307,0.818640,-0.887217,-0.461353
6,-4,0.488496,0.872566,0.862698,0.505720
10,-4,0.053060,0.998591,-0.725624,-0.688092
12,-4,0.566161,0.824295,0.884918,0.465746
14,-4,0.710059,0.704142,0.924678,0.380750
-16,-2,0.923077,0.384615,-0.980581,-0.196116
-14,-2,0.240328,0.970692,-0.787505,-0.616308
-12,-2,-0.785431,-0.618949,0.327543,-0.944836
-10,-2,-0.402044,-0.915620,0.546789,-0.837270
-6,-2,1.000000,0.000000,-1.000000,0.000000
-4,-2,0.781737,-0.623608,-0.943858,0.330350
-2,-2,-0.734426,-0.678689,0.364399,-0.931243
4,-2,-0.246154,0.969231,0.613941,0.789352
8,-2,0.458430,0.888731,-0.853941,-0.520370
12,-2,0.227737,0.973723,0.783498,0.621395
-14,0,-0.537600,-0.843200,-0.480833,0.876812
-12,0,0.296230,-0.955117,-0.805056,0.593199
-10,0,0.710059,-0.704142,0.924678,-0.380750
-8,0,-0.246154,-0.969231,0.613941,-0.789352
-6,0,0.104972,0.994475,-0.743294,-0.668965
6,0,0.138859,0.990312,-0.754606,-0.656179
8,0,-0.960000,-0.280000,0.141421,-0.989949
10,0,0.032250,0.999480,0.718418,0.695611
-12,2,0.180328,-0.983607,-0.768221,0.640184
-10,2,0.872566,-0.488496,-0.967617,0.252422
-8,2,0.152941,-0.988235,0.759257,-0.650791
4,2,-0.627692,-0.778462,0.431455,-0.902134
6,2,-1.000000,0.000000,0.000000,-1.000000
8,2,-0.616795,0.787124,0.437724,0.899109
-10,4,0.337615,-0.941284,-0.817806,0.575493
-8,4,-0.557093,-0.830450,0.470588,-0.882353
-6,4,-0.541401,-0.840764,0.478852,-0.877896
6,4,-0.211854,0.977301,0.627752,0.778413
-8,6,0.222045,-0.975036,-0.781679,0.623680
-6,6,0.000000,-1.000000,0.707107,-0.707107
-4,6,-0.405975,-0.913884,0.544988,-0.838444
6,6,0.768200,0.640210,0.940266,0.340441
-8,8,0.657534,-0.753425,-0.910366,0.413803
-6,8,0.490186,-0.871618,-0.863188,0.504883
-4,8,-0.541401,-0.840764,0.478852,-0.877896
-2,8,-0.480203,-0.877157,0.509802,-0.860292
0,8,-0.912195,-0.409756,0.209529,-0.977802
2,8,-0.445902,0.895082,-0.526355,-0.850265
6,8,0.718461,0.695567,0.926947,0.375193
-6,10,0.800000,-0.600000,-0.948683,0.316228
-4,10,0.267748,-0.963489,0.796162,-0.605083
-2,10,-0.492228,-0.870466,0.503871,-0.863779
0,10,-0.901768,-0.432220,0.221621,-0.975133
2,10,-0.698824,0.715294,-0.388057,-0.921635
4,10,0.470588,0.882353,0.857493,0.514496
-6,12,0.955321,0.295572,-0.988767,-0.149465
-4,12,-0.960000,0.280000,0.141421,0.989949
-2,12,-0.500555,0.865705,0.499722,0.866186
0,12,-0.923077,-0.384615,-0.196116,0.980581
2,12,0.663202,0.748441,0.911921,0.410365
4,12,0.870466,0.492228,0.967075,0.254493
```

```
-6,14,0.866346,0.499445,-0.966009,-0.258509
2,14,0.638908,0.769283,0.905237,0.424907
-6,16,0.705692,0.708518,-0.923497,-0.383606
2,16,0.998919,-0.046486,0.999730,-0.023250
```

We claim:

1. A system for control of a machine having a display screen and means for controlling said machine via actuating on-screen machine control icons, comprising:

means for detecting the existence of and position in space of a predetermined hand gesture and for generating corresponding existence and position signals responsive thereto;

means for providing an on-screen hand icon corresponding in on-screen position to the detected position of said predetermined hand gesture in space, such that changes in position of said predetermined hand gesture result in a corresponding change in position of said on-screen hand icon, whereby the position of said on-screen hand icon is controllable by movement of said predetermined hand gesture; and, means for detecting coincidence of said on-screen hand icon with an on-screen machine control icon as said hand icon made to move over said machine control icon by movement of said predetermined hand gesture and for generating corresponding machine control signal responsive to said detected coincidence wherein said means for detecting the existence and position of said predetermined hand gesture includes:

means for providing a hand gesture template including orientation vectors corresponding to orientations of edges of said predetermined hand gesture corresponding to said predetermined hand gesture;

means for optically scanning a region at which said predetermined hand gesture is expected to exist and for providing orientation vectors corresponding to orientations of edges of images within said scanned region;

means for correlating the orientation vectors of said hand template with orientations vectors of the images within said scanned region to provide a correlation values; and, means for providing a trigger signal when said correlation value exceeds a predetermined threshold.

2. The system of claim 1, wherein said machine control icon represents a switch and wherein said corresponding machine control signal generating means includes means for generating a switch closure signal.

3. The system of claim 1, wherein said machine control icon includes a moveable element and wherein said coincidence detecting means includes means for detecting coincidence of said hand icon with said moveable element, thus to represent capture of said moveable element, and means responsive to the movement of said hand icon for effectuating corresponding movement of said moveable element and generation of the corresponding machine control signal.

4. The system of claim 3 wherein said machine control icon is a slider bar and wherein said moveable element is a slider.

5. The system of claim 3 wherein said moveable element moves in a predetermined direction and wherein said means for effectuating corresponding movement of said moveable element is actuated only by movement of said hand icon in said predetermined direction.

6. The system of claim 1 and further including means for terminating said machine control upon detection of non-coincidence of said hand icon with said machine control icon.

7. The system of claim 5 said further including means for terminating said machine control upon movement of said hand icon in a direction different from said predetermined direction.

8. The system of claim 1 wherein said means for detecting the existence and position of said predetermined hand gesture includes:

a video camera directed towards a region in space at which said predetermined hand gesture is expected to exist, means coupled to said camera for analyzing the output of said camera for the presence of said predetermined hand gesture in the scene scanned by said vidio camera and for narrowing the scene scanned by said video camera to a region around the position of a detected hand gesture when said predetermined hand gesture is detected, thereby to minimize the effect of background noise in the further detection of said predetermined hand gesture once said predetermined hand gesture has been detected.

9. The system of claim 8 wherein said predetermined hand gesture is a flat hand presented with palm facing said camera.

10. The system of claim 1 wherein said predetermined hand gesture is the "how" sign.

11. The system of claim 1 wherein said predetermined hand gesture is the "how" sign, said predetermined gesture functioning as a trigger gesture, the detection of which establishes said machine control.

12. The system of claim 11, and further including means for detecting a second predetermined gesture and means responsive thereto for terminating said hand gesture machine control.

13. The system of claim 12 wherein said second predetermined hand gesture is a clenched fist.

14. The system of claim 1 and further including means for determining a maximum correlation value and the location thereof within said scanned region.

15. The system of claim 14 and further including means for delimiting the region scanned to that region in the vicinity of the position associated with said maximum correlation value.

16. The system of claim 14, wherein the position of said predetermined hand gesture is taken to be the position of said maximum correlation, thereby to facilitate hand gesture tracking.

* * * * *